US006583593B2

(12) United States Patent
Iijima et al.

(10) Patent No.: US 6,583,593 B2
(45) Date of Patent: Jun. 24, 2003

(54) METHOD AND APPARATUS FOR POSITION-SENSORLESS MOTOR CONTROL

(75) Inventors: Tomokuni Iijima, Osaka (JP); Kazushige Narazaki, Katano (JP); Toru Tazawa, Ibaraki (JP); Ichiro Oyama, Osaka (JP); Yukinori Maruyama, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 3 days.

(21) Appl. No.: 09/975,826

(22) Filed: Oct. 11, 2001

(65) Prior Publication Data
US 2002/0113569 A1 Aug. 22, 2002

(30) Foreign Application Priority Data

Oct. 11, 2000 (JP) ........................................ 2000-311149

(51) Int. Cl.$^7$ ................................................. H02P 1/18
(52) U.S. Cl. ...................... 318/254; 318/138; 318/439; 318/700; 318/721
(58) Field of Search ................................ 318/700, 701, 318/254, 138, 439, 721, 724

(56) References Cited

U.S. PATENT DOCUMENTS 4,694,210 A * 9/1987 Elliott et al. ............... 310/68 R
5,051,680 A * 9/1991 Belanger ..................... 318/701
5,117,165 A * 5/1992 Cassat et al. ................ 318/254
5,254,914 A * 10/1993 Dunfiled et al. ............. 318/254
5,608,300 A 3/1997 Kawabata et al.
5,854,548 A 12/1998 Taga et al.
5,994,870 A 11/1999 Kaneko et al.
6,005,365 A 12/1999 Kaneko et al.

FOREIGN PATENT DOCUMENTS

JP 07-245981 A 9/1995

* cited by examiner

Primary Examiner—Robert E. Nappi
Assistant Examiner—Rina I. Duda
(74) Attorney, Agent, or Firm—Akin, Gump, Strauss, Hauer & Feld, L.L.P.

(57) ABSTRACT

A method for position-sensorless motor control is provided, wherein a rotor-position estimation current signal is superimposed on the γ-axis direction component of a target current vector representing target currents of stator windings. The period of the current signal is an even multiple of a PWM carrier period and varies at random. The amplitude of the current signal increases with the amplitudes of the target currents. An even number of samples are obtained from the δ-axis direction component of a current vector representing detected currents of the stator windings in each period of the current signal. A discrete Fourier integration of the samples determines the amplitude of a current response to the current signal in the δ-axis direction. The γ-axis direction is corrected so that the current response substantially shrinks to zero in the δ-axis direction.

28 Claims, 19 Drawing Sheets

METHOD AND APPARATUS FOR POSITION-SENSORLESS MOTOR CONTROL

BACKGROUND OF THE INVENTION

The present invention relates to a method and an apparatus for position-sensorless motor control in which a rotor position of a motor is detected without a position sensor, whereby the driving of the motor is controlled, in particular, when the rotor is at a stop or slowly revolves.

A brushless motor does not have a mechanical commutation element such as a brush, but instead has an electric circuit for carrying out the commutation electrically. The electric circuit controls the currents flowing through stator windings, in synchronization with the rotor revolution.

A brushless motor comprises a permanent magnet and thus at least two magnetic poles. A rotor position is defined by an angle around the center axis of a rotor between the direction (d-axis direction) of the center axis of a magnetic pole of the rotor and a reference direction ($\alpha$-axis direction) fixed to a stator.

Electric commutation needs detection of rotor position. A prior art motor control apparatus for brushless motor has obtained the information on rotor position using a position sensor such as Hall devices, a resolver, a magnetic encoder, and an optical encoder. However, the position sensor has caused a higher cost and a larger size in the prior art brushless motor.

In a position-sensorless motor control apparatus (prior art example, hereafter) disclosed in Japanese Laid-Open Patent Publication No. Hei 10-323099, a rotor position is detected without an above-described position sensor. Thus, the cost and the size of a brushless motor are reduced.

The prior art example detects a rotor position without a position sensor and controls the driving of motor, especially when a rotor is at a stop and slowly revolves, according to the following steps:

(1) Estimating the rotor position, thereby estimating the d-axis direction and the q-axis direction ($\gamma$-axis direction and $\delta$-axis direction, respectively) of the rotor based on the estimated rotor position. Here, the q-axis direction is defined as the direction advancing by 90° in terms of electric angle from the d-axis direction in the direction of the rotor revolution.

(2) Superimposing a predetermined current signal or voltage signal for rotor position estimation (rotor-position estimation current/voltage signal, hereafter) on the $\gamma$-axis direction component of a target current vector or a target voltage vector of the stator windings. Here, a target current vector of the stator windings is a vector representing target currents in the control over the currents flowing through the stator windings. A target voltage vector of the stator windings is a vector representing target voltages in the control over the voltages applied across the stator windings. In the invention, a target current vector with superimposed wave means a vector representing the target currents on which are superimposed the rotor-position estimation current signal. A target voltage vector with superimposed wave means a vector representing the target voltages that are superimposed the rotor-position estimation voltage signal on.

(3) Converting the target current vector with superimposed wave into the corresponding target voltage vector of the stator windings. A motor driver supplies electric power based on either the target voltage vector of the stator windings or the target voltage vector with superimposed wave, to the stator windings. In particular, in a pulse width modulation (PWM) control over the currents of the stator windings, the motor driver modulates the target voltages represented by either the target voltage vector of the stator windings or the target voltage vector with superimposed wave, through the PWM, and then applies the modulated target voltages across the stator windings. Electric power corresponding to the rotor-position estimation current/voltage signal is applied to the stator windings through the power supplied to the stator windings by the motor drive. Here, the rotor-position estimation current/voltage signal is, for example, an AC signal having a constant period equal to a multiple of the PWM carrier period and a constant amplitude. Each of the rotor-position estimation current/voltage signals is generally referred to as a rotor-position estimation signal hereafter, when distinction between both of the signals is unnecessary. In the above-described PWM control, a constant AC power corresponding to the rotor-position estimation signal is applied to the stator windings. Then, a current response to the AC power is generated in the stator windings.

(4) Detecting the above-described current response in the $\delta$-axis direction at a predetermined phase. For example, a sampling of the current response is carried out at each peak of the rotor-position estimation signal, that is, at each half period of the rotor-position estimation signal.

(5) Correcting the estimated rotor position so that the detected current response approaches zero in the $\delta$-axis direction.

These steps (1) through (5) are repeated during the driving control of the motor.

The amount of deviation of the $\delta$-axis direction from the d-axis direction is designated as $\Delta\theta$, equal to the amount of deviation of the $\delta$-axis direction from the q-axis direction, and hereafter referred to as a position estimation error. The amplitude of the current response in the $\delta$-axis direction is substantially proportional to $\sin(2\Delta\theta)$. Accordingly, the estimated rotor position and the actual rotor position coincide with each other within a predetermined error, when the current response converge to zero within a predetermined error in the $\delta$-axis direction.

The prior art position-sensorless motor control uses the rotor-position estimation signal with a constant frequency. In particular, the constant frequency falls within the audio-frequency band from a few tens Hz to a few hundreds Hz. As a result, when the stator teeth and the like vibrate in synchronization with the rotor-position estimation signal, an undesired sound is generated. The undesired sound is large especially near the frequency of the rotor-position estimation signal.

The prior art position-sensorless motor control uses the rotor-position estimation signal with a constant amplitude. Accordingly, the current response to the rotor-position estimation signal has a substantially constant amplitude. On the other hand, the larger the amplitudes of the currents flowing through the stator windings becomes, the larger an electric noise, which is hereafter referred to as a noise, in the $\delta$-axis direction is generally generated, and hence, the greater the ratio (S/N ratio) of the current response's amplitude to the noise is reduced. When the S/N ratio is small, the distinction between the current response and the noise is difficult, and hence, the position estimation error is large. Furthermore, in the prior art position-sensorless motor control, the sampling of the current response is carried out only at each half period of the rotor-position estimation signal, and thus, the number of the samples is small. Accordingly, the position estimation error may be very large in the prior art, when the S/N ratios of the respective samples of the current response are small.

In order to suppress the position estimation error, the S/N ratios of the current response have to increase. To do this, the amplitude of the rotor-position estimation signal may be increased, or the noise may be reduced. However, an increasing of the amplitude of the rotor-position estimation signal is difficult, since the above-described undesired sound is large when the amplitude of the rotor-position estimation signal is large. On the other hand, in order to reduce the noise in the current response, the current response may be sufficiently attenuated through a low pass filter (LPF). Alternatively, a gain may be reduced in a process of calculating the correction of the estimated position from the position estimation error. However, these approaches may delay the estimation of the rotor position, thereby slowing down the response in the driving control of motor. Thus, in the prior art position-sensorless motor control, the control over the noise degrades the controllability over the motor. In other words, the prior art has low noise immunity.

BRIEF SUMMARY OF THE INVENTION

An object of the present invention is to provide a method and an apparatus for position-sensorless motor control for reducing an undesired sound and at the same time, increasing the S/N ratio of the detection of a current response to a rotor-position estimation signal without control delay, that is, having high noise immunity, especially when a rotor is at a stop and slowly revolves According to an aspect of the invention, a position-sensorless motor control method comprises the steps of:

(A) determining a target current vector of stator windings;

(B) setting one of a rotor-position estimation current signal and a rotor-position estimation voltage signal, with varying the period thereof;

(C) detecting currents flowing through the stator windings;

(D) carrying out one of
  (a) superimposing the rotor-position estimation current signal on a component of the target current vector in a first direction based on an estimated position ($\gamma$-axis direction, hereafter) of a rotor, thereby obtaining a target current vector with superimposed wave, and
  (b) superimposing the rotor-position estimation voltage signal on a component of a target voltage vector corresponding to the target current vector in the first direction, thereby obtaining a target voltage vector with superimposed wave;

(E) supplying electric power to the stator windings through a motor driving device on the basis of one of the target current vector with superimposed wave and the target voltage vector with superimposed wave;

(F) measuring a current response to one of the rotor-position estimation current signal and the rotor-position estimation voltage signal, from a component of a current vector in a second direction having a fixed relation with the first direction, the current vector representing the currents detected in the detecting step; and (G) correcting the $\gamma$-axis direction on the basis of the current response.

Each of the rotor-position estimation current signal and the rotor-position estimation voltage signal is generally referred to as a rotor-position estimation signal hereafter, when the distinction between both of the signals is unnecessary.

In the above-described method for position-sensorless motor control, which is hereafter referred to as sensorless control method, the period of the rotor-position estimation signal is not constant but varying. Accordingly, the vibration of the stator teeth and the like in synchronization with the rotor-position estimation signal does not have a constant frequency, and then, a sound caused by the vibration does not have a constant frequency. Therefore, the sound is prevented from growing too loud, since the vibration and the sound are not amplified owing to the varying of the frequency. Thus, the sensorless control reduces an undesired sound caused by the superimposing of the rotor-position estimation signal. Furthermore, the amplitude of the rotor-position estimation signal can be increased without a large undesired sound in contrast to the prior art.

In the sensorless control method, the period of the rotor-position estimation signal may vary at random. Then, the period of the rotor-position estimation signal has no correlation before and after the variation, thereby permitting a further reduction of the undesired sound.

In the sensorless control method, the period of the rotor-position estimation signal may vary on the basis of a predetermined table. When the values in the table are arranged in the order of the variation of the period of the rotor-position estimation signal, these values may be selected at random or in a manner that the difference between the values before and after the variation exceeds a predetermined value. Alternatively, the table may be a list of random numbers or predetermined parameters, and then, a simple operation using the table value may vary the period at random or in a manner that the difference exceeds a predetermined value. In each case of the above-described table value arrangement, the period of the rotor-position estimation signal may vary such as to reduce the undesired sound. In addition, the determination of the period of the rotor-position estimation signal is carried out by means of table reference and hence does not need a complicated operation, thereby reducing the operation time. As a result, loads on a CPU and similar devices in a control circuit are reduced.

According to another aspect of the invention, a position-sensorless motor control method comprises the steps of:

(A) determining a target current vector of stator windings;

(B) setting one of a rotor-position estimation current signal and a rotor-position estimation voltage signal, with varying the amplitude thereof;

(C) detecting currents flowing through the stator windings;

(D) carrying out one of
  (a) superimposing the rotor-position estimation current signal on a component of the target current vector in a first direction based on a $\gamma$-axis direction of a rotor, thereby obtaining a target current vector with superimposed wave, and
  (b) superimposing the rotor-position estimation voltage signal on a component of a target voltage vector corresponding to the target current vector in the first direction, thereby obtaining a target voltage vector with superimposed wave;

(E) supplying electric power to the stator windings through a motor driving device on the basis of one of the target current vector with superimposed wave and the target voltage vector with superimposed wave;

(F) measuring a current response to one of the rotor-position estimation current signal and the rotor-position estimation voltage signal, from a component of a current vector in a second direction having a fixed relation with the first direction, the current vector representing the currents detected in the detecting step; and (G) correcting the γ-axis direction on the basis of the current response.

In the above-described sensorless control method, the amplitude of the rotor-position estimation signal varies. In particular, the variation of the amplitude may correspond to the variation of the amplitudes of the currents flowing through the stator windings. By virtue of the correspondence, the amplitude of the rotor-position estimation signal can be controlled depending on the noise intensity in the currents of the stator windings, thereby being adjusted to a level not to degrade the S/N ratio of the current response detection. Accordingly, the amplitude of the current response to the rotor-position estimation signal is prevented from increasing to excess in comparison with the currents of the stator windings. As a result, the undesired sound caused by the superimposing of the rotor-position estimation signals is reduced in contrast to the prior art.

In the sensorless control method, when the amplitudes of the currents of the stator windings increase, the amplitude of the rotor-position estimation signal may be increased. The reason is as follows: The larger the amplitudes of the currents of the stator windings are, the larger a noise in the current response is. Accordingly, when the amplitudes of the currents of the stator windings increase, the amplitude of the rotor-position estimation signal is increased, thereby being prevent from increasing to excess in comparison with the currents of the stator windings. As a result, in the driving control of the motor, the undesired sound caused by the superimposing of the rotor-position estimation signal is reduced as a whole, in contrast to the prior art. At the same time, the S/N ratio of the current response detection is maintained at a sufficiently high level.

In the sensorless control method, either the detected currents of the stator windings or the target currents thereof may determine the increasing of the currents of the stator windings.

According to still another aspect of the invention, a position-sensorless motor control method comprises the steps of:

(A) determining a target current vector of stator windings;

(B) setting one of a rotor-position estimation current signal and a rotor-position estimation voltage signal, with a predetermined period;

(C) detecting currents flowing through the stator windings;

(D) carrying out one of
  (a) superimposing the rotor-position estimation current signal on a component of the target current vector in a first direction based on a γ-axis direction of a rotor, thereby obtaining a target current vector with superimposed wave, and
  (b) superimposing the rotor-position estimation voltage signal on a component of a target voltage vector corresponding to the target current vector in the first direction, thereby obtaining a target voltage vector with superimposed wave;

(E) supplying electric power to the stator windings through a motor driving device on the basis of one of the target current vector with superimposed wave and the target voltage vector with superimposed wave;

(F) measuring a current response to one of the rotor-position estimation current signal and the rotor-position estimation voltage signal, from a component of a current vector in a second direction having a fixed relation with the first direction through sampling at least three times in each period of one of the rotor-position estimation current signal and the rotor-position estimation voltage signal, the current vector representing the currents detected in the detecting step; and (G) correcting the γ-axis direction on the basis of the current response.

In the above-described sensorless control method, the number of the samples of the current response is large in contrast to the prior art, in which the current response is sampled at each half period of the rotor-position estimation signal. A large number of the samples improve the S/N ratio of the current response detection in contrast to the prior art.

The sampling of the current response may be carried out plural times in each half period of the rotor-position estimation signal. Then, a larger number of the samples of the current response are obtained. Furthermore, especially when the waveform of the rotor-position estimation signal is symmetric with respect to the middle point between the former half and the latter half of the period, the positions of the sampling can be arranged symmetrically with respect to the middle point between the former half and the latter half of the period of the current response. Using this symmetry, noises in the samples of the current response can be canceled out between the mutually corresponding samples through, for example, averaging with each other. The cancellation improves the S/N ratio of the current response detection.

According to a further aspect of the invention, a position-sensorless motor control method comprises the steps of:

(A) determining a target current vector of stator windings;

(B) setting one of a rotor-position estimation current signal and a rotor-position estimation voltage signal, wherein (a) the period thereof is an even multiple of a carrier period of PWM and (b) the waveform thereof is symmetric with respect to the middle point between the former half and the latter half of the period;

(C) detecting currents flowing through the stator windings;

(D) carrying out one of
  (a) superimposing the rotor-position estimation current signal on a component of the target current vector in a first direction based on a γ-axis direction of a rotor, thereby obtaining a target current vector with superimposed wave, and
  (b) superimposing the rotor-position estimation voltage signal on a component of a target voltage vector corresponding to the target current vector in the first direction, thereby obtaining a target voltage vector with superimposed wave;

(E) (a) modulating target voltages through the PWM, the target voltages represented by one of a target voltage vector corresponding to the target current vector with superimposed wave and the target voltage vector with superimposed wave, and (b) applying the modulated target voltages across the stator windings through a motor driving device;

(F) measuring a current response to one of the rotor-position estimation current signal and the rotor-position estimation voltage signal, from a component of a current vector in a second direction having a fixed relation with the first direction, on the basis of the symmetric waveform of one of the rotor-position estimation current signal and the rotor-position estimation voltage signal, the current vector representing the currents detected in the detecting step; and (G) correcting the γ-axis direction on the basis of the current response.

When a motor driver comprises, for example, an inverter, thereby performing a PWM control, the waveforms of the currents flowing through the stator windings generally have a distortion with a period substantially equal to the PWM carrier period in comparison with the ideally smooth waveforms. Similarly, the waveform of the current response to the rotor-position estimation signal also has a distortion with a period substantially equal to the PWM carrier period. In the above-described sensorless control method, the period of the rotor-position estimation signal is an even multiple of the PWM carrier period and the waveform thereof is symmetric with respect to the middle point between the former half and the latter half of the period. Accordingly, the distortion in the waveform of the rotor-position estimation signal is substantially symmetric with respect to the middle point between the former half and the latter half of a period. Therefore, the waveform of the current response with the distortion caused by the PWM has similar symmetry. Using this symmetry, the current response detecting error caused by the above-described distortion can be reduced. For example, the sampling of the current response is carried out symmetrically with respect to the middle point between the former half and the latter half of the period. More specifically, for a constant sampling frequency, the frequency of the rotor-position estimation signal is set to be an even multiple of the sampling frequency, and the sampling positions are arranged symmetrically with respect to the middle point of one period of the rotor-position estimation signal. Then, noises in the samples can be canceled out between the samples at the mutually symmetric positions through, for example, averaging with each other.

A PWM control by the motor driver is implemented in each of the sensorless control methods according to the above-described aspects of the invention, as follows:

(A) (a) the period of one of the rotor-position estimation current signal and the rotor-position estimation voltage signal is set to be an even multiple of a carrier period of PWM and (b) the waveform thereof is set symmetrically with respect to the middle point between the former half and the latter half of the period;

(B) target voltages are modulated through the PWM, the target voltages represented by one of a target voltage vector corresponding to the target current vector with superimposed wave and the target voltage vector with superimposed wave, and the modulated target voltages are applied across the stator windings through the motor driving device; and (C) the current response is measured on the basis of the symmetric waveform of one of the rotor-position estimation current signal and the rotor-position estimation voltage signal.

Thus, each of the sensorless control methods according to the above-described aspects of the invention is applicable when the motor driver performs the PWM control.

According to a still further aspect of the invention, a position-sensorless motor control method comprises the steps of:

(A) determining a target current vector of stator windings;

(B) setting one of a rotor-position estimation current signal and a rotor-position estimation voltage signal, with a predetermined period;

(C) detecting currents flowing through the stator windings;

(D) carrying out one of (a) superimposing the rotor-position estimation current signal on a component of the target current vector in a first direction based on a γ-axis direction of a rotor, thereby obtaining a target current vector with superimposed wave, and (b) superimposing the rotor-position estimation voltage signal on a component of a target voltage vector corresponding to the target current vector in the first direction, thereby obtaining a target voltage vector with superimposed wave;

(E) supplying electric power to the stator windings through a motor driving device on the basis of one of the target current vector with superimposed wave and the target voltage vector with superimposed wave;

(F) (a) multiplying a component of a current vector in a second direction orthogonal to the first direction in terms of electric angle by a signal, the current vector representing the currents detected in the detecting step, the signal having (1) a period substantially equal to the period of one of the rotor-position estimation current signal and the rotor-position estimation voltage signal, and (2) a phase substantially shifted by 90° in terms of electric angle from one of the rotor-position estimation current signal and the rotor-position estimation voltage signal, and (b) measuring a current response to one of the rotor-position estimation current signal and the rotor-position estimation voltage signal from the result of the multiplication; and (G) correcting the γ-axis direction on the basis of the current response.

The current response has a period equal to that of the rotor-position estimation signal and a phase shifted by 90° from the signal, in the second direction, namely, the orthogonal direction in terms of electric angle to the direction of the superimposing of the rotor-position estimation signal. Accordingly, the currents flowing through the stator windings are detected, and the second direction component of a current vector, which represents the detected currents, is multiplied by the above-described signal. Then, the current response can be measured from the result of the multiplication.

For example, when the rotor-position estimation signal is a sinusoidal wave, the above-described result of the multiplication is integrated over one period of the rotor-position estimation signal. Then, a Fourier coefficient corresponding to the period of the rotor-position estimation signal is obtained among the Fourier coefficients contained in the second direction component of the current vector, which represents the detected currents flowing through the stator windings. The Fourier coefficient is substantially equal to the amplitude of the current response. Furthermore, noises in the detected currents of the stator windings are suppressed through the integration, whereby the error is reduced in the amplitude of the current response in contrast to the prior art.

According to another aspect of the invention different from the above-described aspect, a position-sensorless motor control method comprises the steps of:

(A) determining a target current vector of stator windings;

(B) setting one of a rotor-position estimation current signal and a rotor-position estimation voltage signal;

(C) detecting currents flowing through the stator windings;

(D) carrying out one of (a) superimposing the rotor-position estimation current signal on a component of the target current vector in a first direction based on a γ-axis direction of a rotor, thereby obtaining a target current vector with superimposed wave, and (b) superimposing the rotor-position estimation voltage signal on a component of a target voltage vector corresponding to the target current vector in the first direction, thereby obtaining a target voltage vector with superimposed wave;

(E) supplying electric power to the stator windings through a motor driving device on the basis of one of the target current vector with superimposed wave and the target voltage vector with superimposed wave;

(F) measuring a current response to one of the rotor-position estimation current signal and the rotor-position estimation voltage signal, from a component of a current vector in a second direction having a fixed relation with the first direction, the current vector representing the currents detected in the detecting step;

(G) limiting a value of the current response; and (H) correcting the γ-axis direction on the basis of the current response with the value limited in the limiting step.

The current response may abruptly enlarge because of a noise therein. Then, the limiter limits the current response. Accordingly, a detection of an excessively large current response is prevented from disturbing the driving control of the motor.

The larger the current response is, the larger the detecting error thereof is. Accordingly, when the current response exceeds a certain level, the estimated rotor position is replaced with a constant value, instead of the correction of the estimated rotor position on the basis of the detected value of the current response. As a result, the estimation error is reduced as a whole.

In the above-described sensorless control methods according to the invention, preferably, (a) the first direction is one of the γ-axis direction and a direction substantially shifted by 90° in terms of electric angle from the γ-axis direction; (b) the second direction is a direction substantially shifted by 90° in terms of electric angle from the first direction; and (c) the γ-axis direction is corrected so that the current response in the second direction substantially converges to zero.

For example, the amplitude of the current response in the δ-axis direction component of the current vector, which represents the detected currents of the stator windings, is substantially proportional to sin (2Δθ), when the rotor-position estimation current/voltage signal is superimposed on the γ-axis direction component of the target current/voltage vector. Here, the position estimation error of the rotor in the d-axis direction, namely, the deviation of the γ-axis direction from the d-axis direction is denoted by Δθ. Accordingly, the γ-axis direction may be controlled so as to coincide with the d-axis direction, if the amplitude of the current response is controlled so as to shrink to zero in the δ-axis direction.

According to an aspect of the invention, a position-sensorless motor control apparatus comprises:

(A) a motor controlling section for determining a target current vector of stator windings;

(B) a superimposed wave generating section for setting one of a rotor-position estimation current signal and a rotor-position estimation voltage signal, with varying the period thereof;

(C) current detecting devices for detecting currents flowing through the stator windings;

(D) a current controlling section for carrying out one of (a) superimposing the rotor-position estimation current signal on a component of the target current vector in a first direction based on a γ-axis direction of a rotor, thereby obtaining a target current vector with superimposed wave, and further calculating a corresponding target voltage vector; and (b) a current controlling section for superimposing the rotor-position estimation voltage signal on a component of a target voltage vector corresponding to the target current vector in the first direction, thereby obtaining a target voltage vector with superimposed wave;

(E) a motor driving device for supplying electric power to the stator windings on the basis of one of the target voltage vector corresponding to the target current vector with superimposed wave and the target voltage vector with superimposed wave; and (F) a rotor-position estimating section for (a) measuring a current response to one of the rotor-position estimation current signal and the rotor-position estimation voltage signal, from a component of a current vector in a second direction having a fixed relation with the first direction, the current vector representing the currents detected by the current detecting devices, and (b) correcting the γ-axis direction on the basis of the current response.

In the above-described apparatus for position-sensorless motor control, which is hereafter referred to as sensorless control apparatus, the period of the rotor-position estimation signal is not constant but varying. Accordingly, a vibration of the stator teeth and the like in synchronization with the rotor-position estimation signal does not have a constant frequency, and then, a sound caused by the vibration does not have a constant frequency. Therefore, the sound is prevented from growing too loud, since the vibration and the sound are not amplified owing to the varying of the frequency. Thus, the sensorless control reduces an undesired sound caused by the superimposing of the rotor-position estimation signal. Furthermore, the amplitude of the rotor-position estimation signal can be increased without a large undesired sound in contrast to the prior art.

In the sensorless control apparatus, the superimposed wave generating section may vary the period of the rotor-position estimation signal at random. Then, the period of the rotor-position estimation signal has no correlation before and after the variation, thereby permitting a further reduction in the undesired sound.

In the sensorless control apparatus, the superimposed wave generating section may comprise a memory storing a predetermined table, whereby the period of the rotor-position estimation signal may vary on the basis of the table. When the values in the table are arranged in the order of the variation of the period of the rotor-position estimation signal, these values may be selected at random or in a manner that the difference between the values before and after the variation exceeds a predetermined value. Alternatively, the table may be a list of random numbers or predetermined parameters. Then, by a simple operation using the table value, the period may vary at random or in a manner that the difference exceeds a predetermined value. In each case of the above-described table value arrangement, the period of the rotor-position estimation signal may vary such as to reduce the undesired sound. In addition, the determination of the period of the rotor-position estimation signal is carried out by means of table reference and hence does not need a complicated operation, thereby reducing the operation time. As a result, loads on a CPU and similar devices in a control circuit are reduced.

According to another aspect of the invention, a position-sensorless motor control apparatus comprises:

(A) a motor controlling section for determining a target current vector of stator windings;

(B) a superimposed wave generating section for setting one of a rotor-position estimation current signal and a rotor-position estimation voltage signal, with varying the amplitude thereof;

(C) current detecting devices for detecting currents flowing through the stator windings;

(D) a current controlling section for carrying out one of
(a) superimposing the rotor-position estimation current signal on a component of the target current vector in a first direction based on a γ-axis direction of a rotor, thereby obtaining a target current vector with superimposed wave, and further calculating a corresponding target voltage vector, and
(b) superimposing the rotor-position estimation voltage signal on a component of a target voltage vector corresponding to the target current vector in the first direction, thereby obtaining a target voltage vector with superimposed wave;
(E) a motor driving device for supplying electric power to the stator windings on the basis of one of the target voltage vector corresponding to the target current vector with superimposed wave and the target voltage vector with superimposed wave; and
(F) a rotor-position estimating section for
(a) measuring a current response to one of the rotor-position estimation current signal and the rotor-position estimation voltage signal, from a component of a current vector in a second direction having a fixed relation with the first direction, the current vector representing the currents detected by the current detecting devices, and
(b) correcting the γ-axis direction on the basis of the current response.

In the above-described sensorless control apparatus, the amplitude of the rotor-position estimation signal varies. In particular, the variation of the amplitude may correspond to the variation of the amplitudes of the currents flowing through the stator windings. By virtue of the correspondence, the amplitude of the rotor-position estimation signal can be controlled depending on the noise intensity in the currents of the stator windings, thereby being adjusted to a level not to degrade the S/N ratio of the current response detection. Accordingly, the amplitude of the current response to the rotor-position estimation signal is prevented from increasing to excess in comparison with the currents of the stator windings. As a result, an undesired sound caused by the superimposing of the rotor-position estimation signals is reduced in contrast to the prior art.

In the sensorless control apparatus, when the amplitudes of the currents of the stator windings increase, the superimposed wave generating section may increase the amplitude of the rotor-position estimation signal. The reason is as follows: The larger the amplitudes of the currents of the stator windings are, the larger a noise in the current response is. Accordingly, when the amplitudes of the currents of the stator windings increase, the amplitude of the rotor-position estimation signal is increased. As a result, in the driving control of the motor, the undesired sound caused by the superimposing of the rotor-position estimation signal is reduced as a whole, in contrast to the prior art. At the same time, the S/N ratio of the current response detection is maintained at a sufficiently high level.

In the above-described sensorless control apparatus, either the detected currents of the stator windings or the target currents thereof may determine the increasing of the currents of the stator windings.

According to still another aspect of the invention, a position-sensorless motor control apparatus comprises:
(A) a motor controlling section for determining a target current vector of stator windings;
(B) a superimposed wave generating section for setting one of a rotor-position estimation current signal and a rotor-position estimation voltage signal, with a predetermined period;
(C) current detecting devices for detecting currents flowing through the stator windings;
(D) a current controlling section for carrying out one of
(a) superimposing the rotor-position estimation current signal on a component of the target current vector in a first direction based on a γ-axis direction of a rotor, thereby obtaining a target current vector with superimposed wave, and further calculating a corresponding target voltage vector, and
(b) superimposing the rotor-position estimation voltage signal on a component of a target voltage vector corresponding to the target current vector in the first direction, thereby obtaining a target voltage vector with superimposed wave;
(E) a motor driving device for supplying electric power to the stator windings on the basis of one of the target voltage vector corresponding to the target current vector with superimposed wave and the target voltage vector with superimposed wave; and
(F) a rotor-position estimating section for
(a) measuring a current response to one of the rotor-position estimation current signal and the rotor-position estimation voltage signal, from a component of a current vector in a second direction having a fixed relation with the first direction through sampling at least three times in each period of one of the rotor-position estimation current signal and the rotor-position estimation voltage signal, the current vector representing the currents detected by the current detecting devices, and
(b) correcting the γ-axis direction on the basis of the current response.

In the sensorless control apparatus, the number of the samples of the current response is larger in contrast to the prior art, in which the current response is sampled at each half period of the rotor-position estimation signal. A large number of the samples improve the S/N ratio of the current response detection in contrast to the prior art.

The rotor-position estimating section may sample the current response plural times in each half period of the rotor-position estimation signal. Then, a larger number of the samples of the current response are obtained. Furthermore, especially when the waveform of the rotor-position estimation signal is symmetric with respect to the middle point between the former half and the latter half of the period, the positions of the sampling can be arranged symmetrically with respect to the middle point between the former half and the latter half of the period of the current response. Using this symmetry, noises in the samples of the current response can be canceled out between the mutually corresponding samples through, for example, averaging with each other. The cancellation improves the S/N ratio of the current response detection.

According to a further aspect of the invention, a position-sensorless motor control apparatus comprises:
(A) a motor controlling section determining a target current vector of stator windings;
(B) a superimposed wave generating section for setting one of a rotor-position estimation current signal and a rotor-position estimation voltage signal, with the period thereof being an even multiple of the carrier period of PWM and the waveform thereof symmetric with respect to the middle point between the former half and the latter half of the period;
(C) current detecting devices for detecting currents flowing through the stator windings;
(D) a current controlling section for carrying out one of (a) superimposing the rotor-position estimation current signal on a component of the target current vector in a first direction based on a γ-axis direction of a rotor, thereby obtaining a target current vector with superimposed wave, and further calculating a corresponding target voltage vector, and (b) superimposing the rotor-position estimation voltage signal on a component of a target voltage vector corresponding to the target current vector in the first direction, thereby obtaining a target voltage vector with superimposed wave;

(E) a motor driving device for modulating target voltages through the PWM, the target voltages represented by one of the target voltage vector corresponding to the target current vector with superimposed wave and the target voltage vector with superimposed wave, and applying the modulated target voltages across the stator windings; and (F) a rotor-position estimating section for (a) measuring a current response to one of the rotor-position estimation current signal and the rotor-position estimation voltage signal, from a component of a current vector in a second direction having a fixed relation with the first direction, on the basis of the symmetric waveform of one of the rotor-position estimation current signal and the rotor-position estimation voltage signal, the current vector representing the currents detected by the current detecting devices, and (b) correcting the γ-axis direction on the basis of the current response.

A motor driving device comprises, for example, an inverter, thereby performing a PWM control. In the PWM control, the waveforms of the currents flowing through the stator windings generally have a distortion with a period substantially equal to the PWM carrier period in comparison with the ideally smooth waveforms. Similarly, the waveform of the current response to the rotor-position estimation signal also has a distortion with a period substantially equal to the PWM carrier period. In the above-described sensorless control apparatus, the superimposed wave generating section sets the period of the rotor-position estimation signal to be an even multiple of the PWM carrier period, and the waveform thereof to be symmetric with respect to the middle point between the former half and the latter half of the period. Accordingly, the distortion in the waveform of the rotor-position estimation signal is substantially symmetric with respect to the middle point between the former half and the latter half of a period. Therefore, the waveform of the current response with the distortion caused by the PWM has similar symmetry. Using this symmetry, the rotor-position estimating section reduces the current response detecting error caused by the above-described distortion. For example, the section carries out the sampling of the current response symmetrically with respect to the middle point between the former half and the latter half of the period. More specifically, for a constant sampling frequency, the section sets the frequency of the rotor-position estimation signal to be an even multiple of the sampling frequency, and arranges the sampling positions symmetrically with respect to the middle point of one period of the rotor-position estimation signal. Then, the section can canceled out noises in the samples between the samples in the mutually symmetric positions through, for example, averaging with each other.

A PWM control by a motor driving device can be implemented in each of the sensorless control apparatus according to the above-described aspects of the invention, as follows:

(A) the superimposed wave generating section sets (a) the period of one of the rotor-position estimation current signal and the rotor-position estimation voltage signal to be an even multiple of the carrier period of PWM, and (b) the waveform thereof to be symmetric with respect to the middle point between the former half and the latter half of the period;

(B) the motor driving device modulates target voltages through the PWM, the target voltages represented by one of the target voltage vector corresponding to the target current vector with superimposed wave and the target voltage vector with superimposed wave, and applies the modulated target voltages across the stator windings; and (C) the rotor-position estimating section measures the current response on the basis of the symmetric waveform of one of the rotor-position estimation current signal and the rotor-position estimation voltage signal.

Thus, the motor driving device can perform the PWM control in each of the sensorless control apparatus according to the above-described aspects of the invention.

According to a still further aspect of the invention, a position-sensorless motor control apparatus comprises:

(A) a motor controlling section for determining a target current vector of stator windings;

(B) a superimposed wave generating section for setting one of a rotor-position estimation current signal and a rotor-position estimation voltage signal, with a predetermined period;

(C) current detecting devices for detecting currents flowing through the stator windings;

(D) a current controlling section for carrying out one of (a) superimposing the rotor-position estimation current signal on a component of the target current vector in a first direction based on a γ-axis direction of a rotor, thereby obtaining a target current vector with superimposed wave, and calculating a corresponding target voltage vector, and (b) superimposing the rotor-position estimation voltage signal on a component of a target voltage vector corresponding to the target current vector in the first direction, thereby obtaining a target voltage vector with superimposed wave;

(E) a motor driving device for supplying electric power to the stator windings on the basis of one of the target voltage vector corresponding to the target current vector with superimposed wave and the target voltage vector with superimposed wave; and (F) a rotor-position estimating section for (a) multiplying a component of a current vector in a second direction orthogonal to the first direction in terms of electric angle by a signal, the current vector representing the currents detected by the current detecting devices, the signal having (1) a period substantially equal to the period of one of the rotor-position estimation current signal and the rotor-position estimation voltage signal, and (2) a phase substantially shifted by 90° in terms of electric angle from one of the rotor-position estimation current signal and the rotor-position estimation voltage signal, (b) measuring a current response to one of the rotor-position estimation current signal and the rotor-position estimation voltage signal, from the result of the multiplication, and (c) correcting the γ-axis direction on the basis of the current response.

The current response has a period equal to that of the rotor-position estimation signal and a phase shifted by 90° from the signal in the second direction, namely, the orthogonal direction in terms of electric angle to the direction of the superimposing of the rotor-position estimation signal. Accordingly, the currents flowing through the stator windings are detected, and the second direction component of a current vector, which represents the detected currents, is multiplied by the above-described signal. Then, the current response can be measured from the result of the multiplication.

For example, when the rotor-position estimation signal is a sinusoidal wave, the above-described result of the multiplication is integrated over one period of the rotor-position estimation signal. Then, a Fourier coefficient corresponding to the period of the rotor-position estimation signal is obtained among the Fourier coefficients contained in the second direction component of the current vector, which represents the detected currents flowing through the stator windings. The Fourier coefficient is substantially equal to the amplitude of the current response. Furthermore, noise in the detected currents of the stator windings is suppressed through the integration, whereby the error is reduced in the amplitude of the current response in contrast to the prior art.

According to another aspect of the invention, a position-sensorless motor control apparatus comprises:

(A) a motor controlling section for determining a target current vector of stator windings;

(B) a superimposed wave generating section for setting one of a rotor-position estimation current signal and a rotor-position estimation voltage signal;

(C) current detecting devices for detecting currents flowing through the stator windings;

(D) a current controlling section for carrying out one of
(a) superimposing the rotor-position estimation current signal on a component of the target current vector in a first direction based on a γ-axis direction of a rotor, thereby obtaining a target current vector with superimposed wave, and further calculating a corresponding target voltage vector, and
(b) superimposing the rotor-position estimation voltage signal on a component of a target voltage vector corresponding to the target current vector in the first direction, thereby obtaining a target voltage vector with superimposed wave;

(E) a motor driving device for supplying electric power to the stator windings on the basis of one of the target voltage vector corresponding to the target current vector with superimposed wave and the target voltages with superimposed wave; and (F) a rotor-position estimating section having a limiter, the rotor-position estimating section for
(a) measuring a current response to one of the rotor-position estimation current signal and the rotor-position estimation voltage signal, from a component of a current vector in a second direction having a fixed relation with the first direction,
(b) limiting a value of the current response using the limiter, and
(c) correcting the γ-axis direction on the basis of the current response with the value limited by the limiter.

The current response may abruptly enlarge because of a noise therein. Then, the limiter limits the current response. Accordingly, a detection of an excessively large current response is prevented from disturbing the driving control of the motor.

The larger the current response is, the larger the detecting error thereof is. Accordingly, when the current response exceeds a certain level, the estimated rotor position is replaced with a constant value, instead of the correction of the estimated rotor position on the basis of the detected value of the current response. As a result, the estimation error is reduced as a whole.

In the above described sensorless control apparatus according to the invention:

(A) the current controlling section sets the first direction to be one of the γ-axis direction and a direction substantially shifted by 90° in terms of electric angle from the γ-axis direction; and (B) the rotor-position estimating section sets the second direction to be a direction substantially shifted by 90° in terms of electric angle from the first direction, and corrects the γ-axis direction so that the current response in the second direction substantially converges to zero.

For example, the amplitude of the current response in the δ-axis direction component of the current vector, which represents the detected currents of the stator windings, is substantially proportional to $\sin(2\Delta\theta)$, when the rotor-position estimation current/voltage signal is superimposed on the γ-axis direction component of the target current/voltage vector. Here, the position estimation error of the rotor in the d-axis direction, namely, the deviation of the γ-axis direction from the d-axis direction is denoted by $\Delta\theta$. Accordingly, the δ-axis direction may be controlled so as to coincide with the d-axis direction, if the amplitude of the current response is controlled so as to shrink to zero in the δ-axis direction.

An electric vehicle according to the invention comprises a wheel driving motor with an above-described position-sensorless motor control apparatus according to the invention. Large sound caused by the wheel driving motor is undesired since it makes persons in the cabin uncomfortable. Furthermore, delay in the driving control of the wheel driving motor is undesired since it degrades the running performance of the electric vehicle. As described above, the sensorless control apparatus according to the invention can reduce the undesired sound with maintaining the driving controllability, especially when the wheel driving motor is at start up and slowly runs. Accordingly, in the above-described electric vehicle at starting and in slow moving, the driving control of the wheel driving motor is smooth, and the undesired sound is soft. Thus, the electric vehicle makes persons in the cabin comfortable during the running.

A fan according to the invention comprises a fan driving motor with an above-described position-sensorless motor control apparatus according to the invention. Large sound caused by the fan of a ventilator is, for example, undesired since it makes persons in a room uncomfortable under ventilation. Furthermore, delay in the driving control of the fan driving motor is undesired since it degrades the ventilation performance. As described above, the sensorless control apparatus according to the invention can reduce the undesired sound with maintaining the drive controllability, especially when the fan driving motor is at start up and slowly runs. Accordingly, in the above-described fan, the driving control of the fan driving motor is smooth, and the undesired sound is soft. Thus, the fan used in a ventilator, for example, is prevented from making persons in the room uncomfortable under ventilation.

A refrigerator according to the invention comprises a compressor with an above-described position-sensorless motor control apparatus according to the invention. Large sound caused by the compressor of the refrigerator is undesired especially at bedtime. Furthermore, delay in the driving control of the compressor is undesired since it degrades the cooling performance of the refrigerator. As described above, the sensorless control apparatus according to the invention can reduce the undesired sound with maintaining the drive controllability, especially when the compressor is at start up and slowly runs. Accordingly, in the above-described refrigerator at starting and in normal driving, the driving control of the compressor is smooth and the undesired sound is soft. Thus, the refrigerator is prevented from, for example, disturbing comfortable sleep in home at night.

An air conditioner according to the invention comprises a compressor provided with an above-described position-sensorless motor control apparatus according to the invention. Large sound generated by the compressor of the air conditioner is undesired since it makes persons in a room and the neighbors outside the room uncomfortable. Furthermore, delay in the driving control of the compressor is undesired since it degrades the air-conditioning performance of the air conditioner. As described above, the sensorless control apparatus according to the invention can reduce the undesired sound with maintaining the drive controllability especially when the compressor is at start up and slowly runs. Accordingly, in the above-described air conditioner, at starting and in normal driving, the driving control of the compressor is smooth and the undesired sound is soft. Thus, the air conditioner is prevented from making persons in the room and the neighbors outside the room uncomfortable.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

The following is an explanation of preferred examples with regard to the preferred embodiment of the invention.

EXAMPLE 1

[Configuration of Apparatus According to Example 1]

Figure 1:
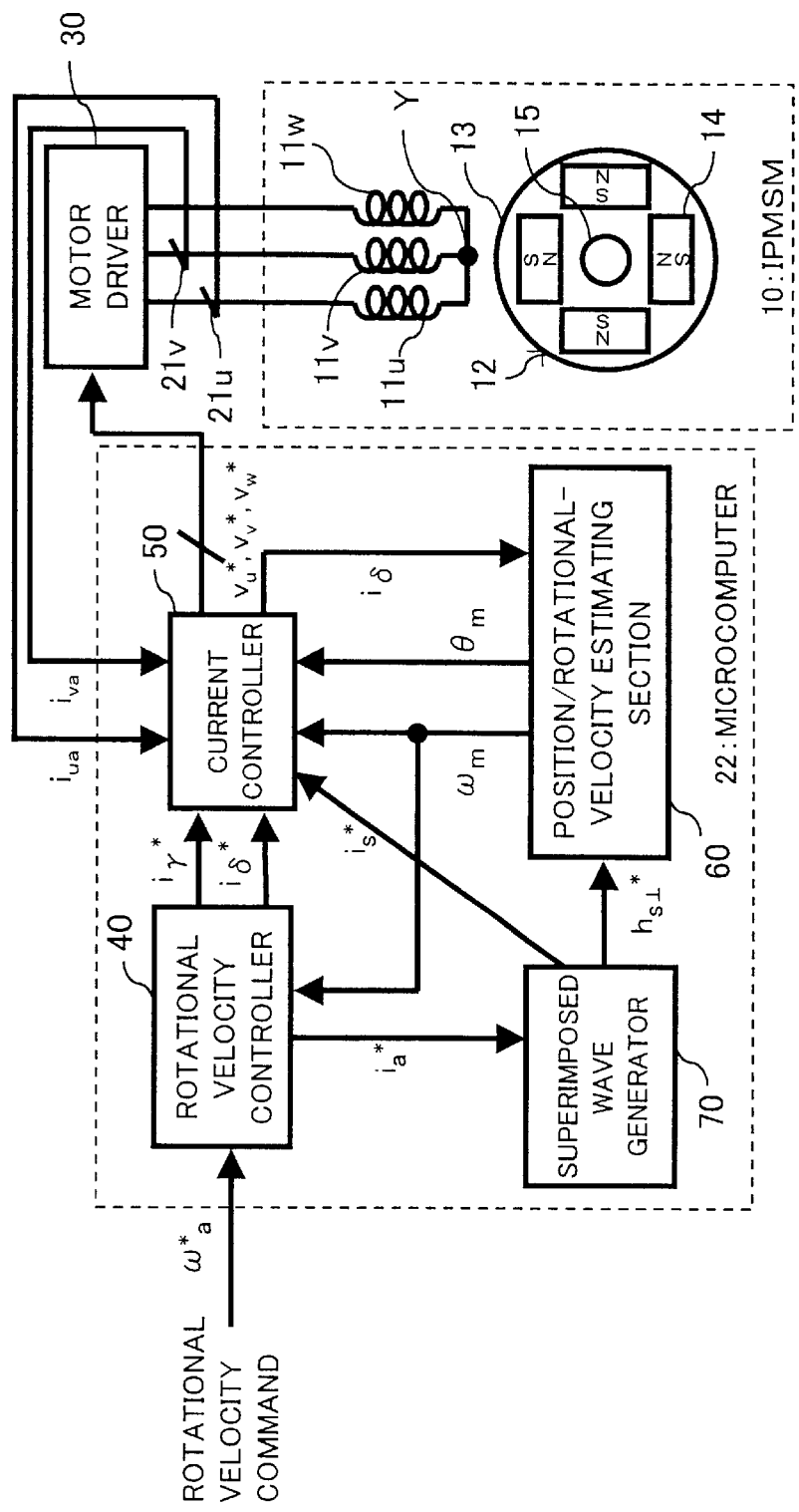
FIG. 1 is a block diagram showing the configuration of a position-sensorless motor control apparatus according to Example 1 of the invention.

FIG. 1 is a block diagram showing the configuration of a position-sensorless motor control apparatus according to Example 1.

The controlled object of the position-sensorless motor control apparatus according to Example 1 is an IPMSM (interior permanent magnet synchronous motor) 10. The IPMSM 10 comprises a stator (not shown), stator windings, and a rotor 12. The stator comprises a substantial cylinder composed of magnetic steel. The stator windings consist of a u-phase winding 11u, a v-phase winding 11v, and a w-phase winding 11w, each being composed of a covered copper wire wound around the stator. The rotor 12 is rod-shaped and arranged coaxially inside the stator.

One end of each of the stator windings 11u, 11v, and 11w is connected to a common end Y, thereby constituting a star connection. When currents flow through the stator windings 11u, 11v, and 11w, four magnetic poles are formed in the stator. Here, the magnetic pole denotes a part of the stator where the magnetic field generated by the currents concentrates. These magnetic poles are hereafter referred to as the stator magnetic poles, while the number of stator magnetic poles is referred to as the pole number of stator windings.

The pole number of stator windings is necessarily an even number, since the stator magnetic poles are composed of a plurality of pairs of N-pole and S-pole. In the IPMSM 10, stator magnetic poles appear in a plane perpendicular to the center axis of the rotor 12, in equal spacing around the center axis of the rotor 12.

The rotor 12 comprises: a rotor yoke 13 composed of a magnetic steel rod; four permanent magnets 14 embedded therein; and a shaft 15 coaxially fixed to the rotor yoke 13. The rotor 12 is supported at both ends of the shaft 15 and rotatable around the center axis thereof. The four permanent magnets, 14 are inserted into axial-directional grooves inside the rotor yoke 13. The center axis directions of the magnetic poles of the permanent magnets 14 each intersect the center axis of the shaft 15 in a cross section of the rotor yoke 13, and distribute substantially in equal spacing in the circumferential direction in the cross section of the rotor yoke 13. The orientations of the permanent magnets 14 are set such that the adjacent magnetic poles have opposite polarity to each other on the surface of the rotor 12. Generally, the number of magnetic poles appearing on a rotor surface is referred to as a magnetic pole number of rotor. The magnetic pole number of rotor is an even number and equal to a pole number of stator windings for a synchronous motor.

When currents flow through the stator windings 11u, 11v, and 11w, a magnetic field is generated inside the stator and in the periphery. The magnetic field interacts with the magnetic field of the permanent magnets 14. The interaction generates a torque onto the rotor 12, thereby rotating the rotor 12. With periodically varying the currents, the magnetic poles of the stator revolve around the center axis of the rotor 12 at a predetermined rotational velocity. Then, by the above-described torque, the rotor 12 revolves at a rotational velocity equal to that of the rotating field generated by the currents flowing through the stator windings.

The position-sensorless motor control apparatus according to Example 1 comprises: two current sensors 21u and 22v, a microcomputer or a microprocessor 22, and a motor driver 30.

Each of the u-phase current sensor 21u and the v-phase current sensor 21v comprises a Hall current detector. The Hall current detector includes a Hall device, which is a semiconductor magnetoelectric converting device. The detector converts the information on strength of an outer magnetic field into an electric signal, and outputs the signal. The u-phase current sensor 21u detects the strength of the magnetic field generated around the stator winding 11u by the u-phase current. The information on the detected strength of the magnetic field is temporarily converted into a voltage signal. The voltage signal is further processed by an electric circuit in the u-phase current sensor 21u, thereby being output as an analog u-phase current value signal [$i_{ua}$]. Here, the analog u-phase current value signal [$i_{ua}$] is an analog signal indicating an analog value $i_{ua}$ of the u-phase current. In the present specification, the parameter representing a signal value, for example, A, is indicated by adding square brackets, for example, [A]. Similarly, the v-phase current sensor 21v outputs an analog v-phase current value signal [$i_{va}$]. The analog v-phase current value signal [$i_{va}$] is an analog signal indicating an analog value $i_{va}$ of the v-phase current. The detection errors in the u-phase current sensor 21u and the v-phase current sensor 21v are approximately 1% each.

The microcomputer 22 inputs the analog u-phase current value signal [$i_{ua}$], the analog v-phase current value signal [$i_{va}$], and an analog rotational velocity command [$\omega^*_a$], and processes the signals and the command in a manner described later, thereby outputting a target u-phase voltage $v_u^*$, a target v-phase voltage $v_v$, and a target w-phase voltage $v_w^*$.

The motor driver 30 inputs the target u-phase voltage $V_u^*$, the target v-phase voltage $V_v^*$, and the target w-phase voltage $V_w^*$, thereby controlling the voltages applied across the stator windings 11u, 11v, and 11w. Thus, the currents flowing through the stator windings 11u, 11v, and 11w are controlled.

The following is the description of the configuration and the operation of each component in Example 1.

[Configuration of Motor Driver 30]

Figure 2:
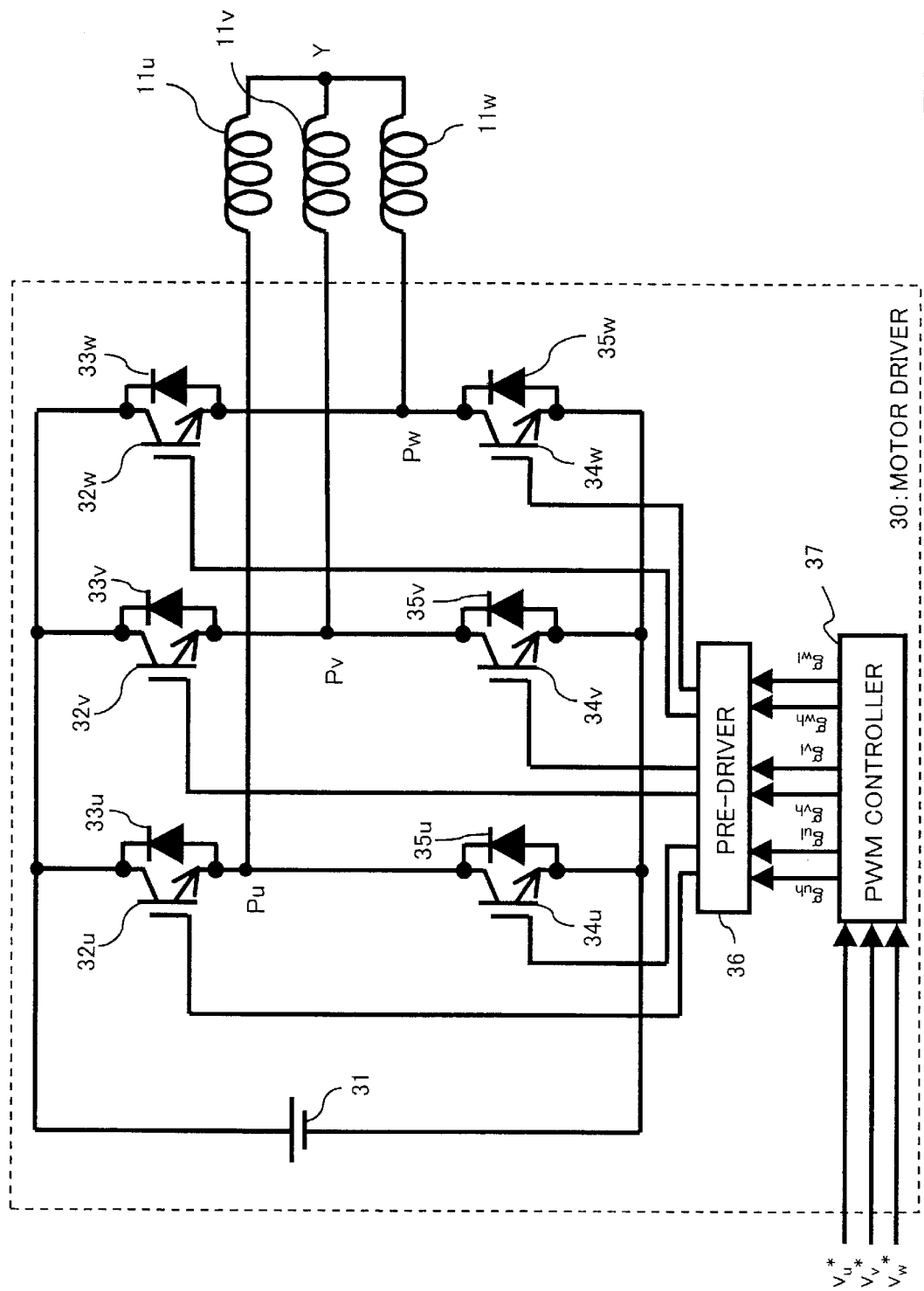
FIG. 2 is a block diagram showing the configuration of a motor driver 30 according to Example 1 of the invention.

FIG. 2 is a circuit diagram showing the configuration of a motor driver 30 according to Example 1. The motor driver 30 comprises: a DC power supply 31; upper IGBT's (insulated gate bipolar transistors) 32u, 32v, 32w; upper flywheel diodes 33u, 33v, 33w; lower IGBT's 34u, 34v, 34w; lower flywheel diodes 35u, 35v, 35w; a predrive device 36; and a PWM controller 37.

Each of the upper IGBT's 32u, 32v, 32w and the lower IGBT's 34u, 34v, 34w is preferably composed of an n-channel IGBT of the same type. Alternatively, each of these may be an MOS-FET or a bipolar transistor. One of the upper IGBT 32u, 32v, and 32w, and one of the lower IGBT 34u, 34v, and 34w, are interconnected in series, thereby being paired. More specifically, the emitter of the u-phase upper IGBT 32u and the collector of the u-phase lower IGBT 34u are interconnected at au-phase junction point Pu. Similarly, the emitter of the v-phase upper IGBT 32v and the collector of the v-phase lower IGBT 34v are interconnected at a v-phase junction point Pv, and the emitter of the w-phase upper IGBT 32w and the collector of the w-phase lower IGBT 34w are interconnected at a w-phase junction point Pw. The collectors of the upper IGBT's 32u, 32v, and 32w are connected to the positive electrode of a DC power supply 31, while the emitters of the lower IGBT's 34u, 34v, and 34w are connected to the negative electrode of the DC power supply 31.

The cathodes of the upper flywheel diodes 33u, 33v, 33w are connected to the emitters of the upper IGBT's 32u, 32v, and 32w, respectively, while the anodes of the upper flywheel diodes are each connected to the collectors of the upper IGBT's. The cathodes of the lower flywheel diodes 35u, 35v, and 35w are connected to the emitters of the lower IGBT's 34u, 34v, and 34w, respectively, while the anodes of the lower flywheel diodes are each connected to the collectors of the lower IGBT's. Each of the upper flywheel diodes 33u, 33v, and 33w and the lower flywheel diodes 35u, 35v, and 35w is preferably composed of the body diode of the connected IGBT. Alternatively, each of those may be a device separate from the connected IGBT.

The opposite ends of the stator windings 11u, 11v, and 11w to the common end Y are connected to the junction points Pu, Pv, and Pw, respectively.

The predrive device 36 is connected to the gates of the upper IGBT's 32u, 32v, 32w and the lower IGBT's 34u, 34v, 34w. The predrive device 36 inputs switching signals $g_{uh}$, $g_{ul}$, $g_{vh}$, $g_{vl}$, $g_{wh}$, and $g_{wl}$ from the outside, and controls the gate voltages of the IGBT's according to the switching signals as follows: Each of the switching signal $g_{uh}$, $g_{ul}$, $g_{vh}$, $g_{vl}$, $g_{wh}$, and $g_{wl}$ is a sequence of rectangular pulse waves, and has two potential levels of high H and low L. Furthermore, each switching signal has a constant switching frequency. For example, when the switching signal $g_{uh}$ for the upper u-phase IGBT is at high level H, the predrive device 36 raises the gate voltage of the upper IGBT 32u, thereby turning ON the upper IGBT 32$u$. On the contrary, when the switching signal $g_{uh}$ for the upper u-phase IGBT is at low level L, the predrive device 36 lowers the gate voltage of the upper IGBT 32$u$, thereby turning OFF the upper IGBT 32$u$. Similarly, the predrive device 36 controls the gate voltages of the upper v-phase IGBT 32$v$, the upper w-phase IGBT 32$w$, the lower u-phase IGBT 34$u$, the lower v-phase IGBT 34$v$, and the lower w-phase IGBT 34$w$, according to the switching signal $g_{vh}$, $g_{wh}$, $g_{ul}$, $g_{vl}$, and $g_{wl}$, respectively. That is, when the switching signal is at high level H, the predrive device 36 raises the gate voltage of the corresponding IGBT, thereby turning ON the IGBT. On the contrary, when the switching signal is at low-level L, the predrive device 36 lowers the gate voltage of the corresponding IGBT, thereby turning OFF the IGBT. The predrive device 36 is configured to avoid simultaneous raising of the gate voltages of an upper IGBT and a lower IGBT of the same phase. Accordingly, an upper IGBT and a lower IGBT of the same phase do not simultaneously turn ON.

The PWM controller 37 is a logic circuit for modulating the target u-phase voltage $v_u^*$, the target v-phase voltage $v_v^*$, and the target w-phase voltage $v_w^*$ by means of a PWM described later, thereby outputting the switching signals $g_{uh}$, $g_{ul}$, $g_{vh}$, $g_{vl}$, $g_{wh}$, and $g_{wl}$. The PWM controller 37 generates, as a PWM carrier, a triangular voltage signal having a frequency of approximately 15 kHz and an amplitude equal to that of the DC voltage 31. Here, the frequency is referred to as a carrier frequency. The carrier frequency corresponds to the switching frequencies of the switching signals $g_{uh}$, $g_{ul}$, $g_{vh}$, $g_{vl}$, $g_{wh}$, and $g_{wl}$. The PWM controller 37 compares the triangular wave with the target u-phase voltage $v_u^*$. When the target u-phase voltage $v_u^*$ is greater than the triangular wave, the PWM controller 37 determines the switching signal $g_{uh}$ for the upper u-phase IGBT 32$u$ to be high level H, and the switching signal $g_{ul}$ for the lower u-phase IGBT 34$u$ to be low level L. On the contrary, when the target u-phase voltage $v_u^*$ is smaller than the triangular wave, the PWM controller 37 determines the switching signal $g_{uh}$ for the upper u-phase IGBT 32$u$ to be low level L, and the switching signal $g_{ul}$ for the lower u-phase IGBT 34$u$ to be high level H. When the potential of any of the switching signal $g_{uh}$ for the upper u-phase IGBT 32$u$ and the switching signal $g_{ul}$ for the lower u-phase IGBT 34$u$ is switched, the PWM controller 37 sets both of the switching signals $g_{uh}$ and $g_{ul}$ at low level L for a predetermined time interval in the switching operation. The time interval is referred to as a dead time, and is set to be approximately 4 $\mu$s in Example 1. Similarly, the PWM controller 37 determines the switching signals $g_{vh}$, $g_{vl}$, $g_{wh}$, and $g_{wl}$ for v-phase and w-phase, based on the target v-phase voltage $v_v^*$, and the target w-phase voltage $v_w^*$.

[Operation of Motor Driver 30]

The following is the operation of the motor driver 30. The motor driver 30 controls the currents flowing through the stator windings 11$u$, 11$v$, and 11$w$ according to the target u-phase voltage $v_u^*$, the target v-phase voltage $v_v^*$ and the target w-phase voltage $v_w^*$, as follows: First, the PWM controller 37 modulates the target u-phase voltage $v_u^*$, the target v-phase voltage $v_v^*$, and the target w-phase voltage $v_w^*$ by means of the PWM, thereby outputting the switching signals $g_{uh}$, $g_{ul}$, $g_{vh}$, $g_{vl}$, $g_{wh}$, and $g_{wl}$, as described above.

The predrive device 36 turns ON or OFF the upper IGBT's 32$u$, 32$v$, 32$w$ and the lower IGBT's 34$u$, 34$v$, 34$w$ depending on the respective switching signals $g_{uh}$, $g_{ul}$, $g_{vh}$, $g_{vl}$, $g_{wh}$, and $g_{wl}$ from the PWM controller 37. For example, when the switching signals $g_{uh}$, $g_{vh}$, and $g_{wh}$ for the upper IGBT's are at H, L, and L, respectively, the upper IGBT's 32$u$, 32$v$, and 32$w$ turn ON, OFF and OFF, respectively. At the same time, when the switching signals $g_{ul}$, $g_{vl}$, and $g_{wl}$ for the lower IGBT's are at L, H, and H, respectively, the lower IGBT's 34$u$, 34$v$, and 34$w$ turn OFF, ON, and ON, respectively. Thus, the predrive device 36 switches ON and OFF the upper IGBT's 32$u$, 32$v$, 32$w$ and the lower IGBT's 34$u$, 34$v$, 34$w$, thereby changing voltages applied across the stator windings 11$u$, 11$v$, and 11$w$ into rectangular waveform. Then, the width of the rectangular wave for each of the voltages is controlled by changing a duty ratio of ON/OFF of the IGBT in the motor driver 30. The duty ratio of ON/OFF of IGBT is controlled by adjusting the pulse width of the corresponding switching signal, that is, by adjusting the ratio of the time intervals in high level H and low level L.

The stator windings 11$u$, 11$v$, and 11$w$ have inductive impedance. Accordingly, when the above-described rectangular wave voltages are applied across the stator windings 11$u$, 11$v$, and 11$w$, the currents flowing through the stator windings do not have rectangular waveforms but have smooth waveforms. Here, the "smoothness" here indicates a smoothness under an approximation of neglecting distortions caused by the IGBT switching. The motor driver 30 increases the duty ratio of, for example, the upper u-phase IGBT 32$u$, thereby extending the time interval in which the switching signal $g_{uh}$ for the upper u-phase IGBT 32$u$ is at high-level H. Then, the u-phase current increases. On the contrary, when the motor driver 30 reduces the duty ratio of the upper u-phase IGBT 32$u$, thereby shortening the time interval in which the switching signal $g_{uh}$ for the upper u-phase IGBT 32$u$ is at high level H. Then, the u-phase current decreases. Thus, the motor driver 30 controls the u-phase current into a "smooth" waveform in the above-described sense. The v-phase current and the w-phase current are controlled similarly.

In the above-described current control, when any of an upper IGBT and a lower IGBT of the same phase is switched ON or OFF, the PWM controller 37 sets both IGBT's to be OFF for the above-described dead time in the ON or OFF switching. Setting the dead time prevents an overcurrent from occurring on the turn-OFF of any of the IGBT's, and the breakdown of the IGBT's due to the overcurrent.

[Coordinate Systems]

Figure 6:
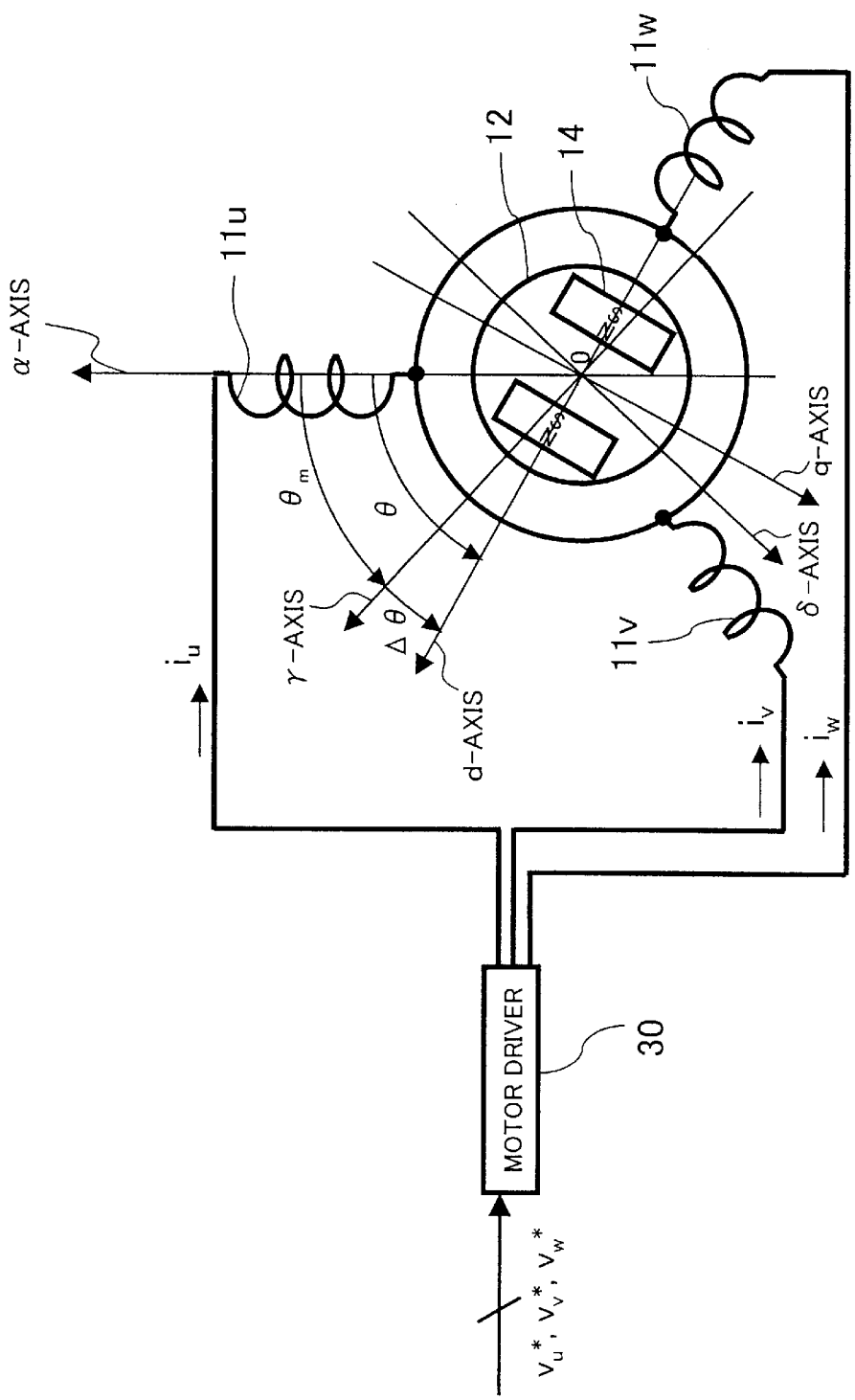
FIG. 6 is a schematic diagram showing coordinate systems for representing currents as a vector in the examples of the invention.

Prior to the description of the configuration and the operation of the microcomputer 22, the coordinate systems for representing currents are described as follows: FIG. 6 is a schematic diagram showing a coordinate system for representing currents in the example of the invention. For the simplicity of description, in FIG. 6, the two permanent magnets 14 are embedded in the rotor 12. That is, in FIG. 6, the magnetic pole number of rotor is two, and so is the pole number of stator windings. In the following description, the rotor position is expressed in terms of electric angle. Accordingly, the following description is valid even when the magnetic pole number of rotor and the pole number of stator windings are four or more.

In a transverse cross section of the rotor 12, the d-axis direction is defined as the direction of the center axis of the magnetic pole of the rotor 12 with respect to the center axis O of the rotor 12. Furthermore, the positive direction of the d-axis is defined as the direction of the magnetic flux of the permanent magnet 14. The q-axis direction is defined as the direction perpendicular to the d-axis direction. The positive direction of the q-axis is defined as the direction rotated from the positive d-axis direction by +90° in the direction of revolution of the rotor 12. Here, the forward revolution of the rotor 12 is defined as the counterclockwise revolution in FIG. 6. In other words, currents flowing through the stator windings 11u, 11v, and 11w are controlled to reverse in the order of a u-phase current $i_u$, a v-phase current $i_v$, and a w-phase current $i_w$.

The center direction of the magnetic flux generated by the u-phase current $i_u$ flowing through the u-phase winding 11u is selected as the reference direction fixed to the stator. The reference direction is referred to as the α-axis direction. Furthermore, the positive direction of the α-axis is defined as the direction of the magnetic flux generated by the u-phase current $i_u$ when the u-phase current $i_u$ flows in the direction of the arrow shown in FIG. 6.

The rotor position is defined as the angle θ between the d-axis direction and the α-axis direction around the center axis O of the rotor. The positive direction of the rotor position θ is defined as the direction indicated by the arrow directing from the α-axis to the d-axis in FIG. 6, that is, as the direction of the forward revolution of the rotor 12. A rotor position expressed in a unit that assigns 360° to the whole angle around the center axis O of the rotor 12, is referred to as a position in terms of mechanical angle. In contrast, the rotor position θ expressed in another unit that assigns 180° to the angle between the adjacent magnetic poles generated by the currents flowing through the stator windings, is referred to as the position in terms of electric angle. Thus, the following relation holds between electric angle and mechanical angle: (electric angle)=(magnetic pole number of rotor)/2×(mechanical angle).

In Example 1, the currents flowing through the stator windings are detected, whereby the d-axis direction, that is, the rotor position θ is estimated from the result of the detection. The d-axis direction and the q-axis direction estimated at that time are referred to as a γ-axis direction and a δ-axis direction, respectively. The estimated rotor position θ is referred to as an estimated position $θ_m$. The difference $θ-θ_m$ between the rotor position θ and the estimated position $θ_m$ is referred to as a position estimation error Δθ. FIG. 6 shows the case in which the position estimation error Δθ is positive, that is, in which the rotor position θ is greater than the estimated position $θ_m$ ($θ>θ_m$). Here, the positive direction of the estimated position $θ_m$ is defined as the direction indicated by the arrow directing from the α-axis to the γ-axis in FIG. 6, that is, as the direction of forward revolution of the rotor 12. When the estimated position $θ_m$ does not contain a substantial error, that is, when the position estimation error Δθ is substantially equal to zero, the estimated position $θ_m$ is equal to the rotor position θ. Then, the d-axis and the q-axis coincide with the γ-axis and the δ-axis, respectively.

In the following description, the rotor position θ, the estimated position $θ_m$, and the position estimation error Δθ are expressed in terms of electric angle. Furthermore, all quantities regarding to the rotor position θ are expressed in terms of electric angle, unless otherwise mentioned.

The effect that the magnetic field generated by the currents flowing through the stator windings exerts onto the rotor is electrically expressed with an equivalent inductance in the stator windings. When the permeability of the rotor is not isotropic around the center axis of the rotor, that is, the IPMSM has saliency, the equivalent inductance depends on the direction around the center axis. In Example 1, the equivalent inductance in the equivalent circuit of the IPMSM 10 is composed of a d-axis inductance Ld in the d-axis direction and a q-axis inductance Lq in the q-axis direction. Since the d-axis and the q-axis are the coordinate axes fixed to the rotor 12, the equivalent inductance composed of Ld and Lq does not substantially depend on the rotor position θ. The equivalent inductance is not isotropic: Ld<Lq. Specifically, the d-axis inductance Ld is approximately 10 mH, while the q-axis inductance Lq is approximately 20 mH. Thus, the IPMSM 10 has saliency.

[Configuration of Microcomputer 22]

The microcomputer 22 is preferably a microcomputer, and comprises a CPU, a ROM, a RAM, a timer, a port, and a bus for connecting them. Alternatively, these components may be integrated into a single-piece semiconductor device as an integrated circuit, namely, a microprocessor. In this case, the following components are preferably implemented by software. Alternatively, these components may be implemented by the hardware of electronic circuits or an integrated circuit.

The microcomputer 22 serves as a rotational velocity controller 40, a current controller 50, a position/rotational-velocity estimating section 60, and a superimposed wave generator 70.

The rotational velocity controller 40 inputs an analog rotational velocity command $[ω^*_a]$ from the outside and an estimated rotational velocity value signal $[ω_m]$ from the position/rotational-velocity estimating section 60. Here, the estimated rotational velocity value signal $[ω_m]$ represents an estimated rotational velocity $[ω_m]$. Using the input values, the rotational velocity controller 40 determines a current amplitude command $[i_a^*]$, a γ-axis current command $[i_γ]$, and a δ-axis current command $[i_δ]$ as described later. Furthermore, the rotational velocity controller 40 outputs the γ-axis current command $[i_γ^*]$ and the δ-axis current command $[i_δ^*]$ to the current controller 50, and outputs the current amplitude command $[i_a^*]$ to the superimposed wave generator 70.

The superimposed wave generator 70 inputs the current amplitude command $[i_a^*]$ from the rotational velocity controller 40, thereby setting a superimposed current command $[i_s]$ and a superimposed wave quadrature signal $[h_{s⊥}^*]$. The superimposed current command $[i_s^*]$ is output to the current controller 50, while the superimposed wave quadrature signal $[h_{s⊥}^*]$ is output to the position/rotational-velocity estimating section 60.

The current controller 50 inputs the analog u-phase current value signal $[i_{ua}]$ from the u-phase current sensor 21u, the analog v-phase current value signal $[i_{va}]$ from the v-phase current sensor 21v, and an estimated position value signal $[θ_m]$ indicating the estimated position $θ_m$ from the position/rotational-velocity estimating section 60, thereby detecting the γ-axis current $i_γ$ and the δ-axis current $i_δ$ as described later. A δ-axis current value signal $[i_δ]$ indicating the detected δ-axis current $i_δ$ is output to the position/rotational-velocity estimating section 60. The current controller 50 further inputs the γ-axis current command $[i_γ^*]$ and the δ-axis current command $[i_δ^*]$ from the rotational velocity controller 40, the estimated rotational velocity value signal $[ω_m]$ from the position/rotational-velocity estimating section 60, and the superimposed current command $[i_s^*]$ from the superimposed wave generator 70. Using the input values as well as the previously input estimated position $θ_m$, the detected γ-axis current $i_γ$, and the δ-axis current $i_δ$, the current controller 50 determines the target u-phase voltage $v_u^*$, the target v-phase voltage $v_v$, and the target w-phase voltage $v_w^*$ as described later, thereby outputting them to the motor driver 30.

The position/rotational-velocity estimating section 60 inputs the superimposed wave quadrature signal $[h_{s⊥}^*]$ from the superimposed wave generator 70, and the δ-axis current value signal $[i_δ]$ from the current controller 50, thereby determining an estimation error ε as described later. Using the estimation error ε, the position/rotational-velocity estimating section 60 corrects the estimated position θ$_m$ and the estimated rotational velocity ω$_m$. After the correction, the estimated position value signal [θ$_m$] is output to the current controller 50, while the estimated rotational velocity value signal [θ$_m$] is output to the rotational velocity controller 40 and the current controller 50.

The following are the description of the configuration and the operation of the components of the above-described microcomputer 22.

Configuration of Rotational Velocity Controller 40

Figure 3:
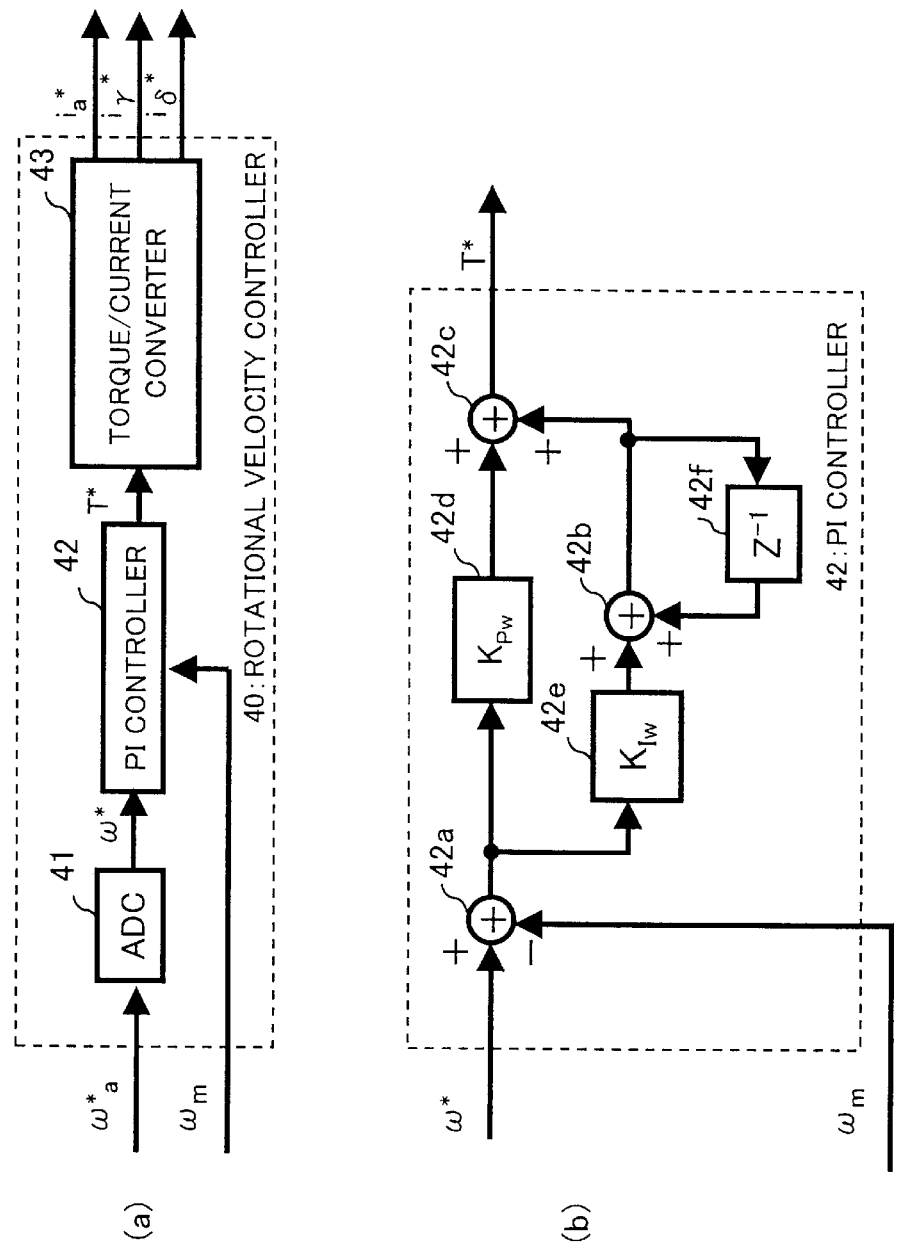
FIG. 3 is a block diagram showing the configuration of a rotational velocity controller 40 according to Example 1 of the invention.

The part (a) of FIG. 3 is a block diagram showing the configuration of the rotational velocity controller 40 according to Example 1. The part (b) of FIG. 3 is a block diagram of a PI controlling section 42 shown in the part (a) of FIG. 3.

The rotational velocity controller 40 comprises an ADC (analog digital converter) 41, a PI controlling section 42, and a torque/current converting section 43.

The ADC 41 converts an analog signal, the analog rotational velocity command [ω*$_a$], into a digital signal, the rotational velocity command [ω*]. The ADC 41 outputs the rotational velocity command [ω*] to the PI controlling section 42.

The PI controlling section 42 performs an operation onto a target rotational velocity ω* indicated by the rotational velocity command [ω*] and the estimated rotational velocity ω$_m$ indicated by the estimated rotational velocity value signal [ω$_m$]. The operation is shown in the block diagram of the part (b) of FIG. 3. The PI controlling section 42 is configured such that the following operation is carried out. A first adder 42a subtracts the estimated rotational velocity ω$_m$ from the target rotational velocity ω*. The result of the subtraction is output to a proportional gain 42d and a integral gain 42e. The proportional gain 42d multiplies the input signal value by a first constant K$_{PW}$, which is hereafter referred to as a proportional gain K$_{PW}$, and then, outputs the result of the multiplication to a third adder 42c. On the other hand, the integral gain 42e multiplies the input signal value by a second constant K$_{IW}$, which is hereafter referred to as an integral gain K$_{IW}$, and then outputs the result of the multiplication to a second adder 42b. The second adder 42b adds the input signal value to a value fedback from a one-sample delay 42f, and then outputs the result of the multiplication to the one-sample delay 42f and the third adder 42c. The one-sample delay 42f holds the input signal until the next sample is input to the second adder 42b. Thus, the second adder 42b and the one-sample delay 42f constitute a digital integrator. The third adder 42c adds the outputs of the proportional gain 42d and the second adder 42b with each other, and then outputs the result of the addition as a torque command [T*] to the torque/current converting section 43. Thus, the PI controlling section 42 is configured as a control section for performing a proportional control, P control, in the proportional gain 42d, and an integral control, I control, in the digital integrator.

The torque/current converting section 43 performs a later-described operation on the input torque command [T*]. The torque/current converting section 43 outputs the result of the operation as the current amplitude command [i$_a$*], the γ-axis current command [i$_γ$*], and the δ-axis current command [i$_δ$*].

[Operation of Rotational Velocity Controller 40]

The operation of the rotational velocity controller 40 is as follows: The rotational velocity controller 40 inputs the analog rotational velocity command [ω*$_a$] and the estimated rotational velocity value signal [ω$_m$] from the outside, preferably at each period of the rotor-position estimation current signal i$_s$* described later. In Example 1, the period is approximately 3 ms at maximum. Alternatively, the signals may be input at a constant period longer than the maximum period of the rotor-position estimation current signal i$_s$. The input signals undergo the following operation sequentially in the order of the ADC 41, the PI controlling section 42, and the torque/current converting section 43. As a result, the γ-axis current command [i$_γ$*] and the δ-axis current command [i$_δ$*] are determined.

The analog rotational velocity command [ω*$_a$] is converted into the rotational velocity command [ω*] by the ADC 41. The target rotational velocity ω*$_a$ indicated by the analog rotational velocity command [ω*$_a$] is within the substantial range from 0 to 2000π/60 [rad/s] (=1000 revolutions/min). The rotational velocity command [ω*] is output to the PI controlling section 42.

The PI controlling section 42 performs a proportional plus integral control (PI control) so that the estimated rotational velocity ω$_m$ coincides the target rotational velocity ω*. More specifically, the PI controlling section 42 outputs the torque command [T*] for the rotor 12 as a manipulated variable. According to the block diagram of the part (b) of FIG. 3, the torque command [T*] is expressed by Eq. (1), using the difference between the target rotational velocity ω* and the estimated rotational velocity ω$_m$, the proportional gain K$_{PW}$, and the integral gain K$_{IW}$.

$$T^* = K_{PW}(\omega^* - \omega_m) + \Sigma K_{IW}(\omega^* - \omega_m) \tag{1}$$

Here, the summation sign Σ indicates the sum of all the samples in the range from the start of control to the output of torque command [T*]. The first term in the right-hand side of Eq. (1) is the proportional control term, while the second one is the integral control term.

The torque/current converting section 43 determines the γ-axis current command [i$_γ$*] and the δ-axis current command [i$_δ$] according to the following steps. Thus, the magnetic field generated by the currents flowing through the stator windings is expected to exert a torque equal to the target torque T* in the IPMSM 10.

First, the torque/current converting section 43 divides the target torque T* by a coefficient K$_T$ according to Eq. (2), thereby converting the torque value into the target current amplitude i$_a$*.

$$i_a^* = T^*/K_T \tag{2}$$

In Example 1, the target current amplitude i$_a$* is approximately 15 A at maximum.

Next, the torque/current converting section 43 determines a target current phase β* according to Eq. (3). When a current amplitude is equal to the target current amplitude i$_a$*, the target current phase β* indicates the current phase at the maximum output torque in the IPMSM 10, where the reference of phase is the q-axis direction.

$$\sin \beta^* = \{-\psi + \sqrt{(\psi^2 + 8(Lq-Ld)^2 i_a^{*2})}\}/\{4(Lq-Ld)i_a^*\} \tag{3}$$

Here, ψ is the effective value of the dq-axis winding flux linkage, which indicates the effective value of the magnetic fluxes of the permanent magnets 14 linking to the stator windings. Lq indicates the q-axis inductance, while Ld indicates the d-axis inductance.

Finally, the torque/current converting section 43 multiplies the target current amplitude i$_a$* by −sin β* according to Eq. (4a), thereby obtaining the target γ-axis current i$_γ$. Furthermore, the torque/current converting section 43 multiplies the target current amplitude i$_a$* by cos β* according to Eq. (4b), thereby obtaining the target δ-axis current $i_δ^*$. Thus, the IPMSM 10 generates a torque equal to the target torque T* with the currents equal to the target γ-axis current $i_γ^*$ and the target δ-axis current $i_δ^*$, when the γ-axis and the δ-axis coincide with the d-axis and the q-axis, respectively.

$$i_γ^* = -i_a^* \sin β^* \quad (4a)$$

$$i_δ^* = i_a^* \cos β^* \quad (4b)$$

In Example 1, the target current phase β* is determined to maximize the torque onto the rotor 12. However, the invention is not restricted to the determination. Alternatively, the target current phase β* may be determined to maximize the output efficiency of motor.

[Configuration of Current Controller 50]

Figure 4:
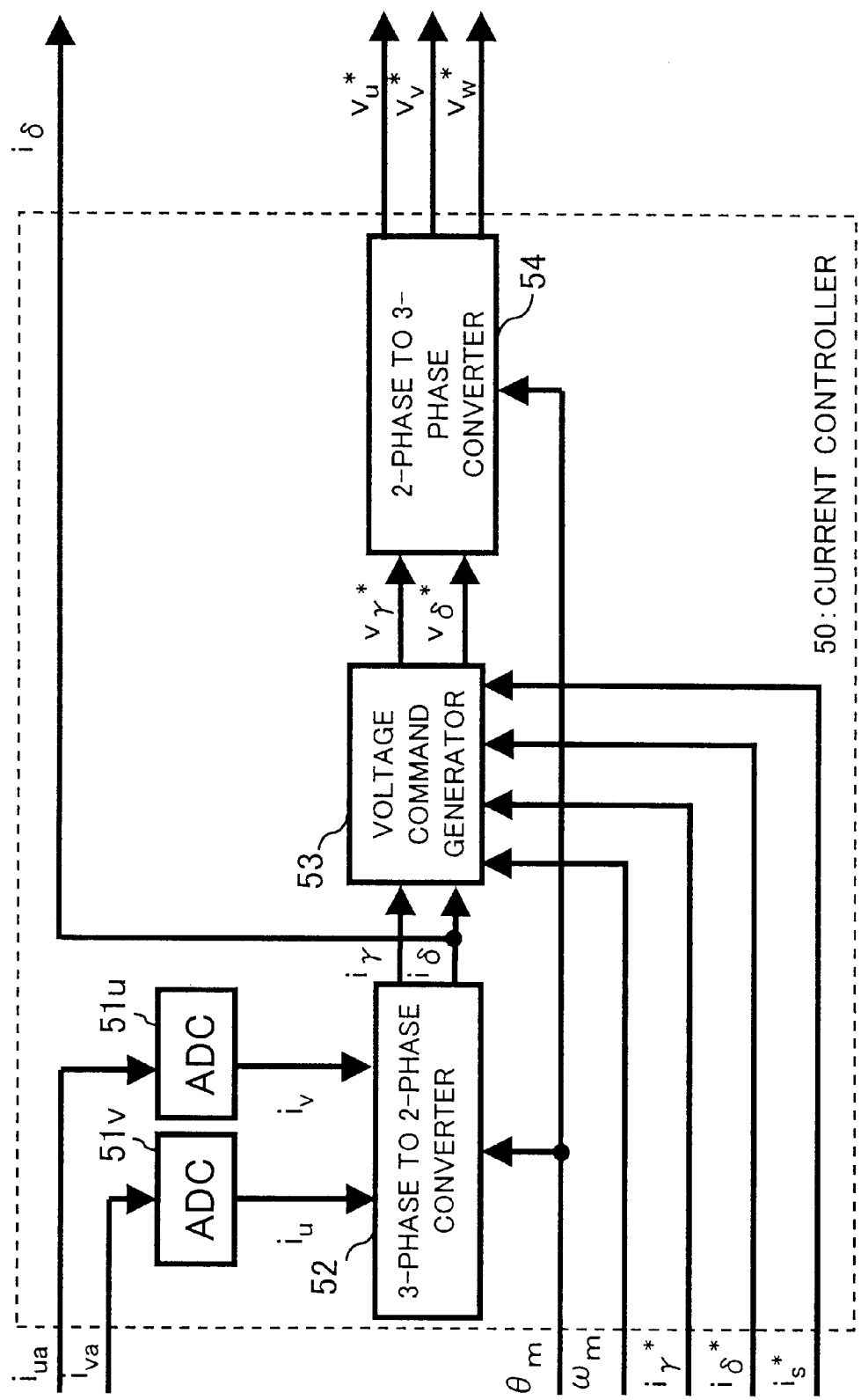
FIG. 4 is a block diagram showing the configuration of a current controller 50 according to Example 1 of the invention.

FIG. 4 is a block diagram showing the configuration of the current controller 50 according to Example 1. The current controller 50 comprises an ADC 51u for u-phase current value signal, an ADC 51v for v-phase current value signal, a three-phase to two-phase converter 52, a voltage command generator 53, and a two-phase to three-phase converter 54.

The ADC 51u for u-phase current value signal converts the analog u-phase current value signal [$i_{ua}$] into the digital signal of the u-phase current value signal [$i_u$], and then outputs the digital signal to the three-phase to two-phase converter 52. Similarly, the ADC 51v for v-phase current value signal converts the analog v-phase current value signal [$i_{va}$] into the digital signal of the v-phase current value signal [$i_v$], and then outputs the digital signal to the three-phase to two-phase converter 52.

The three-phase to two-phase converter 52 inputs the u-phase current value signal [$i_u$], the v-phase current value signal [$i_v$], and the estimated position value signal [$θ_m$], thereby detecting the γ-axis current $i_γ$ and the δ-axis current $i_δ$ as described later. The γ-axis current value signal [$i_γ$] indicates the detected γ-axis current $i_γ$, and is output to the voltage command generator 53. The δ-axis current value signal [$i_δ$] indicates the detected δ-axis current $i_δ$, and is output to the voltage command generator 53 and the outside.

The voltage command generator 53 inputs the γ-axis current value signal [$i_γ$] and the δ-axis current value signal [$i_δ$] from the three-phase to two-phase converter 52, and the γ-axis current command [$i_γ^*$], the δ-axis current command [$i_δ^*$], the estimated rotational velocity value signal [$ω_m$], and the superimposed current command [$i_s^*$] from the outside. The voltage command generator 53 is a logic circuit, and calculates the target γ-axis current $i_γ^*$ and the target δ-axis current $i_δ^*$ based on the input values, as described later. The results of the calculation are output as the γ-axis voltage command [$v_γ^*$] and the δ-axis voltage command [$v_δ^*$] to the two-phase to three-phase converter 54.

The two-phase to three-phase converter 54 is a logic circuit, and calculates the target u-phase voltage $v_u^*$, the target v-phase voltage $v_v^*$, and the target w-phase voltage $v_w^*$ based on the input values of the target γ-axis voltage $v_γ^*$, the target δ-axis voltage $v_δ^*$, and the estimated position $θ_m$, as described later. The results of the calculation are output as the u-phase voltage command [$v_u^*$], the v-phase voltage command [$v_v^*$], and the w-phase voltage command [$v_w^*$] to the two-phase to the motor driver 30.

[Operation of Current Controller 50]

The operation of the current controller 50 is described as follows: The analog current value signals [$i_{ua}$] and [$i_{va}$] from the current sensors 21u and 21v are converted into the current value signals [$i_u$] and [$i_v$] by the ADC's 51u and 51v, respectively. The detected currents $i_u$ and $i_v$ belong to three-phase currents. For the convenience in the later process, those values are converted into the γ-axis current $i_γ$ and the δ-axis current $i_δ$ according to Eqs. (5) and (6), respectively, by the three-phase to two-phase converter 52.

$$i_γ = (\sqrt{2}) \times \{i_u \sin(θ_m + 60°) + i_v \sin θ_m\} \quad (5)$$

$$i_δ = (\sqrt{2}) \times \{i_u \cos(θ_m + 60°) + i_v \cos θ_m\} \quad (6)$$

The voltage command generator 53 controls the target γ-axis voltage $v_γ^*$ using the proportional plus integral control (PI control) and the non-interacting control according to Eq. (7). Accordingly, the γ-axis current $i_γ$ is controlled to be equal to the target γ-axis current $i_γ^*$ superimposed with the target superimposed current $i_s^*$, that is, to the target γ-axis current with superimposed waves ($i_γ + i_s^*$)

$$v_γ^* = K_{Pd}\{(i_γ^* + i_s^*) - i_γ\} + ΣK_{Id}\{(i_γ^* + i_s^*)\} + R \times i_γ^* - ω_{em} \times Lq \times i_δ^* \quad (7)$$

The first term in the right-hand side of Eq. (7) is a proportional control term according to the proportional gain $K_{Pd}$, while the second one is an integral control term according to the integral gain $K_{Id}$. The third and fourth ones are non-interacting control terms. Here, the resistance of the stator-windings 11u, 11v, and 11w is denoted by R, and the estimated rotational velocity $ω_m$ in terms of angular velocity is referred to as an estimated angular velocity $ω_{em}$. Furthermore, the q-axis inductance is denoted by Lq, and the summation sign Σ indicates the sum of all the samples in the range from the start of control to the output of γ-axis voltage command [$v_γ^*$].

The third and fourth terms in the right-hand side of Eq. (7) are set as follows: When the γ-axis current $i_γ$ and the δ-axis current $i_δ$ equal to the target γ-axis current $i_γ^*$ and the target δ-axis current $i_δ^*$ respectively, and the γ-axis and the δ-axis coincide with the d-axis and the q-axis, respectively, the relation of Eq. (7) coincides with the relation satisfied by the d-axis voltage, the d-axis current, and the q-axis current, apart from the term including the rotor-position estimation current signal $i_s^*$.

On the other hand, the voltage command generator 53 controls the target δ-axis voltage $v_δ^*$ through the proportional plus integral control (PI control) and the non-interacting control according to Eq. (8). Accordingly, the δ-axis current $i_δ$ controlled so as to equal the target δ-axis current $i_δ^*$.

$$v_δ^* = K_{Pq}\{i_δ^* - i_δ\} + ΣK_{Iq}\{i_δ^* - i_δ\} + R \times i_δ^* + ω_{em} \times Ld \times i_γ^* + ω_{em} \times ψ \quad (8)$$

The first term in the right-hand side of Eq. (8) is a proportional control term according to the proportional gain $K_{Pq}$, while the second term is an integral control term according to the integral gain $K_{Iq}$. The third, fourth, and fifth terms are non-interacting control terms. Here, the resistance R and the estimated angular velocity $ω_{em}$ are identical to those in Eq. (7). Ld is the d-axis inductance, and ψ is the effective value of the dq-axis winding flux linkage. The summation sign Σ indicates the sum of all the samples in the range from the start of control to the output of δ-axis voltage command [$v_δ^*$].

The third, fourth, and fifth terms in the right-hand side of Eq. (8) are set as follows: When the γ-axis current $i_γ$ and the δ-axis current $i_δ$ equal to the target γ-axis current $i_γ^*$ and the target δ-axis current $i_δ^*$ respectively, and the γ-axis and the δ-axis coincide with the d-axis and the q-axis, respectively, the relation of Eq. (8) coincides with the relation satisfied by the d-axis voltage, the d-axis current, and the q-axis current, apart from the term including the rotor-position estimation current signal $i_s^*$ The target γ-axis voltage $v_γ^*$ and the target δ-axis voltage $v_δ^*$ are determined by the voltage command generator 53.

Furthermore, these voltages are converted into three-phase voltages applied across the stator windings 11$u$, 11$v$, and 11$w$, namely, the target u-phase voltage $v_u{}^*$, the target v-phase voltage $v_v{}^*$, and the target w-phase voltage $v_w{}^*$, according to Eqs. (9), (10), and (11), respectively, by the two-phase to three-phase converter 54. The conversion corresponds to the inverse transformation of the conversion, Eqs. (5) and (6), by the three-phase to two-phase converter 52.

$$v_u{}^* = \sqrt{(2/3)}\{v_\gamma{}^* \cos\theta_m - v_\delta{}^* \sin\theta_m\} \qquad (9)$$

$$v_v{}^* = \sqrt{(2/3)}\{v_\gamma{}^* \cos(\theta_m - 120°) - v_\delta{}^* \sin(\theta_m - 120°)\} \qquad (10)$$

$$v_w{}^* = \sqrt{(2/3)}\{v_\gamma{}^* \cos(\theta_m + 120°) - v_\delta{}^* \sin(\theta_m + 120°)\} \qquad (11)$$

[Configuration of Position/rotational-velocity Estimating Section 60]

Figure 5A:
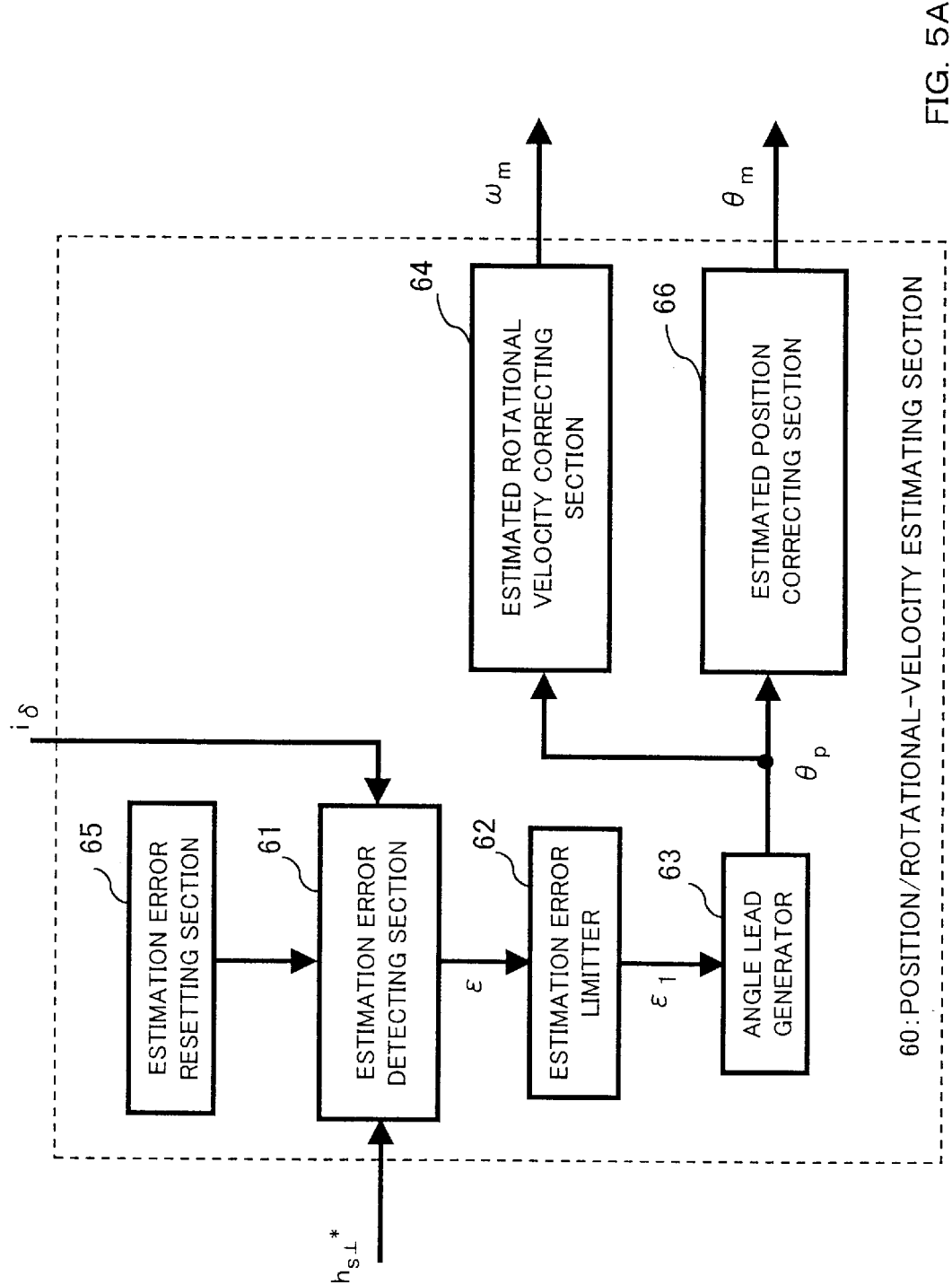
FIG. 5A is a block diagram showing the configuration of a position/rotational-velocity estimating section 60 according to Example 1 of the invention.

FIG. 5A is a block diagram showing the configuration of the position/rotational-velocity estimating section 60 according to Example 1. The position/rotational-velocity estimating section 60 comprises an estimation error detector 61, an estimation error limiter 62, a angle lead generator 63, an estimated rotational velocity correcting section 64, an estimation error resetting section 65, and an estimated position correcting section 66.

The estimation error detector 61 is a digital operational circuit, and multiplies the $\delta$-axis current $i_\delta$ by the superimposed wave quadrature component $h_{s\perp}{}^*$, as described later. The result of the multiplication is integrated over a predetermined time interval. The result of the operation gives an estimation error $\epsilon$.

The estimation error limiter 62 is a limiter against the estimation error $\epsilon$. The limited estimation error $\epsilon$ is referred to as a second estimation error $\epsilon 1$.

The angle lead generator 63 is a control circuit for performing the proportional plus integral control on the second estimation error $\epsilon 1$. The generator comprises: a proportional control section for multiplying the second estimation error $\epsilon 1$ by the proportional gain $K_{TPP}$; and a digital integrator for integrating the second estimation error $\epsilon 1$ with the integral gain $K_{TPI}$. The configuration is identical to that shown in the part (b) of FIG. 3. The output of the angle lead generator 63 is referred to as a angle lead $\theta_p$.

The estimated rotational velocity correcting section 64 comprises a digital low-pass filter (LPF) for the angle lead $\theta_p$. As described later, the estimated rotational velocity $\omega_m$ is corrected on the basis of a value obtained from the angle lead $\theta_p$ through the LPF.

The estimation error resetting section 65 replaces the estimation error $\epsilon$ stored in the estimation error detector 61, with zero at each predetermined time interval.

The estimated position correcting section 66 is an operational circuit, and corrects the estimated position $\theta_m$ by the amount of the angle lead $\theta_p$.

[Configuration of Superimposed Wave Generator 70]

Figure 5B:
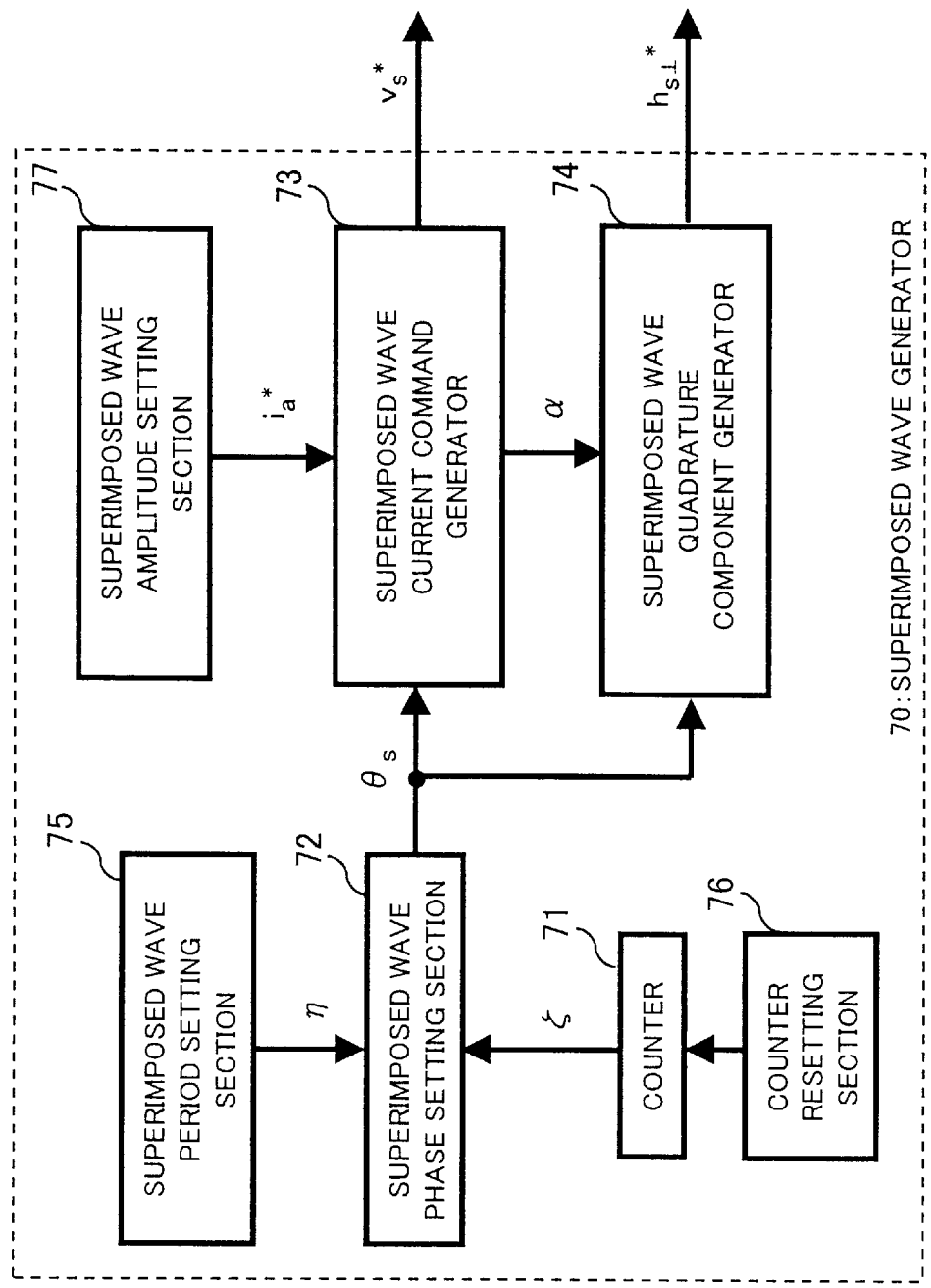
FIG. 5B is a block diagram showing the configuration of a superimposed wave generator 70 according to Example 1 of the invention.

FIG. 5B is a block diagram showing the configuration of the superimposed wave generator 70 according to Example 1. The superimposed wave generator 70 comprises a counter 71, a superimposed wave phase setting section 72, a superimposed current command generator 73, a superimposed wave quadrature component generator 74, a superimposed wave period setting section 75, a counter resetting section 76, and a superimposed current amplitude setting section 77.

The counter 71 comprises a register for storing an integer count $\zeta$, increments the count $\zeta$ by one in each PWM carrier period of the PWM controller 37, and then outputs the value of the count $\zeta$ to the superimposed wave phase setting section 72. The superimposed wave phase setting section 72 is a logic circuit, and sets the superimposed wave phase $\theta_s$ based on the division number $\eta$ set by the superimposed wave period setting section 75 and the count $\zeta$, as described later. The superimposed current command generator 73 is a logic circuit, and sets the target superimposed current $i_s{}^*$ based on the superimposed current amplitude $\alpha$ set by the superimposed current amplitude setting section 77 and the superimposed wave phase $\theta_s$ set by the superimposed wave phase setting section 72, as described later. The superimposed wave quadrature component generator 74 is a logic circuit, and sets the superimposed wave quadrature component $h_{s\perp}{}^*$ based on the superimposed wave phase $\theta_s$, as described later. The superimposed wave period setting section 75 is a logic circuit, and comprises a circuit for generating a pseudo-random number between 0 and 1, and then sets the division number $\eta$ based on the pseudo-random number, as described later. The counter resetting section 76 is a circuit for resetting the register in the counter 71. The superimposed current amplitude setting section 77 is a logic circuit, and comprises a ROM or a RAM storing an amplitude table (FIG. 12) described later. The super imposed current amplitude setting section 77 inputs the current amplitude command [$i_a{}^*$] from the outside, selects from the amplitude table, the superimposed current amplitude $\alpha$ corresponding to the target current amplitude $i_a{}^*$ indicated by the command, and then outputs the value of the amplitude $\alpha$.

The position/rotational-velocity estimating section 60 and the superimposed wave generator 70 are preferably implemented by software. Alternatively, the above-described components may be implemented by logic devices.

[Operation of Superimposed Wave Generator 70]

The following is the description of the operation of the superimposed wave generator 70, which characterizes Example 1. The operation of the superimposed wave generator 70 is characterized by the following three points: First, randomly varying each period of the target superimposed current or the rotor-position estimation current signal $i_s{}^*$; Second, varying the amplitude of the rotor-position estimation current signal $i_s{}^*$ at each period thereof; Third, setting the period of the rotor-position estimation current signal $i_s{}^*$ to be an even multiple of the PWM carrier wave.

At first, the superimposed wave period setting section 75 sets the division number $\eta$ to be a random, positive, and even number according to Eq. (12).

$$\eta = \eta\min + 2 \times \text{round}\{(\eta\max - \eta\min)M/2\} \qquad (12)$$

Here, the minimum and maximum values of the division number $\eta$ are denoted by $\eta$ min and $\eta$ max, respectively. The minimum value $\eta$ min and the maximum value $\eta$ max are even numbers: $\eta$ min=20 and $\eta$ max=40 in Example 1. The pseudo-random number M is equal to or greater than 0, and less than 1. The number M is set by a pseudo-random number generating circuit in the superimposed wave period setting section 75. The operator round( ) indicates an operation of rounding down an operand to the nearest integer.

Next, using the count $\zeta$ output from the counter 71, the superimposed wave phase setting section 72 sets the superimposed wave phase $\theta_s$ according to Eq. (13). At each time when the count $\zeta$ is incremented by 1 in the counting from 1 to the division number $\eta$, the superimposed wave phase $\theta_s$ advances by $(360/\eta)°$ from $(360/\eta)°$ to $360°$.

$$\theta_s = 360° \zeta/\eta \qquad (13)$$

Figure 10:
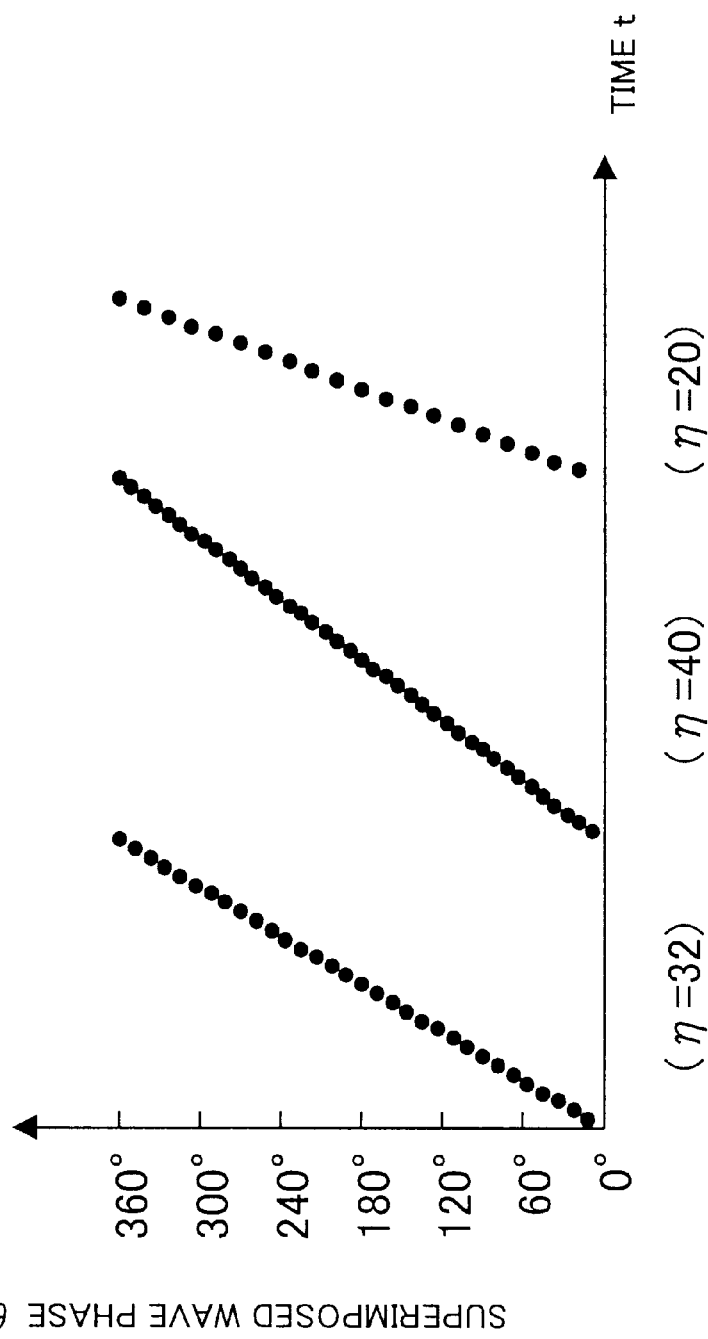
FIG. 10 is a diagram showing the variation in superimposed wave phase $θ_s$ for each output value in Example 1 of the invention.

FIG. 10 is a diagram showing the distribution of superimposed wave phase $\theta_s$ in Example 1. Each point shown by a dot in FIG. 10 indicates the superimposed wave phase $\theta_s$ for each output. For example, the division number $\eta$ is set sequentially to be 32, 40, 20, . . . The superimposed wave phase $\theta_s$ firstly varies from 11.25° to 360° in a time interval 32 times longer than the PWM carrier period. Secondly, the superimposed wave phase $\theta_s$ varies from 9° to 360° in a time interval 40 times longer than the PWM carrier period. Thirdly, the superimposed wave phase $\theta_s$ varies from 18° to 360° in a time interval 20 times longer than the PWM carrier period, . . . , and so on. The superimposed wave phase $\theta_s$ repeats the above-described variation.

Figure 12:
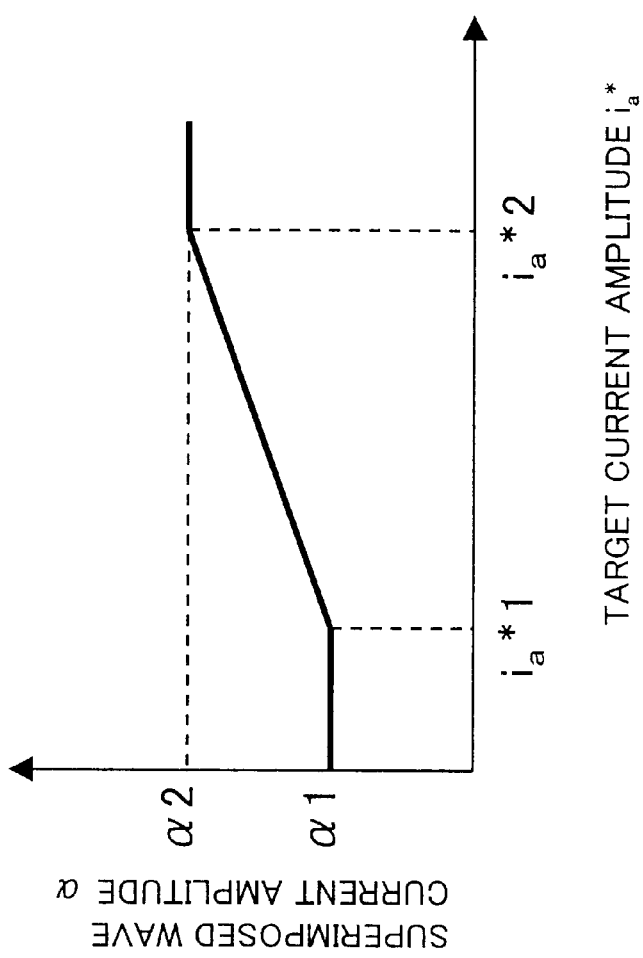
FIG. 12 is a diagram showing an amplitude table for giving a correspondence between a target current amplitude $i_a^*$ and a superimposed wave current amplitude α in Example 1 of the invention.

The superimposed current amplitude setting section 77 sets the superimposed current amplitude $\alpha$ based on the target current amplitude $i_a^*$ indicated by the current amplitude command $[i_a^*]$, which is input from the position/rotational-velocity estimating section 60. FIG. 12 is a diagram showing an amplitude table for providing a correspondence between the target current amplitude $i_a^*$ and the superimposed current amplitude $\alpha$ in Example 1. The superimposed current amplitude setting section 77 sets the superimposed current amplitude $\alpha$ corresponding to the target current amplitude $i_a^*$, according to the amplitude table as follows: When the target current amplitude $i_a^*$ is smaller than its lower limit $i_a^*\mathbf{1}$, the superimposed current amplitude setting section 77 sets the superimposed current amplitude $\alpha$ to be its lower limit $\alpha\mathbf{1}$. When the target current amplitude $i_a^*$ is greater than its upper limit $i_a^*\mathbf{2}$, the superimposed current amplitude setting section 77 sets the superimposed current amplitude $\alpha$ to be its upper limit $\alpha\mathbf{2}$. When the target current amplitude $i_a^*$ is greater than or equal to the lower limit $i_a^*\mathbf{1}$, and smaller than or equal to the upper limit $i_a^*\mathbf{2}$, the superimposed current amplitude setting section 77 sets the superimposed current amplitude $\alpha$ to be a value linearly interpolated between the points $(i_a^*\mathbf{1}, \alpha\mathbf{1})$ and $(i_a^*\mathbf{2}, \alpha\mathbf{2})$. Thus, the superimposed current amplitude $\alpha$ is set so as to increase along with the increasing of the target current amplitude $i_a^*$.

In Example 1, the lower limit $\alpha\mathbf{1}$ of the superimposed current amplitude $\alpha$ is approximately 3 A, while the upper limit $\alpha\mathbf{2}$ thereof is approximately 5 A. The lower limit $i_a^*\mathbf{1}$ of the target current amplitude $i_a^*$ is approximately 0 A, while the upper limit $i_a^*\mathbf{2}$ thereof is approximately 15 A. As such, an amplitude ratio of a superimposed current wave to a basic wave of current is set to be a few tens %. Here, the basic wave of current indicates a current component contributing the major part of an output torque of the IPMSM 10. The word of basic wave of current is used in order to distinguish the current component from the rotor-position estimation current signal superimposed on the current component. In a synchronous motor, the basic wave of current is generally a sinusoidal wave having a frequency equal to a rotational velocity of rotor.

The target superimposed current, namely, the rotor-position estimation current signal $i_s^*$ is set to be as a sinusoidal wave by the superimposed current command generator 73 on the basis of the superimposed wave phase $\theta_s$ and the superimposed current amplitude $\alpha$ according to Eq. (14).

$$i_s^* = \alpha \sin\theta_s \alpha \sin(\omega_{es} \cdot \zeta Tc) \qquad (14)$$

Here, the PWM carrier period of the PWM controller 37 is denoted by Tc. A superimposed wave angular frequency $\omega_{es}$ is the value of the superimposed wave phase $\theta_s$ divided by the product of the count $\zeta$ and the carrier period Tc.

Figure 11:
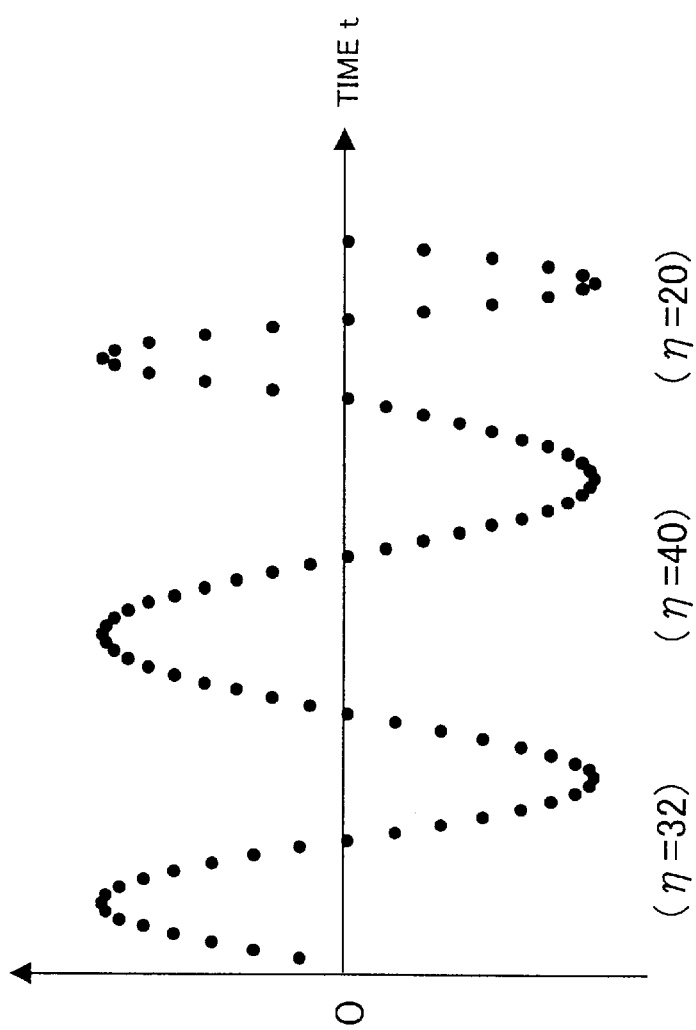
FIG. 11 is a diagram showing the waveform of rotor-position estimation current signal $i_s^*$ in Example 1 of the invention.

FIG. 11 is a diagram showing the rotor-position estimation current signal $i_s^*$ for the division number $\eta$=32, 40, and 20 in Example 1. The count $\zeta$ is incremented by 1 at each of the PWM carrier period. Thus, the time interval between the points in FIG. 11 equals the PWM carrier period Tc. Accordingly, the period of the rotor-position estimation current signal $i_s^*$ equals $\eta$ Tc. Each period of the rotor-position estimation current signal $i_s^*$ varies at random, since the division number $\eta$ varies at random. In Example 1, the period of the rotor-position estimation current signal $i_s^*$ falls within the range of approximately 1.3–2.6 ms, or approximately 375–750 Hz in frequency. The period $\eta$ Tc of the rotor-position estimation current signal $i_s^*$ is an even multiple of the PWM carrier period Tc, since the division number $\eta$ is an even number.

The superimposed wave quadrature component generator 74 sets the superimposed wave quadrature component $h_{s\perp}^*$ to be perpendicular to the rotor-position estimation current signal $i_s^*$ according to Eq. (15), that is, in a manner that the superimposed wave quadrature component $h_{s\perp}^*$ lags the rotor-position estimation current signal $i_s^*$ by 90°. The superimposed wave quadrature component $h_{s\perp}^*$ is non-dimensional, and its amplitude is normalized to unity.

$$h_{s\perp}^* = \sin(\theta_s - 90°) = -\cos\theta_s \qquad (15)$$

[Operation of Position/rotational-velocity Estimating Section 60]

The following is the description of the operation of the position/rotational-velocity estimating, section 60 according to Example 1. The position/rotational-velocity estimating section 60 is characterized by the following three points: First, sampling at each of the PWM carrier period Tc of the $\delta$-axis current $i_\delta$ detected by the current controller 50. Accordingly, the number of times of the samplings is $\eta$ in each period $\eta$ Tc of the rotor-position estimation current signal $i_s$. Second, digital-integrating the product of the sampled $\delta$-axis current $i_\delta$ and the rotor-position estimation current signal $i_s^*$ over one period of the rotor-position estimation current signal $i_s^*$, thereby measuring the estimation error $\epsilon$. Third, correcting the estimated rotational velocity $\omega_m$ and the estimated position $\theta_m$ after limiting the estimation error 68.

Figure 7:
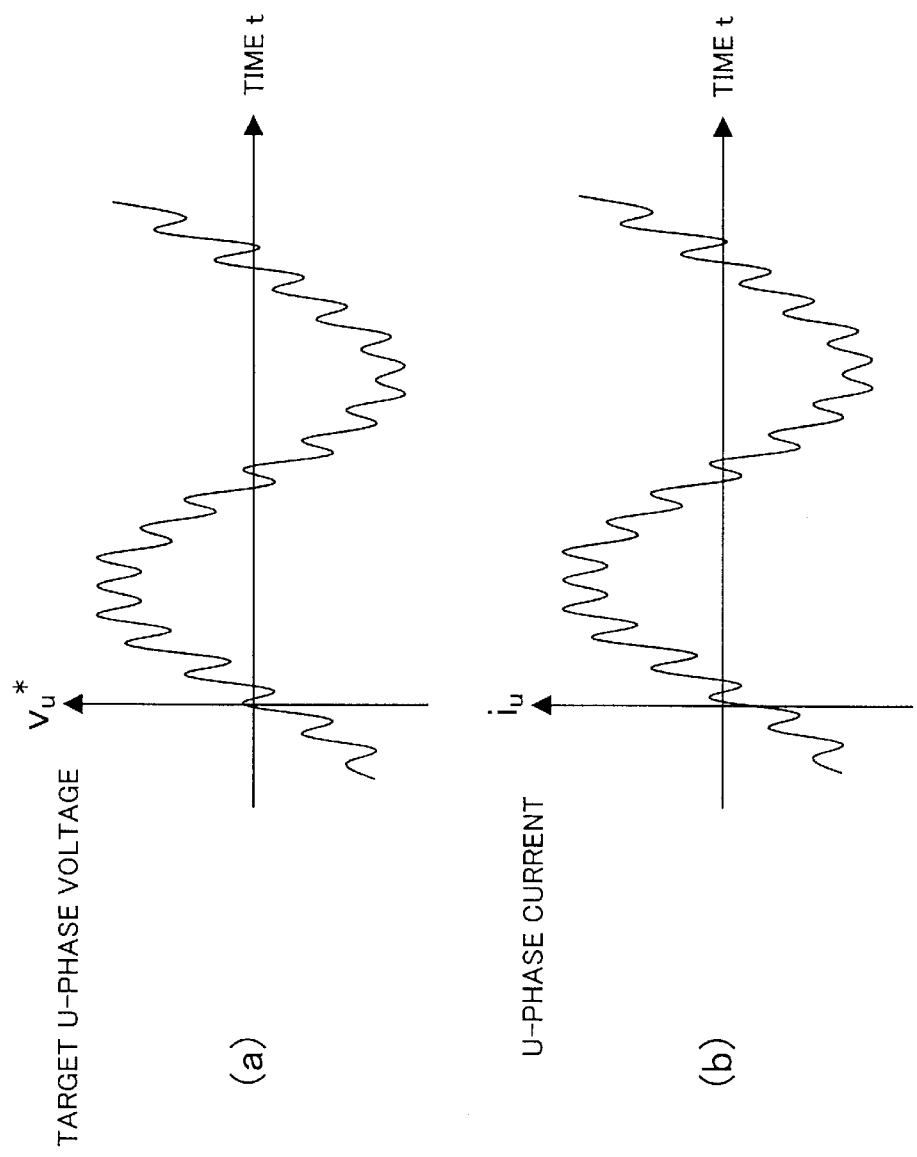
FIG. 7 is a set of diagrams showing the waveforms of a target u-phase voltage $v_u^*$ and a u-phase current $i_u$ in Example 1 of the invention.

The following is the description of a current response to the rotor-position estimation current signal $i_s^*$ in the detected $\delta$-axis current $i_\delta$. FIG. 7 is a diagram showing waveforms of the target u-phase voltage $v_u^*$ and the resultant u-phase current $i_u$ flowing through the u-phase winding 11u in Example 1. The part (a) of FIG. 7 is a waveform diagram of the target u-phase voltage $v_u^*$. The part (b) of FIG. 7 is a waveform diagram of the u-phase current $i_u$.

The rotor-position estimation current signal $i_s^*$ generated by the superimposed wave generator 70 is superimposed on the target $\gamma$-axis current controller 50. The target $\gamma$-axis current $i_\gamma^*$ superimposed the current signal $i_s^*$ is converted to the target voltages. In Example 1, each frequency of the basic wave of the target current and the corresponding component of the target voltage is a few tens Hz or less, whereas a frequency of the rotor-position estimation current signal $i_s^*$ is approximately 400 Hz even at minimum. On the other hand, the rotor-position estimation current signal $i_s^*$ has a few tens t amplitude of the basic wave of the target current. Accordingly, the target u-phase voltage $v_u^*$ superimposed the rotor-position estimation current signal $i_s^*$ on, and the u-phase current $i_u$ superimposed the current response to the rotor-position estimation current signal $i_s^*$ on, are sinusoidal waves with fine wiggling as shown in FIG. 7.

Figure 8:
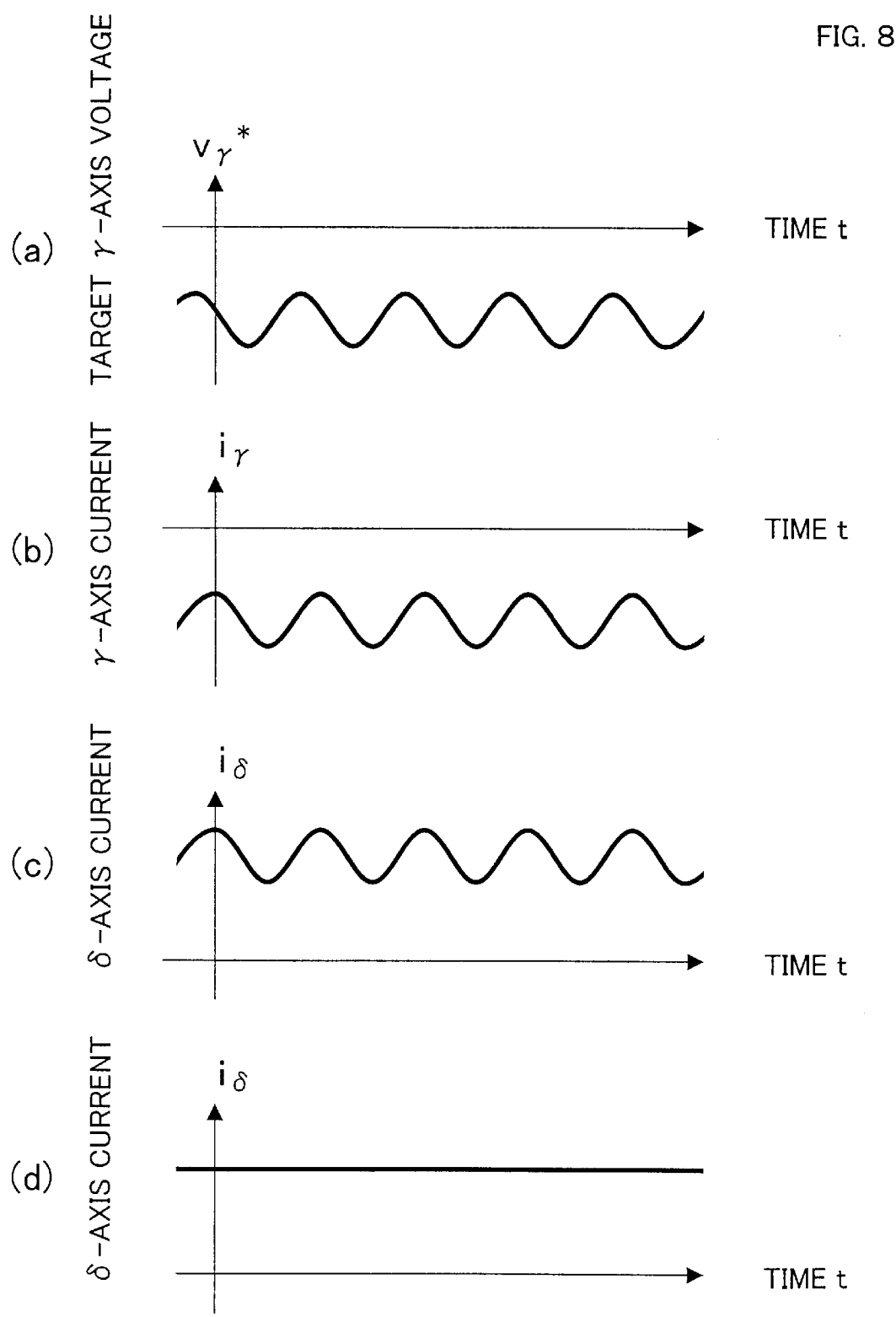
FIG. 8 is a set of diagrams showing the waveforms of a target γ-axis voltage $v_γ^*$, γ-axis current $i_γ$ and δ-axis current $i_δ$ in Example 1 of the invention.

FIG. 8 is a diagram showing waveforms of the target $\gamma$-axis voltage $v_\gamma^*$, the resultant $\gamma$-axis current $i_\gamma$ and the resultant $\delta$-axis current $i_\delta$ in Example 1. The part (a) of FIG. 8 is a waveform diagram of the target $\gamma$-axis voltage $v_\gamma^*$. The part (b) of FIG. 8 is a waveform diagram of the γ-axis current $i_γ$. The part (c) of FIG. 8 is a waveform diagram of the δ-axis current $i_δ$ when the position estimation error $Δθ$ is a finite value. The part (d) of FIG. 8 is a waveform diagram of the δ-axis current $i_{67}$ when the position estimation error $Δθ$ is substantially zero.

The γ-axis and the δ-axis are fixed axes to the rotor 12 as shown in FIG. 6, when the position estimation error $Δθ$ is constant. Accordingly, each basic wave of the target γ-axis voltage $V_γ^*$, the resultant γ-axis current $i_γ$, and the resultant δ-axis current $i_{67}$ is a direct current. Thus, the superimposed wave components with substantially the same period as the rotor-position estimation current signal $i_s^*$ appear as the AC components in the resultant currents $i_γ$ and $i_δ$ as shown in FIG. 8, when the signal $i_s^*$ is superimposed on the target γ-axis current $i_γ^*$. In particular, the amplitude of the current response to the rotor-position estimation current signal $i_s^*$ or the superimposed wave component of the δ-axis current $i_δ$ depends on the position estimation error $Δθ$. To be exact, the amplitude is proportional to sin (2$Δθ$, as described later. Accordingly, the δ-axis current $i_{67}$ has a superimposed wave component as shown in the part (c) of FIG. 8, when the position estimation error $Δθ$ is a substantially finite value. In contrast, the δ-axis current $i_δ$ has no superimposed wave component as shown in the part (d) of FIG. 8, when the position estimation error $Δθ$ is substantially zero.

The following is the reason why the amplitude of the superimposed wave component in the δ-axis current $i_δ$ is proportional to sin (2$Δθ$: The voltage equations of the IPMSM 10 for d-axis and q-axis are shown as Eqs. (16) and (17).

$$vd=(R+p·Ld)id-ω_e·Lq·iq \tag{16}$$

$$vq=(R+p·Lq)iq+ω_e·Ld·id+ω_e·\psi \tag{17}$$

Here, p is a differential operator. The d-axis and q-axis components of voltage are expressed by the d-axis voltage $v_d$ and the q-axis voltage $v_q$, respectively. The d-axis and q-axis components of current are expressed by the d-axis current $i_d$ and the q-axis current $i_q$, respectively. The resistance of the stator windings is denoted by R. The d-axis inductance and the q-axis inductance are denoted by Ld and Lq, respectively. The effective value of the dq-axis winding flux linkage is denoted by $\psi$, and the actual angular velocity of the rotor 12 is denoted by $ω_e$.

For the control of the rotor revolution, the estimated position $θ_m$ is used, since the actual position $θ$ of the rotor 12 is unknown. Accordingly, Eqs. (16) and (17) in terms of a coordinate system of d-axis and q-axis are transformed into the representation in terms of a coordinate system of estimated d-axis and q-axis, namely, γ-axis and δ-axis, as follows: As shown in FIG. 6, the γ-axis and the δ-axis deviate from the d-axis and the q-axis, respectively, by the position estimation error $Δθ=θ-θ_m$. Accordingly, Eqs. (16) and (17) are rewritten into Eqs. (18) and (19) in terms of δ-axis and δ-axis.

$$v_γ=(R+ω_{em}·L_{γδ}+p·L_γ)i_γ+(-ω_{em}·L_δ-p·L_{γδ})i_δ+ω_{em}·\psi(-\sin Δθ) \tag{18}$$

$$v_δ=(R-ω_{em}·L_{γδ}+p·L_δ)i_δ+(ω_{em}·L_γ-p·L_{γδ})i_γ+ω_{em}·\psi\cos Δθ \tag{19}$$

Here, an estimated angular velocity of the rotor 12 is denoted by $ω_{em}$. The estimated angular velocity $ω_{em}$ is calculated from the estimated rotational velocity $ω_m$. In Eqs. (18) and (19), the difference between the estimated angular velocity $ω_{em}$ and the actual angular velocity $ω_e$ is neglected.

The d-axis inductance Ld and the q-axis inductance Lq are transformed into the γ-axis inductance $L_γ$, the δ-axis inductance $L_δ$, and the mutual inductance $L_{γδ}$ between both axis directions, according to Eqs. (20), (21), and (22).

$$L_γ=\{(Ld+Lq)-(Lq-Ld)\cos(2Δθ)\}/2 \tag{20}$$

$$L_δ=\{(Ld+Lq)+(Lq-Ld)\cos(2Δθ)\}/2 \tag{21}$$

$$L_{γδ}=\{(Lq-Ld)\sin(2Δθ)\}/2 \tag{22}$$

The γ-axis inductance $L_γ$ and the δ-axis inductance $L_δ$ are positive regardless of the position estimation error $Δθ$ as seen from Eqs. (20) and (21).

Superimposed wave components of the γ-axis current $i_γ$ and the δ-axis current $i_{67}$ contribute to the γ-axis voltage $v_γ$ and the δ-axis voltage $v_δ$ only through the terms including the superimposed wave components in the right hand sides of Eqs. (18) and (19), because of the principle of superposition. Accordingly, superimposed wave components $v_{γs}$ and $v_{δs}$ of the γ-axis voltage $v_γ$ and the δ-axis voltage $v_δ$ are expressed by Eqs. (23) and (24), respectively.

$$v_{γs}=(R+ω_{em}·L_{γδ}+p·L_γ)i_{γs}+(-ω_{em}·L_δ-p·L_{γδ})i_{δs} \tag{23}$$

$$v_{γs}=(R-ω_{em}·L_{γδ}+p·L_γ)i_{γs}+(ω_{em}·L_γ-p·L_{γδ})i_{δs} \tag{24}$$

The following approximation simplifies Eqs. (23) and (24): Example 1 is mainly aimed to the revolution control over the rotor 12 that is at a stop or slowly revolves. Accordingly, the rotational velocity of the rotor 12 can be assumed to be at a low level. As described above, the frequency of the superimposed wave component is approximately 400 Hz even at minimum, and is sufficiently higher than the basic wave whose frequency is a few tens Hz at maximum. Accordingly, the angular frequency of the superimposed wave component, namely, the superimposed wave angular frequency $ω_{es}$, is sufficiently higher than the basic wave, namely, the estimated angular velocity $ω_{em}$ of the rotor 12. In Example 1, an impedance expressed by the product between the superimposed wave angular frequency $ω_{es}$ and one of the equivalent inductances $L_γ$, $L_δ$, and $L_{γδ}$, each of which is approximately 10 mH, is approximately 25 Ω, and sufficiently higher than the approximately 1 Ω resistance R of the stator windings. Thus, the terms including the estimated angular velocity $ω_{em}$ and the resistance R are neglected in comparison with the other terms. Then, Eqs. (23) and (24) are approximated by Eqs. (25) and (26), respectively.

$$v_{γs}=p·L_γ·i_{γs}-p·L_{γδ}·i_{δs} \tag{25}$$

$$v_{δs}=p·L_δ·i_{δs}-p·L_{γδ}·i_{γs} \tag{26}$$

Furthermore, Eqs. (25) and (26) are solved with respect to the superimposed wave components $i_{γs}$ and $i_{δs}$ of the γ-axis current $i_γ$ and the δ-axis current $i_δ$, through an approximation of neglecting the time variation in the position estimation error $Δθ$, that is, assuming the equivalent inductances $L_γ$, $L_{67}$, and $L_{γδ}$ to be constant. Then, Eqs. (27) and (28) are obtained with respect to the superimposed wave components $i_{γs}$ and $i_{δs}$.

$$p·i_{γs}=(L_δ·v_{γs}+L_{γδ}·v_{δs})/Λ \tag{27}$$

$$p·i_{δs}=(L_γ·v_{δs}+L_{γδ}·v_{γs})/Λ \tag{28}$$

$$Λ=L_γ·L_δ-L_{γδ}·L_{γδ} \tag{29}$$

In other words, in the revolution control of the rotor 12, the resultant current response $i_{γs}$ and $i_{δs}$ are superimposed on the γ-axis current $i_γ$ and the δ-axis current $i_δ$, respectively, when the superimposed wave components $v_{γs}$ and $v_{δs}$ are superimposed on the γ-axis voltage $v_\gamma$ and the δ-axis voltage $v_\delta$, respectively. In particular, when the superimposed wave voltage $v_{\gamma s}$ is superimposed on the γ-axis voltage $v_\gamma$ alone, that is, the δ-axis component $v_{\delta s}$ is zero, the current response $i_{\gamma s}$ and $i_{\delta s}$ are expressed by Eqs. (30) and (31), respectively.

$$p \cdot i_{\gamma s} = L_\delta \cdot v_{\gamma s}/\Lambda \qquad (30)$$

$$p \cdot i_{\delta s} = L_{\gamma \delta} \cdot v_{\gamma s}/\Lambda \qquad (31)$$

In Example 1, the current controller 50 superimposes the rotor-position estimation current signal $i_s^*$ on the target γ-axis current $i_\gamma^*$, thereby generating the target superimposed current. The rotor-position estimation current signal $i_s^*$ is given in Eq. (14). In contrast, no rotor-position estimation current signal is superimposed on the target δ-axis current $i_\delta^*$.

$$i_s^* = \alpha \sin \theta_s = \alpha \sin(\omega_{es} \cdot \zeta Tc) \qquad (14)$$

Here, the PWM carrier period in the PWM controller 37 is denoted by Tc. Furthermore, the superimposed wave angular frequency $\omega_{es}$ is set to be a value of the superimposed wave phase $\theta_s$ divided by the product of the count ζ and the PWM carrier period Tc.

The PWM carrier frequency is approximately 15 kHz and sufficiently higher than the superimposed wave frequency, which is approximately 750 Hz at maximum. That is, the PWM carrier period Tc is sufficiently shorter than the superimposed wave period. On the other hand, the PWM carrier period Tc equals the sampling time interval for the digital signal of the rotor-position estimation current signal $i_s^*$. Thus, the sampling time interval is neglected, and the rotor-position estimation current signal $i_s^*$ is treated as an analog signal. With this approximation, the product ζ Tc of the count ζ and the PWM carrier period Tc may be replaced with a continuous time parameter t. Then, the rotor-position estimation current signal $i_s^*$ is expressed as an analog signal as shown in Eq. (32).

$$i_s^* = \alpha \sin(\omega_{es} \cdot t) \qquad (32)$$

As described above, the voltage command generator 53 in the current controller 50 controls the target γ-axis voltage $v_\gamma^*$ through the proportional plus integral control and the non-interacting control (Eq. (7)) based on the target γ-axis current $i_\gamma$ and the rotor-position estimation current signal $i_s^*$. Accordingly, a voltage component $v_{\gamma s}^*$ corresponding to the rotor-position estimation current signal $i_s^*$ is superimposed on the target γ-axis voltage $v_\gamma$ according to Eq. (33). Here, the superimposed wave have the γ-axis component $v_{\gamma s}^*$ alone, that is, no δ-axis component $v_{\delta s}$ according to Eq. (34).

$$v_{\gamma s}^* = K_{Pd} \cdot i_s^* = K_{Pd} \cdot \alpha \sin \theta_s = K_{Pd} \cdot \alpha \sin(\omega_{es} \cdot t) \qquad (33)$$

$$v_{\gamma s}^* = 0 \qquad (34)$$

Here, the proportional coefficient $K_{Pd}$ is the proportional gain in Eq. (7).

The superimposed wave component $i_{\gamma s}$ of the γ-axis current $i_\gamma$ and the superimposed wave component $i_{\delta s}$ of the δ-axis current $i_{67}$ are expressed by Eqs. (35) and (36), through substituting Eqs. (33) and (34) into Eqs. (30) and (31).

$$i_{\gamma s} = L_\delta \cdot K_{Pd} \cdot \alpha \{-\cos(\omega_{es} \cdot t)\}/(\omega_{es} \cdot \Lambda) \qquad (35)$$
$$= L_\delta \cdot K_{Pd} \cdot \alpha \{-\cos \theta_s\}/(\omega_{es} \cdot \Lambda)$$

$$i_{\delta s} = L_{\gamma \delta} \cdot K_{Pd} \cdot \alpha \{-\cos(\omega_{es} \cdot t)\}/(\omega_{es} \cdot \Lambda) \qquad (36)$$
$$= L_{\gamma \delta} \cdot K_{Pd} \cdot \alpha \{-\cos \theta_s\}/(\omega_{es} \cdot \Lambda)$$

As seen from Eqs. (35) and (36), the amplitudes of the superimposed wave components $i_{\gamma s}$ and $i_{\delta s}$ are proportional to the inductances $L_\delta$ and $L_{\gamma \delta}$ respectively.

Figure 9:
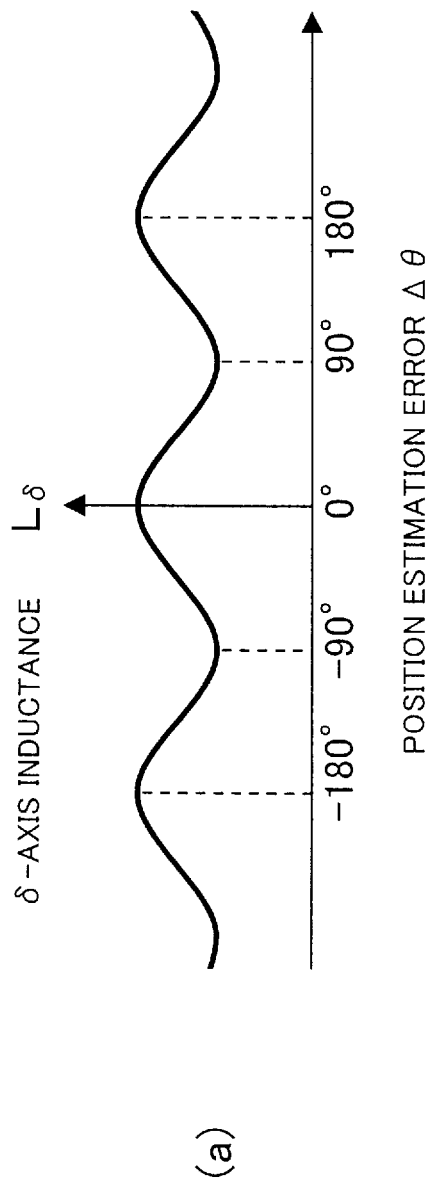
FIG. 9 is a set of diagrams showing the variations in a δ-axis inductance $L_δ$ and a mutual inductance $L_{γδ}$ between γ-axis and δ-axis, depending on a position estimation error $Δθ$ in Example 1 of the invention.
Figure 9:
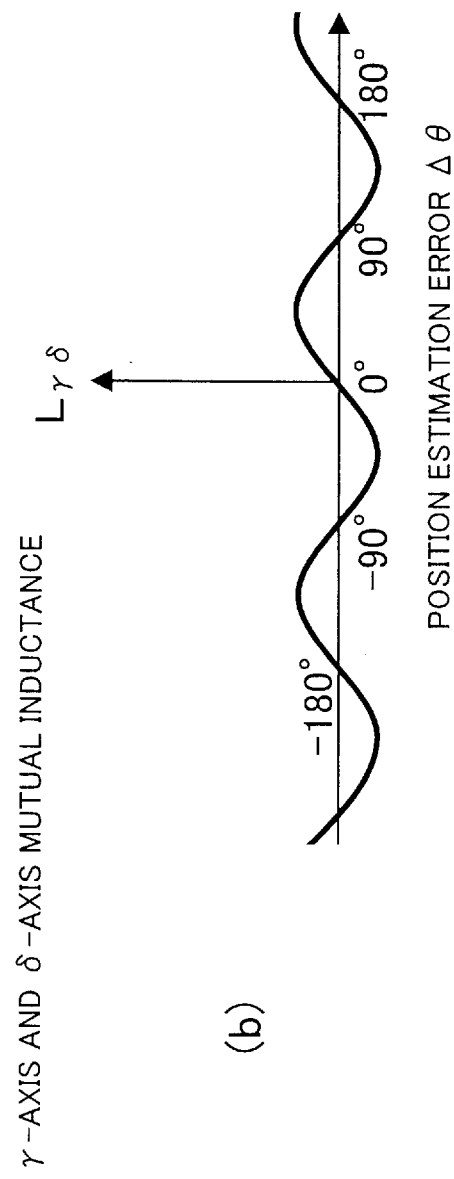

FIG. 9 is a diagram showing variations in the inductances $L_\delta$ and $L_{\gamma \delta}$ depending on the position estimation error Δθ in Example 1. The part (a) of FIG. 9 shows a variation in the δ-axis inductance $L_\delta$. The part (b) of FIG. 9 shows a variation in the mutual inductance $L_{\gamma \delta}$ between the γ-axis and the δ-axis. The δ-axis inductance $L_\delta$ is positive regardless of the position estimation error Δθ from Eq. (21). Accordingly, the amplitude of the superimposed wave component $i_{\gamma s}$ of the γ-axis current $i_\gamma$ is also positive regardless of the position estimation error Δθ. On the other hand, the mutual inductance $L_{\gamma \delta}$ between the γ-axis and the δ-axis is proportional to sin (2Δθ) from Eq. (22). Furthermore, the amplitude of the superimposed wave component $i_{\gamma s}$ of the δ-axis current $i_{67}$ is proportional to the mutual inductance $L_{\gamma \delta}$ from Eq. (36). Accordingly, the amplitude of the superimposed wave component $i_{\delta s}$ of the δ-axis current id is proportional to sin (2Δθ).

In particular, the amplitude of the superimposed wave component $i_{\delta s}$ equals zero, when the position estimation error Δθ is zero, as shown in the part (d) of FIG. 8. In contrast, the amplitude of the superimposed wave component $i_{\delta s}$ is a finite value, when the position estimation error Δθ is a finite value, as shown in the part (c) of FIG. 8.

As described above, the amplitude of the superimposed wave component $i_{\delta s}$ of the δ-axis current $i_{67}$ is proportional to sin (2Δθ). Accordingly, the position/rotational-velocity estimating section 60 having the above-described configuration corrects the estimated position $\theta_m$ so that the amplitude of the superimposed wave component $i_{\delta s}$ of the δ-axis current $i_{67}$ substantially equals zero.

The following is the description of the correction.

At first, the estimation error detector 61 calculates the estimation error ε from the detected δ-axis current $i_\delta$ as follows: From Eq. (36), the superimposed wave component $i_{\delta s}$ of the δ-axis current $i_{67}$ oscillates proportionally to $-\cos \theta_s$. On the other hand, from Eq. (14), the rotor-position estimation current signal $i_s^*$ oscillates proportionally to sin $\theta_s$. Furthermore, as described above, the phase of the target γ-axis voltage $v_\gamma^*$ substantially coincides with the phase of the rotor-position estimation current signal $i_s^*$. Thus, as shown in the parts (a) and (c) of FIG. 8, the target γ-axis voltage $v_\gamma^*$, and the δ-axis current $i_\delta$ oscillate with phases shifted by about 90° from each other. Accordingly, the estimation error detector 61 extracts the superimposed wave component $i_{\delta s}$ from the δ-axis current $i_\delta$ through a Fourier analysis, thereby determining the amplitude of the component $i_{\delta s}$ as the estimation error ε. More specifically, the δ-axis current $i_\delta$ is multiplied by $-\cos \theta_s$, and then integrated over one period of the superimposed wave component $i_{\delta s}$. The result of the integration is a Fourier coefficient, which corresponds to cos $\theta_s$, of the δ-axis current $i_\delta$, and hence equals the amplitude of the superimposed wave component $i_{\delta s}$ of the δ-axis current $i_\delta$.

The above-described Fourier integration is carried out by means of the following discrete Fourier integration. According to Eqs. (13) and (15), the superimposed wave quadrature component $h_{s\perp}^*$ is expressed by the same number of the samples as the division number η, within one period of the superimposed wave component $i_{\delta s}$ of the δ-axis current $i_\delta$. The samples are input from the superimposed wave quadrature component generator 74 in the superimposed wave generator 70 to the estimation error detector 61 at each PWM carrier period Tc.

$$\theta_s = 360°\zeta/\eta \tag{13}$$

$$h_{s\perp}^* = \sin(\theta_s - 90°) = -\cos\theta_s \tag{15}$$

In synchronization with the input, the three-phase to two-phase converter 52 in the current controller 50 outputs the samples of the δ-axis current $i_\delta$ to the estimation error detector 61. The estimation error detector 61 multiplies the input samples of the δ-axis current $i_\delta$ and the superimposed wave quadrature component $h_{s\perp}^*$ with each other, and storing the results of the multiplication in the internal register. The process of the multiplication is carried out for the samples input at each PWM carrier period Tc. The results of the multiplication are added up and stored in the register inside the estimation error detector 61. The operation process is repeated for one period of the superimposed wave component $i_{\delta s}$ of the δ-axis current $i_\delta$, that is, for a time interval equal to the product η Tc of the division number η and the PWM carrier period Tc. As a result, the value stored in the register is determined as the estimation error ε. The estimation error ε is calculated according to Eq. (37).

$$\varepsilon = \Sigma(i_\delta \cdot h_{s\perp}^*) \tag{37}$$

Here, the summation sign Σ indicates the sum of all the samples in one period of the superimposed wave component $i_{\delta s}$ of the δ-axis current $i_\delta$.

Eqs. (15) and (36) are substituted into Eq. (37). Then, the estimation error ε is proportional to $L_{\gamma\delta}$ as shown in Eq. (38). Furthermore, Eq. (22) is substituted into Eq. (38). Then, the estimation error ε is proportional to $\sin(2\Delta\theta)$ as shown in Eq. (39). As seen from Eq. (40), the estimation error ε is substantially proportional to the position estimation error Δθ, in particular, when the position estimation error Δθ is sufficiently small. Accordingly, the position estimation error Δθ substantially equals zero, when the estimation error ε converges to zero.

$$\varepsilon \approx (\eta/2) L_{\gamma\delta} \cdot K_{Pd} \cdot \alpha/(\omega_{es} \cdot \Lambda) \tag{38}$$

$$= \sin(2\Delta\theta)\{(Lq - Ld)/2\} \cdot (\eta/2) \cdot K_{Pd} \cdot \alpha/(\omega_{es} \cdot \Lambda) \tag{39}$$

$$\approx 2\Delta\theta\{(Lq - Ld)/2\} \cdot (\eta/2) \cdot K_{Pd} \cdot \alpha/(\omega_{es} \cdot \Lambda) \tag{40}$$

The register in the estimation error detector 61 for storing the estimation error ε is reset by the estimation error resetting section 65 at each period of the superimposed wave component $i_{\delta s}$ of the δ-axis current $i_\delta$. Thus, the estimation error ε is newly provided at each period of the superimposed wave component $i_{\delta s}$ of the δ-axis current $i_\delta$.

The estimation error limiter 62 limits the estimation error ε according to Eq. (41) before correcting the estimated position $\theta_m$, as follows: Here, a limited estimation error ε is referred to as an effective estimation error ε1. The effective estimation error ε1 is replaced with a positive threshold value $E_{lim}$, when the estimation error ε exceeds the value $\epsilon_{lim}$. The effective estimation error ε1 is replaced with $-\epsilon_{lim}$, when the estimation error ε drops below a negative threshold value $-\epsilon_{lim}$. The effective estimation error ε1 is set to be the estimation error ε, when the estimation error ε falls within the inclusive range from $-\epsilon_{lim}$ to $\epsilon_{lim}$.

$$\epsilon 1 = -\epsilon_{lim}(\epsilon < -\epsilon_{lim})$$

$$\epsilon 1 = \epsilon(-\epsilon_{lim} \leq \epsilon \leq \epsilon_{lim})$$

$$\epsilon 1 = \epsilon_{lim}(\epsilon > \epsilon_{lim}) \tag{41}$$

Next, the angle lead generator 63 determines the angle lead $\theta_p$ based on the effective estimation error ε1 according to Eq. (42). The angle lead $\theta_p$; corresponds to a manipulated variable in the proportional plus integral control over the effective estimation error ε1.

$$\theta_p = K_{TPP} \cdot \epsilon 1 + \Sigma K_{TPI} \epsilon 1 \tag{42}$$

Here, the proportional gain is denoted by $K_{TPP}$, while the integral gain is denoted by $K_{TPI}$. The summation sign Σ indicates the sum of all the samples in the range from the start of the control to the output of the angle lead $\theta_p$.

Furthermore, the estimated rotational velocity correcting section 64 and the estimated position correcting section 66 correct the estimated rotational velocity $\omega_m$ and the estimated position $\theta_m$, respectively, based on the angle lead $\theta_p$ as follows: The estimated rotational velocity correcting section 64 determines the estimated rotational velocity $\omega_m$ from the angle lead $\theta_p$ through the digital LPF. More specifically, the operation according to Eq. (43) is carried out.

$$\omega_m(n) = K_w \cdot K_{TPW} \cdot \theta_p + (1 - K_w)\omega_m(n-1) \tag{43}$$

Here, the LPF coefficient is denoted by $K_w$. The coefficient $K_w$ is a constant greater than zero and not exceeding unity. Generally, the smaller the coefficient $K_w$ is, the greater the LPF effects. The conversion coefficient from the angle lead $\theta_p$ to the estimated rotational velocity $\omega_m$ is denoted by $K_{TPW}$. Furthermore, the (n–1)-th and n-th samples of the estimated rotational velocity $\omega_m$ counted from the beginning of the revolution control of the rotor 12 are denoted by $\omega_m(n-1)$ and $\omega_m(n)$, respectively. According to Eq. (43), the (n–1)-th sample $\omega_m(n-1)$ of the estimated rotational velocity $\omega_m$ is corrected on the basis of the angle lead $\theta_p$, thereby determining the n-th sample $\omega_m(n)$.

The estimated position correcting section 66 corrects the estimated position $\theta_m$ by the angle lead $\theta_p$ according to Eq. (44).

$$\theta_m(n)\theta_m(n-1) + \theta_p \tag{44}$$

Here, the (n–1)-th and n-th samples of the estimated position θ m counted from the beginning of the revolution control of the rotor 12 are denoted by $\theta_m(n-1)$ and $\theta_m(n)$, respectively. According to Eq. (44), the angle lead $\theta_p$ is added to the (n–1)-th sample $\theta_m(n-1)$ of the estimated position $\theta_m$ as a correction, thereby determining the n-th sample $\theta_m(n)$.

Thus, the n-th action of the revolution control of the rotor 12 is carried out, based on the n-th samples $\omega_m(n)$ and $\theta_m(n)$ determined as described above.

[Operation of Example 1]

Figure 13:
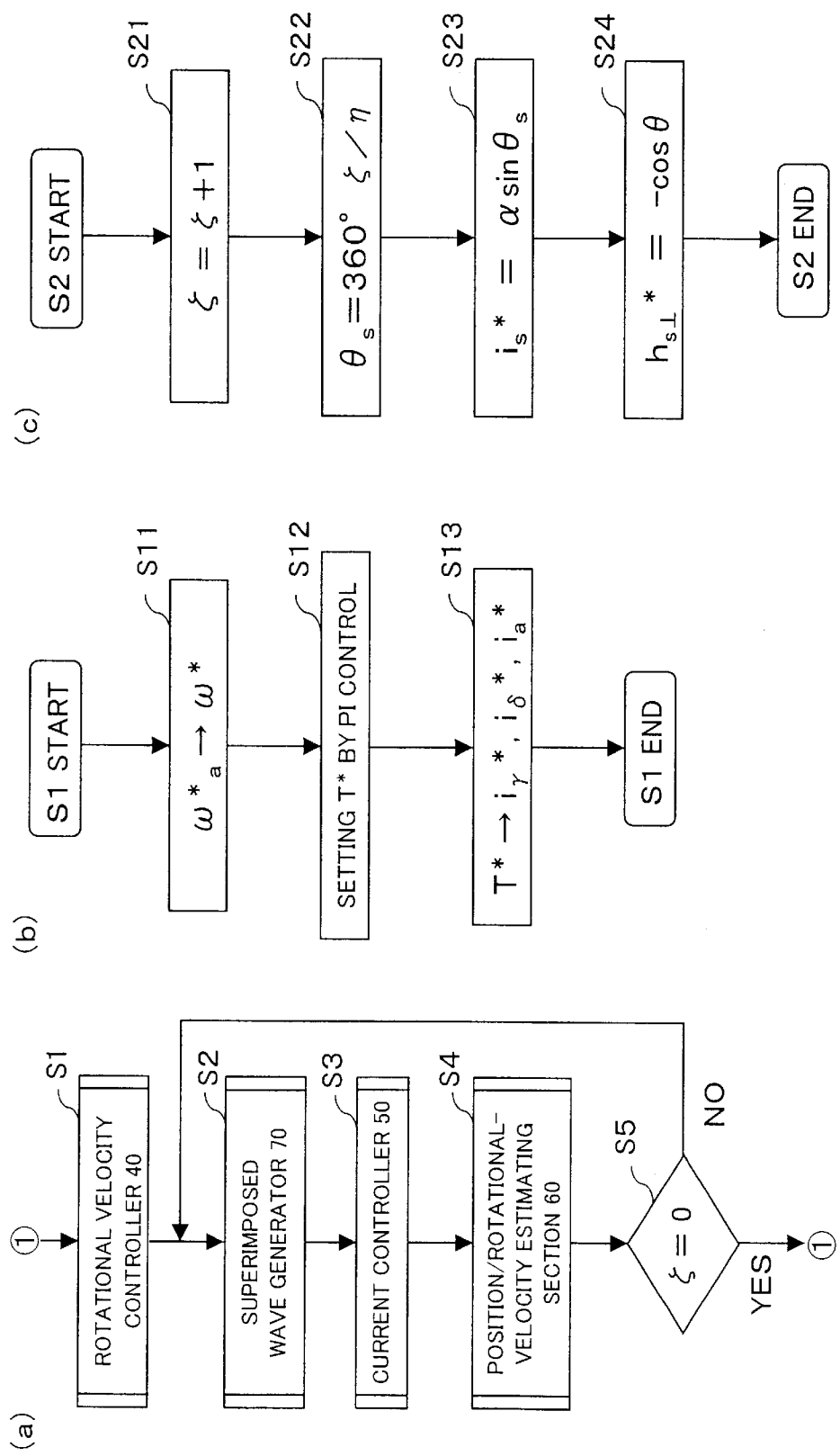
FIG. 13 is a set of flow charts of the operations of the overall system, a rotational velocity controller 40, and a superimposed wave generator 70 in Example 1 of the invention.
Figure 14:
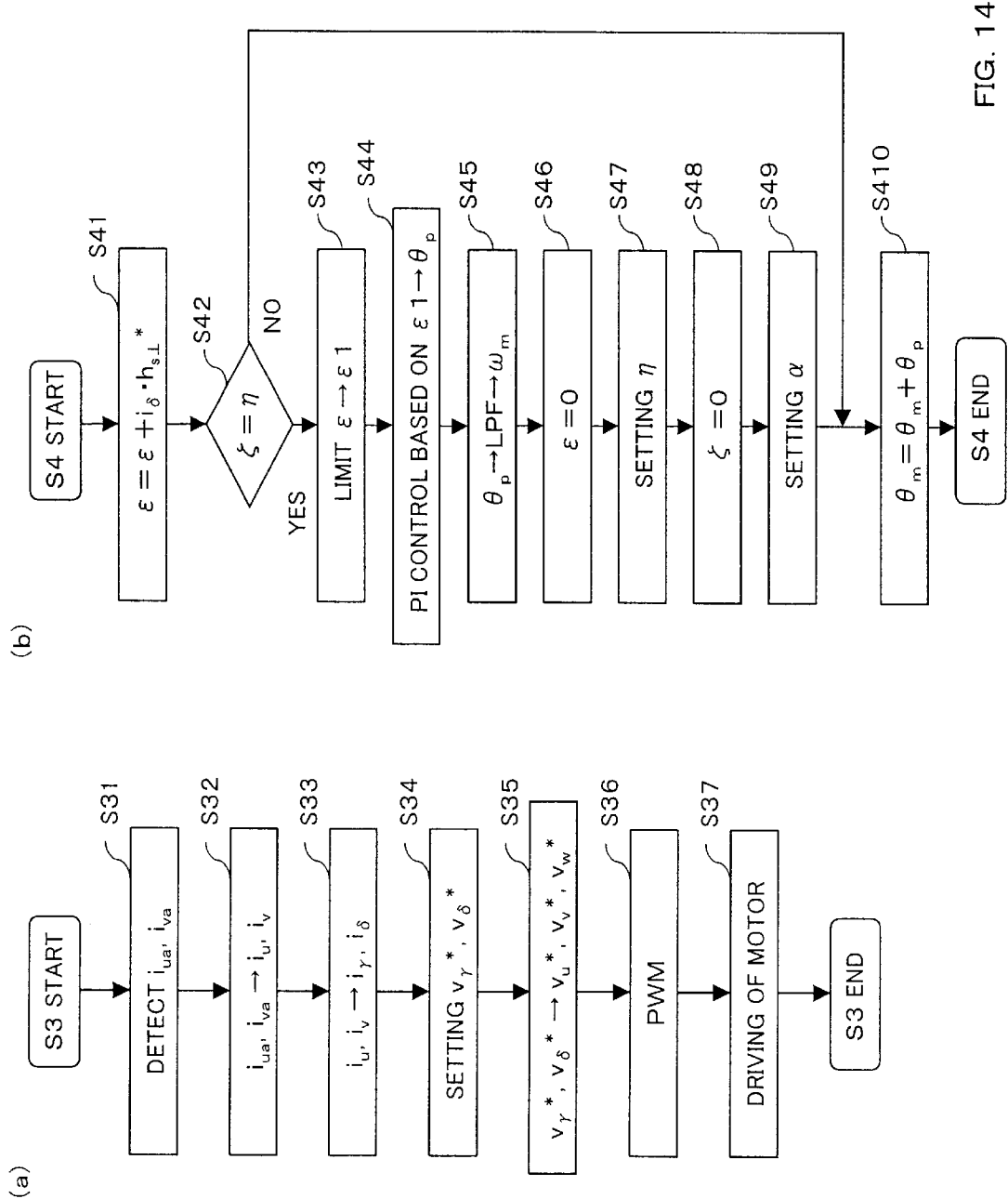
FIG. 14 is a set of flow charts of the operations of a current controller 50 and a position/rotational-velocity estimating section 60 in Example 1 of the invention.

In Example 1, the above-described operations of the various components are integrated in the following manner, thereby controlling the rotational velocity of the rotor 12 so as to coincide with the target rotational velocity ω*. FIGS. 13 and 14 are flow charts of the control over the rotational velocity of the rotor 12 in Example 1. The part (a) of FIG. 13 is a flow chart of the overall control over the rotational velocity of the rotor 12 in Example 1. The part (b) of FIG. 13 is a flowchart of the operation of the rotational velocity controller 40. The part (c) of FIG. 13 is a flow chart of the operation of the superimposed wave generator 70. The part (a) of FIG. 14 is a flow chart of the operation of the current controller 50. The part (b) of FIG. 14 is a flow chart of the operation of the position/rotational-velocity estimating section 60.

The following is the description of the flow of the overall control over the rotational velocity of the rotor 12 in Example 1 with reference to the part (a) of FIG. 13.

<Step S1>

The rotational velocity controller 40 determines the basic waves of the target γ-axis current $i_\gamma$* and the target δ-axis current $i_\delta$* based on the target rotational velocity $\omega^*_a$ and the estimated rotational velocity $\omega_m$.

<Step S2>

The superimposed wave generator 70 sets the target superimposed current, namely, the rotor-position estimation current signal $i_s$*.

<Step S3>

The current controller 50 detects actual currents. A detected γ-axis current is compared with the target γ-axis current with superimposed wave ($i_\gamma$*+$i_s$*), which is the target γ-axis current $i_\gamma$* superimposed the rotor-position estimation current signal $i_s$* on. A detected δ-axis current is compared with the target δ-axis current $i_\delta$*. Target voltages $v_u$*, $v_v$*, and $v_w$* are determined through the proportional plus integral control based on the differences between the detected currents and the target currents, and then output to the motor driver 30. The target voltages $v_u$*, $v_v$*, and $v_w$* are modulated through the PWM in the motor driver 30, thereby resulting in the switching signals $g_{uh}$, $g_{ul}$, $g_{vh}$, $g_{vl}$, $g_{wh}$, and $g_{wl}$. The motor driver 30 controls the voltages applied across the stator windings 11u, 11v, and 11w according to the switching signals $g_{uh}$, $g_{ul}$, $g_{vh}$, $g_{vl}$, $g_{wh}$, and $g_{wl}$. The control over the applied voltages results in the currents flowing through the stator windings 11u, 11v, and 11w and generating a torque to revolve the rotor 12.

<Step S4>

The position/rotational-velocity estimating section 60 determines the estimation error ε at each period of the rotor-position estimation current signal $i_s$* as described later. Based on the estimation error ε, the estimated position $\theta_m$ is corrected so that the position estimation error Δθ converges to zero.

<Step S5>

The superimposed wave generator 70 compares the count ζ set by the counter 71 with zero. When the count ζ equals zero, the operation is repeated starting at step S1. Otherwise, the operation is repeated starting at step S2. Then, the repetition period of step S1 is substantially equal to the product η Tc of the division number η and the PWM carrier period Tc, and hence, the period of the rotor-position estimation current signal $i_s$*, since the period from step S2 to step S4 is substantially equal to the PWM carrier period Tc. Furthermore, the repetition period η Tc of step S1 varies at random, since the division number η is set at random by the superimposed wave period setting section 75.

Next, the flow of operation of the rotational velocity controller 40 is described with reference to the part (b) of FIG. 13 as follows:

<Step S11>

The ADC 41 converts the analog target rotational velocity $\omega^*_a$ into the target rotational velocity $\omega^*$. The analog target rotational velocity $\omega^*_a$ is indicated by the rotational velocity command [$\omega^*_a$] provided from the outside, preferably from an upper-level computer.

<Step S12>

The PI controlling section 42 determines the target torque T* corresponding to the manipulated variable in the proportional plus integral control based on the target rotational velocity $\omega^*$.

<Step S13>

The torque/current converting section 43 converts the target torque T* into the target γ-axis current $i_\gamma$*, the target δ-axis current $i_\delta$*, and the target current amplitude $i_a$*

Furthermore, the flow of operation of the superimposed wave generator 70 is described with reference to the part (c) of FIG. 13 as follows:

<Step S21>

The counter 71 increments the count ζ by 1.

<Step S22>

The superimposed wave phase setting section 72 updates the superimposed wave phase $\theta_s$.

<Step S23>

The superimposed current command generator 73 generates the superimposed current command [$i_s$*]

<Step S24>

The superimposed wave quadrature component generator 74 generates the superimposed wave quadrature component $h_{s\perp}$.

The flow of operation of the current controller 50 is described with reference to the part (a) of FIG. 14 as follows:

<Step S31>

The phase current sensors 21u and 21v detects the actual currents flowing through the stator windings, namely, the analog u-phase current $i_{ua}$ and the analog v-phase current $i_{va}$.

<Step S32>

The ADC's 51u and 51v perform analog-to-digital conversions from the detected analog u-phase current $i_{ua}$ and the detected analog v-phase current $i_{va}$ to the u-phase current $i_u$ and the v-phase current $i_v$, respectively.

<Step S33>

The three-phase to two-phase converter 52 converts the u-phase current $i_u$ and the v-phase current $i_v$ into the γ-axis current $i_\gamma$ and the δ-axis current $i_\delta$, respectively.

<Step S34>

The voltage command generator 53 compares the γ-axis current $i_\gamma$ with the target γ-axis current with superimposed wave ($i_\gamma$*+$i_s$*) which is the target γ-axis current $i_\gamma$* superimposed the rotor-position estimation current signal $i_s$* on. The voltage command generator 53 further compares the δ-axis current $i_\delta$ with the target δ-axis current $i_\delta$*. The target γ-axis voltage $v_\gamma$* and the target δ-axis voltage $v_\delta$ are determined through the proportional plus integral control based on the differences between the above-described currents and the target currents with superimposed wave.

<Step S35>

The two-phase to three-phase converter 54 converts the target γ-axis voltage $v_\gamma$* δ-axis voltage $v_\delta$* into the target voltages $v_u$*, $v_v$*, and $v_w$*.

<Step S36>

The PWM controller 37 modulates the target voltages $v_u$*, $v_v$*, and $v_w$* through the PWM, thereby determining the switching signals $g_{uh}$, $g_{ul}$, $g_{vh}$, $g_{vl}$, $g_{wh}$, and $g_{wl}$.

<Step S37>

The motor driver 30 controls the voltages applied across the stator windings 11u, 11v, and 11w according to the switching signals $g_{uh}$, $g_{ul}$, $g_{vh}$, $g_{vl}$, $g_{wh}$, and $g_{wl}$. As a result, the currents flowing through the stator windings 11u, 11v, and 11w generate a torque to revolve the rotor 12.

The flow of operation of the position rotational-velocity estimating section 60 is described with reference to the part (b) of FIG. 14 as follows:

<Step S41>

The estimation error detector 61 calculates the estimation error ε.

<Step S42>

The count ζ in the counter 71 is compared with the division number η. Then, the following process bifurcates depending on the result of the comparison. When the count ζ differs from the division number η, the processing of steps S43 through S49 is omitted, and the process proceeds to step S410. When the count ζ equals the division number ζ, the process proceeds to step, S43. Accordingly, steps S43 through S49 are repeated in a period equal to the repetition period of step S1 (cf. the part (a) of FIG. 13).

<Step S43>

The estimation error limiter 62 limits the estimation error ε, thereby determining the effective estimation error ε1.

<Step S44>

The angle lead generator 63 generates the angle lead θP based on the effective estimation error ε1.

<Step S45>

The estimated rotational velocity correcting section 64 corrects the estimated rotational velocity $\omega_m$ with the angle lead $\theta_p$, which is filtered through the LPF.

<Step S46>

The estimation error resetting section 65 resets the estimation error ε stored in the register in the estimation error detector 61.

<Step S47>

The superimposed wave period setting section 75 in the superimposed wave generator 70 set a new division number η. Accordingly, the repetition period η Tc of step S1 is updated.

<Step S48>

The counter resetting section 76 in the superimposed wave generator 70 resets the count ζ in the counter 71 so that ζ=0.

<Step S49>

The superimposed current amplitude setting section 77 in the superimposed wave generator 70 sets the superimposed current amplitude α.

<Step S410>

The estimated position correcting section 66 advances the estimated position $\theta_m$ by the angle lead $\theta_p$. The step S410 is repeated at each PWM carrier period Tc.

Effect of Example 1

The following is the description of the effect of the revolution control of the rotor 12 in Example 1. In Example 1, the period of the rotor-position estimation current signal $i_s^*$ varies at random. Accordingly, the undesired sound caused by the superimposition of the rotor-position estimation current signal $i_s^*$ contains various frequency components instead of a specific frequency component. As a result, the energy of the undesired sound is distributed into the various frequency components. Thus, the amplitude of each frequency component reduces in comparison with the prior art. Thus, the undesired sound due to superimposed wave is reduced in contrast to the prior art motor control apparatus.

In Example 1, according to the amplitude table shown in FIG. 12, the larger the target current amplitude $i_a^*$ is set, the larger the superimposed current amplitude α is set. On the contrary, the smaller the target current amplitude $i_a^*$ is set, the smaller the superimposed current amplitude α is set. Thus, the amplitude of the rotor-position estimation current signal $i_s^*$ is appropriately adjusted to the amplitude of the target current. Accordingly, the amplitude of the rotor-position estimation current signal $i_s^*$ can be suppressed to a minimum level with maintaining a sufficient S/N ratio in the current response detection. Accordingly, the undesired sound due to superimposed wave is reduced in comparison with the prior art motor control apparatus.

When the output torque of the IPMSM 10 is low, an external mechanical structure connected to the shaft 15 only generates a small-undesired sound (mechanical noise). Accordingly, the undesired sound due to superimposed wave of the IPMSM 10 has to be suppressed for the low output torque. When the currents of the stator windings are small, the output torque of the IPMSM 10 is low. In Example 1, a small superimposed current amplitude α is set for a small target current amplitude $i_a^*$, according to the amplitude table shown in FIG. 12. Accordingly, the undesired sound due to superimposed wave is reduced, when the output torque of the IPMSM 10 is low.

In Example 1, the period of the rotor-position estimation current signal $i_s^*$ is substantially equal to the product η Tc of the division number η and the PWM carrier period Tc. On the other hand, the sampling time for the current response is substantially equal to the PWM carrier period Tc. The number of the current response samples equals the division number η within one period of the rotor-position estimation current signal $i_s^*$. The estimation error ε is calculated from the plurality of the samples through the discrete Fourier integration. The noise in each sample is averaged out, since the calculation is an integration based on a plurality of sample. Accordingly, noise in the estimation error ε is smaller than in each sample. Thus, the S/N ratio in the estimation error ε is maintained at a sufficiently high level. The sufficiently large S/N ratio in the estimation error ε avoids the necessity for greatly attenuating the estimation error ε through the LPF. In addition, the sufficiently large S/N ratio in the estimation error ε avoids the necessity for suppressing the proportional gain $K_{TPP}$ and the integral gain $K_{TPI}$ used in the calculation of the angle lead $\theta_p$ (Eq. (42)) to a low level. Accordingly, a large speed of response is maintained in the revolution control of the rotor 12.

In Example 1, the effective estimation error ε1 is determined by limiting the estimation error ε. As a result, the value of the effective estimation error ε1 do not exceed the threshold value $\epsilon_{lim}$, even when the detected δ-axis current $i_\delta$ contains an extremely large noise. Therefore, The limiting of the estimation error ε avoids the necessity for limiting the range of the estimation error ε by greatly attenuating the estimation error ε through the LPF or suppressing the proportional gain $K_{TPP}$ and the integral gain $K_{TPI}$ to a low level. Accordingly, a large speed of response is maintained in the revolution control of the rotor 12.

In Example 1, the period η Tc of the rotor-position estimation current signal $i_s^*$ is set to be an even multiple that of the PWM carrier wave Tc. This improves the precision in the estimation error ε detection by the following reason. In Example 1, the current response $i_{\delta s}$ to the rotor-position estimation current signal $i_s^*$ is obtained from the detected δ-axis current $i_\delta$. The waveform of the current response $i_{\delta s}$ to the rotor-position estimation current signal $i_s^*$ is generally distorted through the PWM control in the motor driver 30. The distortion can be reduced by extending the period of the rotor-position estimation current signal $i_s^*$. However, the period of the rotor-position estimation current signal $i_s^*$ needs to be short to a certain extent for the purpose of clear discrimination between the superimposed wave and the basic wave. Accordingly, the division number η cannot be extremely large. This places an upper limit to the number of the PWM carrier waves (triangular waves) included in one period of the rotor-position estimation current signal $i_s^*$. In other words, the upper limit is equal to the division number η. As a result, the distortion in the waveform of the current response $i_{\delta s}$ can not be suppressed below a certain level. In order to resolve the problem, the period of the rotor-position estimation current signal $i_s^*$ is set to be an even multiple of the PWM carrier wave. Then, the even number of the samples distribute substantially symmetrically between the samples with positive value and the samples with negative one. Accordingly, the errors due to the distortions caused by the PWM are substantially canceled out between the mutually symmetric samples through the discrete Fourier integration to calculate the estimation error $\epsilon$. The cancellation improves the detecting precision of the estimation error $\epsilon$.

Example 2

The following is the description of a position-sensorless motor control apparatus according to Example 2 of the invention. The position-sensorless motor control apparatus according to Example 2 is a preferred example of variation of Example 1.

Example 2 differs from Example 1 in the following two points. First, the rotor-position estimation signal is a voltage signal. In other words, a superimposed wave generator 2070 sets a superimposed voltage command $[v_s^*]$. A current controller 2050 converts a target $\gamma$-axis current $i_\gamma^*$ and a target $\delta$-axis current $i_\delta^*$ into a target $\gamma$-axis voltage $v_\gamma^*$ and a target $\delta$-axis voltage $v_\delta^*$, respectively. After the conversion, the rotor-position estimation voltage signal $v_s^*$ is superimposed on the target $\gamma$-axis voltage $v_\gamma^*$, whereby the target $\gamma$-axis voltage with superimposed wave $(v_\gamma^*+v_s^*)$ is determined. Second, an superimposed wave period setting section 2075 in the superimposed wave generator 2070 sets a division number $\eta$ according to a predetermined table.

Figure 15:
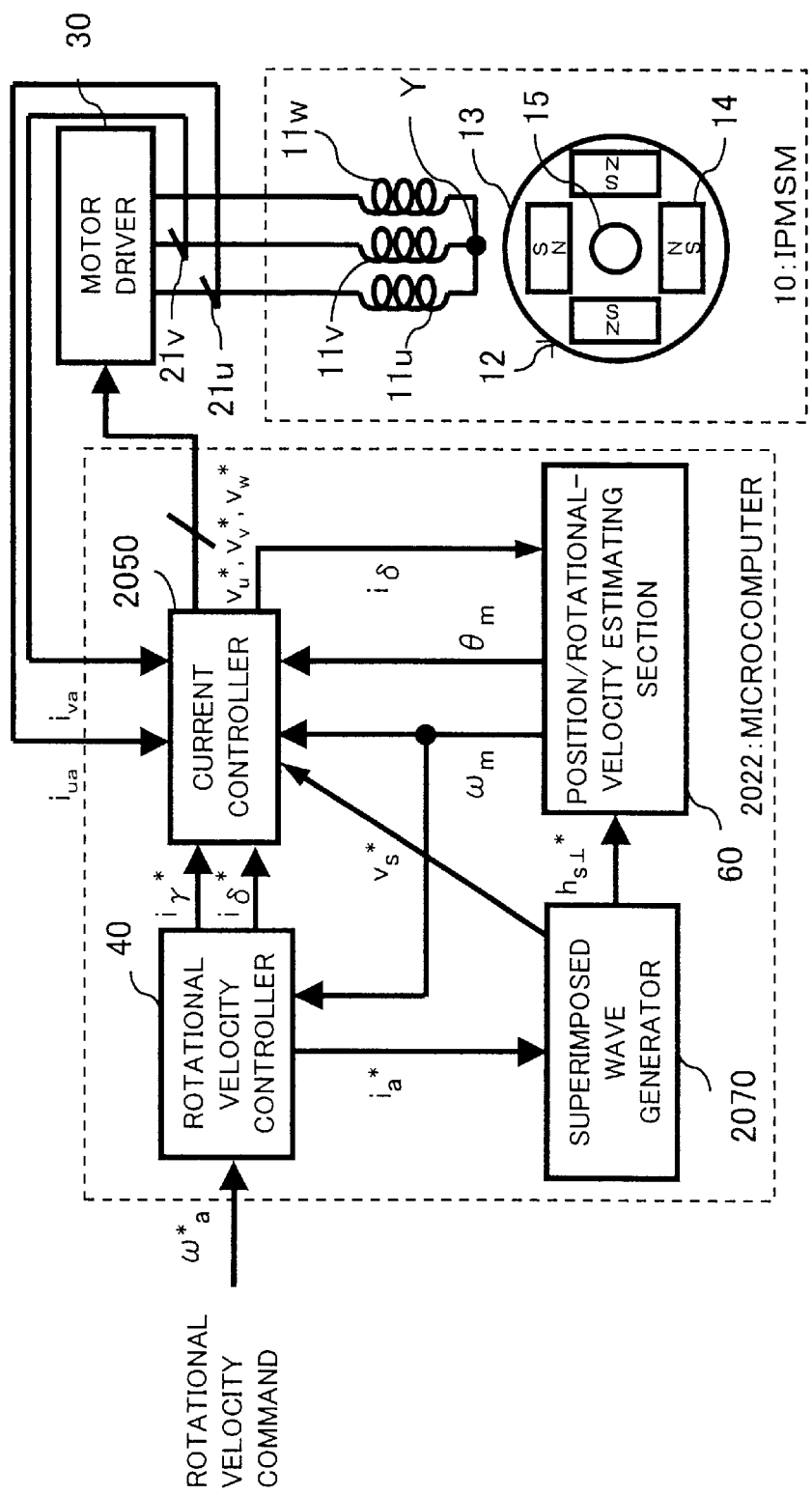
FIG. 15 is a block diagram showing the configuration of a position-sensorless motor control apparatus according to Example 2 of the invention.

FIG. 15 is a block diagram showing the configuration of the position-sensorless motor control apparatus according to Example 2. Example 2 differs Example 1 in the superimposed wave generator 2070 and the current controller 2050. Other components of Example 2 are similar to those of Example 1. Thus, the similar components are designated by the same reference signs as Example 1, and the description in Example 1 is cited for those components.

The current controller 2050 inputs an analog u-phase current value signal $[i_{ua}]$ from a u-phase current sensor 21u, an analog v-phase current value signal $[i_{va}]$ from a v-phase current sensor 21v, and a signal $[\theta_m]$ indicating an estimated position $\theta_m$ from a position/rotational-velocity estimating section 60, and detects a $\gamma$-axis current $i_\gamma$ and a $\delta$-axis current $i_\delta$ as described later. Then, the $\delta$-axis current value signal $[i_\delta]$ indicating the $\delta$-axis current $i_\delta$ is output to the position/rotational-velocity estimating section 60.

The current controller 2050 further inputs: a $\gamma$-axis current command $[i_\gamma^*]$ and a $\delta$-axis current command $[i_\delta^*]$ from a rotational velocity controller 40; an estimated rotational velocity value signal $[\omega_m]$ from the position/rotational-velocity estimating section 60; and a superimposed voltage command $[v_s^*]$ from the superimposed wave generator 2070. Using the input values as well as the previously input estimated position $\theta_m$, the $\delta$-axis current $i_\gamma$, and the $\delta$-axis current $i_\delta$, the current controller 2050 determines a target u-phase voltage $v_u^*$, a target v-phase voltage $v_v^*$, and a target w-phase voltage $v_w^*$ as described later, and then outputs the target three-phase voltages to the motor driver 30.

The superimposed wave generator 2070 inputs a current amplitude command $[i_a^*]$ from the rotational velocity controller 40, and then sets the superimposed voltage command $[v_s^*]$ and a superimposed wave quadrature signal $[h_{s\perp}^*]$. The superimposed voltage command $[v_s^*]$ is output to the current controller 2050, while the superimposed wave quadrature signal $[h_{s\perp}^*]$ is output to the position/rotational-velocity estimating section 60.

[Configuration of Current Controller 2050]

Figure 16:
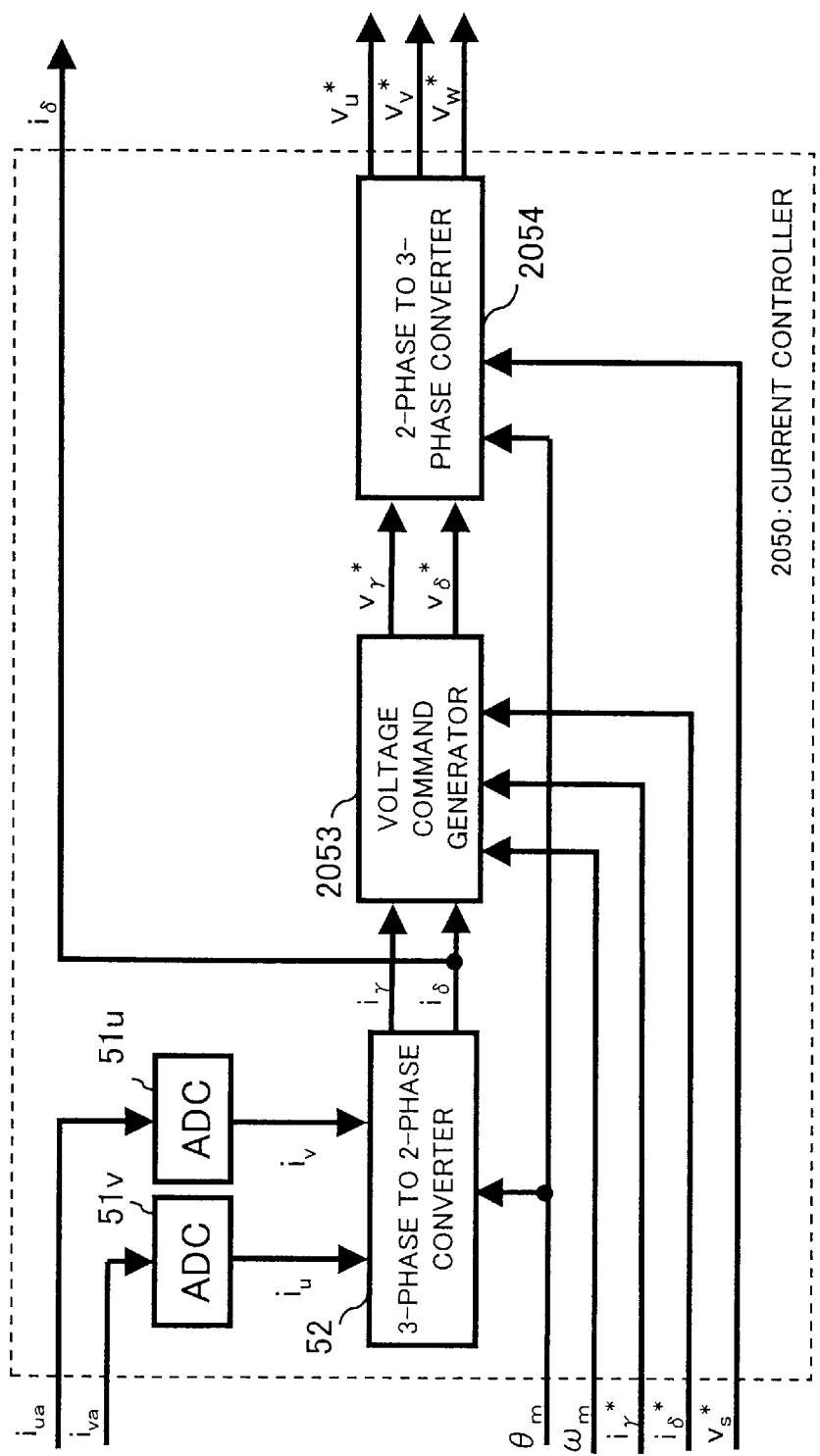
FIG. 16 is a block diagram showing the configuration of a current controller 2050 according to Example 2 of the invention.

FIG. 16 is a block diagram showing the configuration of the current controller 2050 according to Example 2. The current controller 2050 differs that of Example 1 (FIG. 4) in a voltage command generator 2053 and a two-phase to three-phase converter 2054. Other components are similar to those of Example 1. Thus, the similar components are designated by the same reference signs as Example 1, and the description in Example 1 is cited for those components.

The voltage command generator 2053 inputs: the $\gamma$-axis current value signal $[i_\gamma]$ and the $\delta$-axis current value signal $[i_\delta]$ from the three-phase to two-phase converter 52; and the $\gamma$-axis current command $[i_\gamma^*]$, the $\gamma$-axis current command $[i_\delta^*]$, and the signal $[\omega_m]$ indicating the estimated rotational velocity $\omega_m$ from the outside. The voltage command generator 2053 calculates the target $\gamma$-axis voltage $v_\gamma^*$ and the target $\delta$-axis voltage $v_\delta^*$ based on the input values, as described later. The results of calculation are output as the $\gamma$-axis voltage command $[v_\gamma^*]$ and the $\delta$-axis voltage command $[v_\delta^*]$ to the two-phase to three-phase converter 2054.

The two-phase to three-phase converter 2054 calculates the target u-phase voltage $v_u^*$, the target v-phase voltage $v_v^*$, and the target w-phase voltage $v_w^*$ based on the input values of the target $\gamma$-axis voltage $v_\gamma^*$, the target $\delta$-axis voltage $v_\delta^*$, the estimated position $\theta_m$, and the superimposed voltage command $[v_s^*]$ as described later. The results of calculation are output as the u-phase voltage command $[v_u^*]$, the v-phase voltage command $[v_v^*]$, and the w-phase voltage command $[v_w^*]$ to the two-phase to the motor driver 30. Thus, in Example 2, the superimposed voltage command $[v_s^*]$ from the superimposed wave generator 2070 is output to the two-phase to three-phase converter 2054.

Operation of Current Controller 2050

Next, the operation of the current controller 2050 is described as follows: In contrast to Example 1, in Example 2, the superimposed wave is the voltage signal of the rotor-position estimation voltage signal $v_s^*$. Thus, Example 2 differs Example 1 in superimposing the rotor-position estimation voltage signal $v_s^*$ on a control signal for the motor driver 30 as described below.

Analog current value signals $[i_{ua}]$ and $[i_{va}]$ from the current sensors 21u and 21v are converted into the current value signals $[i_u]$ and $[i_v]$ by the ADC's 51u and 51v, respectively. These values are converted into the $\gamma$-axis current $i_\gamma$ and the $\delta$-axis current $i_\delta$ according to Eqs. (5) and (6), respectively, by the three-phase to two-phase converter 52.

$$i_\gamma = (\sqrt{2}) \times \{i_u \sin(\theta_m + 60°) + i_v \sin \theta_m\} \quad (5)$$

$$i_\delta = (\sqrt{2}) \times \{i_u \cos(\theta_m + 60°) + i_v \cos \theta_m\} \quad (6)$$

The voltage command generator 2053 controls the target $\gamma$-axis voltage $v_\gamma^*$ and the target $\delta$-axis voltage $v_\delta^*$ through the proportional plus integral control (PI control) and the non-interacting control according to Eqs. (45) and (46). Accordingly, the $\gamma$-axis current $i_\gamma$ and the $\delta$-axis current $i_\delta$ are controlled so as to be equal to the target $\gamma$-axis current $i_\gamma^*$ and the target $\delta$-axis current $i_\delta^*$, respectively.

$$v_\gamma^* = K_{Pd}\{i_\gamma^* - i_\gamma\} + K_{Id}\Sigma\{i_\gamma^* - i_\gamma\} + R \times i_\gamma^* - \omega_{em} \times Lq \times i_\delta^* \quad (45)$$

$$v_\delta^* = K_{Pq}\{i_\delta^* - i_\delta\} + K_{Iq}\Sigma\{i_\delta^* - i_\delta\} + R \times i_\delta^* + \omega_{em} \times Ld \times i_\gamma^* \omega_{em} \times \psi \quad (46)$$

Here, the constants, parameters, and notations in Eqs. (45) and (46) are common with those in Eqs. (7) and (8). Furthermore, the values of the basic waves of the target γ-axis voltage $v_\gamma^*$ and the target δ-axis voltage $v_\delta^*$, and the value of the estimated angular velocity $\omega_{em}$ of controlled object are the same orders of magnitude as the respective values in Example 1.

The two-phase to three-phase converter 54 converts the target γ-axis voltage $v_\gamma^*$ and the target δ-axis voltage $v_\delta^*$ determined by the voltage command generator 2053, into the target u-phase voltage $v_u^*$, target v-phase voltage $v_v^*$, and target w-phase voltage $v_w^*$ applied across the stator windings 11*u*, 11*v*, and 11*w*, according to Eqs. (47), (48), and (49), respectively. Then, the rotor-position estimation voltage signal $v_s^*$ from the superimposed wave generator 2070 is superimposed on the target γ-axis voltage $v_\gamma^*$ The superimposition provides the target γ-axis voltage with superimposed wave ($v_\gamma^*+v_s^*$).

$$v_u^* = \sqrt{(2/3)}\{(v_\gamma^*+v_s^*)\cos\theta_m - v_\delta^*\sin\theta_m\} \quad (47)$$

$$v_v^* = \sqrt{(2/3)}\{(v_\gamma^*+v_s^*)\cos(\theta_m-120°) - v_\delta^*\sin(\theta_m-120°)\} \quad (48)$$

$$v_w^* = \sqrt{(2/3)}\{(v_\gamma^*+v_s^*)\cos(\theta_m+120°) - v_\delta^*\sin(\theta_m+120°)\} \quad (49)$$

The target u-phase voltage $v_u^*$, the target v-phase voltage $v_v^*$ and the target w-phase voltage $v_w^*$ are output to the motor driver 30.

[Configuration of Superimposed Wave Generator 2070]

Figure 17:
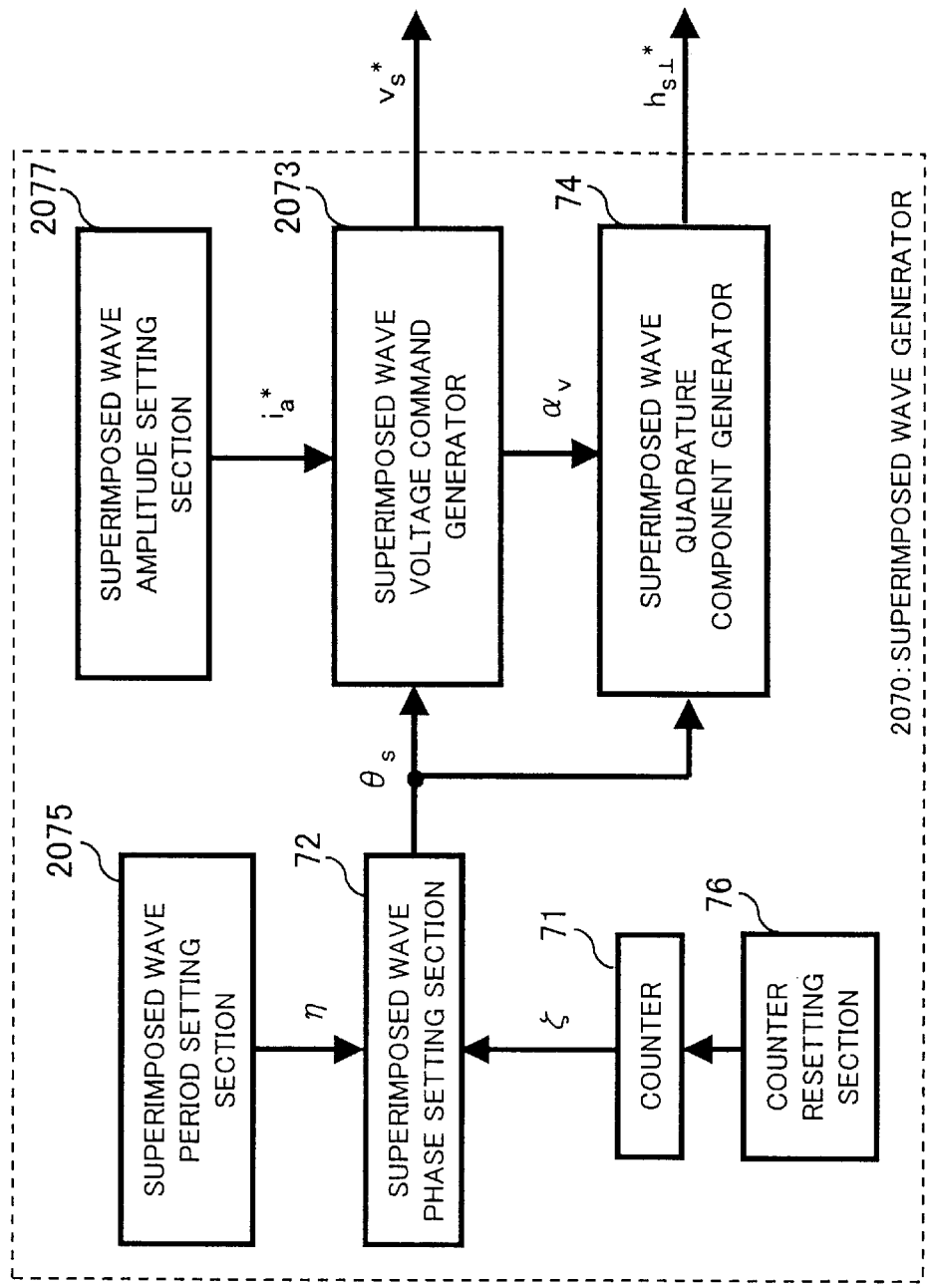
FIG. 17 is a block diagram showing the configuration of a superimposed wave generator 2070 according to Example 2 of the invention.

FIG. 17 is a block diagram showing the configuration of the superimposed wave generator 2070 according to Example 2. Example 2 differs Example 1 (cf. FIG. 5B) in the superimposed wave generator 2070, the superimposed voltage command generator 2073, the superimposed wave period setting section 2075, and the superimposed voltage amplitude setting section 2077. Other components are similar to that of Example 1. Thus, the similar components are designated by the same reference signs as Example 1, and the description in Example 1 is cited for those components.

The superimposed voltage command generator 2073 sets the superimposed voltage command [$v_s^*$] as described later, based on the superimposed wave phase $\theta_s$ and the superimposed voltage amplitude $\alpha_v$, set by the superimposed wave phase setting section 72, and the superimposed voltage amplitude setting section 2077, respectively.

The superimposed wave period setting section 2075 is a logic circuit, and comprises a ROM or a RAM storing a predetermined division number table. The division number η is set based on the division number table as described later.

The superimposed voltage amplitude setting section 2077 is a logic circuit, and comprises a ROM or a RAM storing an amplitude table (FIG. 18) described later. The superimposed voltage amplitude setting section 2077 inputs the current amplitude command [$i_a^*$] from the outside, selects the superimposed voltage amplitude $\alpha_v$ corresponding to the target current amplitude $i_a^*$ indicated by the command [$i_a^*$], and then outputs the superimposed voltage amplitude $\alpha_v$.

The superimposed wave generator 2070 is preferably implemented by software. Alternatively, the above-described components may be implemented by logic devices.

[Operation of Superimposed Wave Generator 2070]

The following is the description of the characteristic part of the operation of the superimposed wave generator 2070 in Example 2. Other operations are similar to those in Example 1. Thus, the description in Example 1 is cited for the similar operations.

Figure 18:
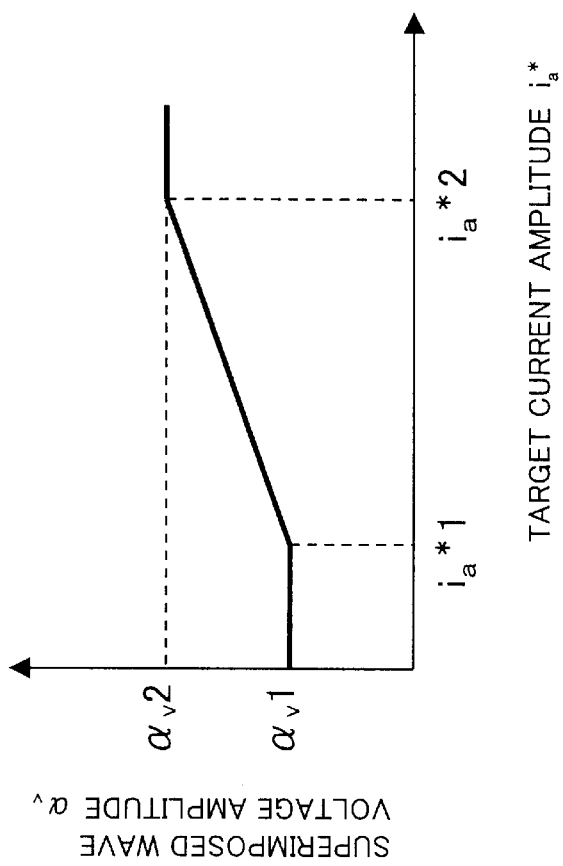
FIG. 18 is a diagram showing an amplitude table for giving a correspondence between a target current amplitude $i_a^*$ and a superimposed wave voltage amplitude $α_v$ n Example 2 of the invention.

The operation of the superimposed wave generator 2070 differs that in Example 1 in the following two points:

The one point is the setting of a voltage signal, or the rotor-position estimation voltage signal $v_s^*$, as a superimposed wave. The superimposed voltage amplitude setting section 2077 sets the superimposed voltage amplitude $\alpha_v$ according to the target current amplitude $i_a^*$ indicated by the current amplitude command [$i_a^*$] from the position/rotational-velocity estimating section 60, as follows: FIG. 18 is a diagram showing an amplitude table for the correspondence between the target current amplitude $i_a^*$ and the superimposed wave voltage amplitude $\alpha_v$ in Example 2. According to the amplitude table, the superimposed voltage amplitude setting section 2077 sets the superimposed voltage amplitude $\alpha_v$ corresponding to the target current amplitude $i_a^*$, as follows: When the target current amplitude $i_a^*$ is smaller than a lower limit $i_a^*1$, the superimposed voltage amplitude $\alpha_v$ is set to be its lower limit $\alpha_v1$.* When the target current amplitude $i_a^*$ is greater than an upper limit $i_a^*2$, the superimposed voltage amplitude $\alpha_v$ is set to be its upper limit $\alpha_v2$. When the target current amplitude $i_a^*$ is greater than or equal to the lower limit $i_a^*1$ and smaller than or equal to the upper limit $i_a^*2$, the superimposed voltage amplitude $\alpha_v$ is set to be a value linearly interpolated between the points ($i_a^*1$, $\alpha_v1$) and ($i_a^*2$, $\alpha_v2$) Thus, the larger the target current amplitude $i_a^*$ is, the larger the superimposed voltage amplitude $\alpha_v$ is set. In Example 2, the lower limit $\alpha_v1$ of the superimposed voltage amplitude $\alpha_v$ is approximately 75 V, while the upper limit $\alpha_v2$ is approximately 125 V. The lower limit $i_a^*1$ of the target current amplitude $i_a^*$ is approximately 0 A, while the upper limit $i_a^*2$ is approximately 15 A. The values have been set such that the amplitude ratio of the superimposed wave to the basic wave is a few tens %.

The superimposed voltage command generator 2073 sets the rotor-position estimation voltage signal $v_s^*$ as a sinusoidal wave based on the superimposed wave phase $\theta_s$ and the superimposed voltage amplitude $\alpha_v$ according to Eq. (50).

$$v_s^* = \alpha_v \sin\theta_s = \alpha_v \sin(\omega_{es}\cdot\zeta Tc) \quad (50)$$

Here, the PWM carrier period of the PWM controller 37 is denoted by Tc. A superimposed wave angular frequency $\omega_{es}$ is the value of the superimposed wave phase $\theta_s$ divided by the product of the count $\zeta$ and the carrier period Tc. As seen from the comparison of Eq. (50) with Eqs. (14) and (33), the superimposed voltage amplitude $\alpha_v$ corresponds to the product of the superimposed current amplitude $\alpha$ and the proportional coefficient $K_{Pd}$. Accordingly, instead of the setting of the superimposed voltage amplitude $\alpha_v$ by the superimposed voltage amplitude setting section 2077, the superimposed voltage command generator 2073 may multiply a superimposed current amplitude $\alpha$ by the proportional coefficient $K_{Pd}$, thereby setting the superimposed voltage amplitude $\alpha_v$, where the superimposed current amplitude $\alpha$ has been set by an apparatus similar to the superimposed current amplitude setting section 77 in Example 1. Furthermore, current responses in the γ-axis current and the δ-axis current to the rotor-position estimation voltage signal $v_s^*$ are similar to the current response $i_{\gamma s}$ and $i_{\delta s}$ (cf. Eqs. (35) and (36)). As a result, in Example 2, the position and the rotational velocity of the rotor can be estimated in the similar manner to Example 1.

The other point is the change of the period of the rotor-position estimation voltage signal $v_s^*$ according to the predetermined division number table. Table 1 shows a division number table stored in the superimposed wave period setting section 2075. The superimposed wave period setting selection 2075 sets values in the right column of Table 1 as the division number η in the order of the numbers in. The left column of Table 1. Each set value of the division number η is a positive and even number, and selected at random from within the range 20–40 in Example 2. The maximum number of the setting order is No. 16. The superimposed wave period setting section 2075 sets the division number η to be a random, positive, and even number according to Table 1. After the setting of the value in the bottom row of Table 1, the setting is repeated from the top row no. 1.

TABLE 1

| No. | η |
|-----|----|
| 1 | 32 |
| 2 | 40 |
| 3 | 20 |
| 4 | 22 |
| 5 | 36 |
| 6 | 22 |
| 7 | 22 |
| 8 | 40 |
| 9 | 40 |
| 10 | 30 |
| 11 | 32 |
| 12 | 32 |
| 13 | 28 |
| 14 | 38 |
| 15 | 26 |
| 16 | 38 |

Thus, the set values of the division number η are previously calculated and stored in the division number table, in Example 2, thereby avoiding the calculation of the division number η in each time of the control operation, in contrast to Example 1. Accordingly, for example, loads on a CPU and similar devices in the microcomputer 2022 may be reduced owing to the shortening of the calculation time of the division number η.

In Table 1, the division number η is set at random. The same number or similar numbers may be occasionally arranged in a large number of consecutive rows, if the division number η is completely random. The arrangement of the same number or similar numbers can cause an excessive amplification of an undesired sound due to the superimposed wave. In order to avoid the excessive amplification, a division number table may be used, wherein each set value differs the preceding set value by a predetermined amount or more, instead of Table 1 in which the set values of the division number η are completely random.

In both of Examples 1 and 2, the object of control is the IPMSM 10. However, the present invention is not restricted to the driving control of IPMSM, but applicable to any type of synchronous motor having saliency. For example, the IPMSM 10 in Examples 1 and 2 may be replaced with a SynRM (synchronous reluctance motor). Furthermore, the invention is applicable even to an SPMSM (surface permanent magnet synchronous motor), if the difference between a d-axis inductance and a q-axis inductance is sufficiently large, thereby being detectable from the amplitude of an AC component of a δ-axis current.

In Example 1, the estimation error $\epsilon$, and therefore the angle lead $\theta_p$, are proportional to both of the superimposed current amplitude $\alpha$ and the proportional gain $K_{Pd}$, as seen from Eqs. (40) and (42). In Example 2, the estimation error $\epsilon$ is proportional to the superimposed voltage amplitude $\alpha_v$, as is obvious from the fact that the superimposed voltage amplitude $\alpha_v$ in Example 2 corresponds to the superimposed current amplitude $\alpha$ and the proportional gain $K_{Pd}$ in Example 1. Accordingly, the proportional gain $K_{TPP}$ and the integral gain $K_{TPI}$ used in Eq. (42) are adjusted to be sufficiently small, when the superimposed current amplitude $\alpha$ and/or the proportional gain $K_{Pd}$ in Example 1, and the superimposed voltage amplitude $\alpha_v$ in Example 2, are large to a certain extent. On the contrary, the proportional gain $K_{TPP}$ and the integral gain $K_{TPI}$ used in Eq. (42) are adjusted to be sufficiently large, when the superimposed current amplitude $\alpha$ and/or the proportional gain $K_{Pd}$ in Example 1, and the superimposed voltage amplitude $\alpha_v$ in Example 2 are small to a certain extent. The adjusting of the gains $K_{TPP}$ and $K_{TPI}$ may maintain the gain of the angle lead $\theta_p$ at substantially constant, thereby stabilizing the control based on the angle lead $\theta_p$.

In the above-described examples, the proportional gain $K_{TPP}$ and the integral gain $K_{TPI}$ used in the calculation of the angle lead $\theta_p$ (cf. Eq. (42)) may be increased along with the increasing of the estimated rotational velocity $\omega_m$ of the rotor 12. Then, the control based on the angle lead $\theta_p$ may be stabilized by the following reason: The amount of variation in the angle lead $\theta_p$ is constant, if the estimation error $\epsilon$ is constant. Thus, as seen from Eq. (43), the ratio of the angle lead $\theta_p$ to the estimated rotational velocity $\omega_m$ of the rotor 12 is larger at high rotational velocity of the rotor 12 (during a fast revolution) than at low rotational velocity thereof (during a slow revolution). In other words, the correction of the estimated rotational velocity $\omega_m$ for a constant estimation error $\epsilon$ is larger during the slow revolution. As a result, optimum values of the proportional gain $K_{TPP}$ and the integral gain $K_{TPI}$ at the slow revolution are smaller than at the fast revolution. Accordingly, the proportional gain $K_{TPP}$ and the integral gain $K_{TPI}$ are increased along with an increasing of the estimated rotational velocity $\omega_m$, so as to be kept optimum independently of the rotational velocity. Thus, the control based on the angle lead $\theta_p$ is stabilized.

By a similar reason, in the estimation error limiter 62, the threshold value $\epsilon_{lim}$ used in Eq. (41) may be increased along with the increasing of the estimated rotational velocity $\omega_m$.

In the examples, the estimation error limiter 62 has directly limited the estimation error $\epsilon$. However, the invention is not restricted to the limiting way. Another way may be used for limiting a current response in the δ-axis current to the rotor-position estimation signal. For example, the estimation error $\epsilon$ multiplied by a predetermined gain maybe limited, whereby the limited value may be used in place of the effective estimation error $\epsilon 1$ in Eq. (42).

In the examples, the estimation error $\epsilon$ is defined through the discrete Fourier integration of the δ-axis current $i_\delta$ using the superimposed wave quadrature component $h_{s1}^*$ (Eq. (15)) according to Eq. (37). Alternatively, an arbitrary amount that is proportional to the position estimation error $\Delta\theta$ may be defined as an estimation error $\epsilon$. For example, an estimation error $\epsilon$ may be the total sum of the absolute values of the samples of the detected δ-axis current $i_\delta$. However, noises in each sample are not necessarily canceled out by the summation. Thus, the definitions of the estimation error $\epsilon$ in the above-described examples are preferable as for a precision thereof.

In the examples, the rotor-position estimation signal is superimposed in the γ-axis direction, and then the current response in the δ-axis direction is detected. Alternatively, the superimposing direction of the rotor-position estimation signal may be substituted for the detecting direction of the current response and vice versa. That is, the rotor-position estimation current signal $i_s^*$ or the rotor-position estimation voltage signal $v_s^*$ may be superimposed on the target δ-axis current $i_\delta^*$ or the target δ-axis voltage $v_\delta^*$, respectively, while the amplitude of a current response may be detected from the detected γ-axis current $i_\gamma$. Then, the estimation error ε is controlled so that the amplitude of the current response substantially converges to zero.

According to the invention as described above, the period of the rotor-position estimation signal varies at random. The random variation reduces the undesired sound due to the superimposed wave in contrast to the prior art. Furthermore, the amplitude of the rotor-position estimation signal varies, thereby being suppressed to a minimum level for maintaining the sufficient controllability. Accordingly, the undesired sound is reduced without degradation in estimation precision and control response speed, in contrast to the prior art motor control apparatus.

According to the invention, the current response is sampled plural times in each period of the rotor-position estimation signal, whereby the estimation error ε is calculated through the discrete Fourier integration of the plurality of the samples. Accordingly, noises in each samples are statistically suppressed, thereby improving the precision of the position estimation error $\Delta\theta$.

In particular, in the case of a PWM control for a synchronous motor, a waveform of the rotor-position estimation signal is arranged symmetrically between the samples with positive value and the samples with negative one. Furthermore, the period of the rotor-position estimation signal is set to be an even multiple of the PWM carrier period. That is, the number of the samples is set to be an even number in each period. Accordingly, noises in the mutually symmetric samples cancel out each other. The cancellation improves the precision of the position estimation error $\Delta\theta$.

According to the invention, the current response to the rotor-position estimation signal is limited, whereby the estimated position is calculated on the basis of the limited current response. As a result, the revolution control of rotor is stabilized, even when the detected current contains an extremely large noise.

A position-sensorless motor control apparatus according to the above-described examples may be applied to a wheel driving motor in an electric vehicle. Then, the position-sensorless motor control apparatus according to the above-described examples can reduce an undesired sound with maintaining the drive controllability, especially when the wheel driving motor is at start up and slowly runs. Accordingly, in the above-described electric vehicle at starting and in slow moving, the driving control of the wheel driving motor is smooth, and the undesired sound is soft. Thus, the electric vehicle makes persons in the cabin comfortable during the running.

A position-sensorless motor control apparatus according to the above-described examples may be applied to a fan driving motor in a ventilator. Then, the position-sensorless motor control apparatus according to the above-described examples can reduce an undesired sound with maintaining the drive controllability, especially when the fan driving motor is at start up and slowly runs. Accordingly, in the above-described fan, the driving control of the fan driving motor is smooth, and the undesired sound is soft. Thus, the ventilation is carried out smoothly, and the fan is prevent from making persons in a room uncomfortable under ventilation.

A position-sensorless motor control apparatus according to the above-described examples may be applied to a compressor in a refrigerator. Then, the position-sensorless motor control apparatus according to the above-described examples can reduce an undesired sound with maintaining the drive controllability, especially when the compressor is at start up and slowly runs. Accordingly, in the above-described refrigerator, at starting and in normal driving, the driving control of the compressor is smooth, and the undesired sound is soft. Thus, the refrigerator is prevented from, for example, disturbing comfortable sleep in home at night.

A position-sensorless motor control apparatus according to the above-described examples may be applied to a compressor in an air conditioner. Then, the position-sensorless motor control apparatus according to the above-described examples can reduce an undesired sound with maintaining the drive controllability, especially when the compressor is at start up and slowly runs. Accordingly, in the above-described air conditioner at starting and in normal driving, the driving control of the compressor is smooth, and the undesired sound is soft. Thus, the air conditioner is prevented from making persons in a room and the neighbors outside the room uncomfortable.

Although the present invention has been described in terms of the presently preferred embodiments, it is to be understood that such disclosure is not to be interpreted as limiting Various alternations and and modifications will no doubt become apparent to those skilled in the art to which the present invention pertains, after having read the above disclosure. Accordingly, it is intended that the appended claims be interpreted as covering all alternations and modifications as fall within the true spirit and scope of the invention.

What is claimed is:

1. A position-sensorless motor control method comprising the steps of:
   (A) determining a target current vector of stator windings;
   (B) setting one of a rotor-position estimation current signal and a rotor-position estimation voltage signal, with varying the period thereof;
   (C) detecting currents flowing through said stator windings;
   (D) carrying out one of
      (a) superimposing said rotor-position estimation current signal on a component of said target current vector in a first direction based on an estimated position (γ-axis direction, hereafter) of a rotor, thereby obtaining a target current vector with superimposed wave, and
      (b) superimposing said rotor-position estimation voltage signal on a component of a target voltage vector corresponding to said target current vector in said first direction, thereby obtaining a target voltage vector with superimposed wave;
   (E) supplying electric power to said stator windings through a motor driving device on the basis of one of said target current vector with superimposed wave and said target voltage vector with superimposed wave;
   (F) measuring a current response to one of said rotor-position estimation current signal and said rotor-position estimation voltage signal, from a component of a current vector in a second direction having a fixed relation with said first direction, said current vector representing said currents detected in said detecting step; and
   (G) correcting said γ-axis direction on the basis of said current response.

2. A position-sensorless motor control method according to claim 1, wherein the period of one of said rotor-position estimation current signal and said rotor-position estimation voltage signal varies at random.

3. A position-sensorless motor control method according to claim 1, wherein the period of one of said rotor-position estimation current signal and said rotor-position estimation voltage signal varies on the basis of a predetermined table.

4. A position-sensorless motor control method according to claim 1, wherein:
   (a) said first direction is one of said γ-axis direction and a direction substantially shifted by 90° in terms of electric angle from said γ-axis direction;
   (b) said second direction is a direction substantially shifted by 90° in terms of electric angle from said first direction; and
   (c) said γ-axis direction is corrected so that said current response in said second direction substantially converges to zero.

5. A position-sensorless motor control method comprising the steps of:
   (A) determining a target current vector of stator windings;
   (B) setting one of a rotor-position estimation current signal and a rotor-position estimation voltage signal, with varying the amplitude thereof;
   (C) detecting currents flowing through said stator windings;
   (D) carrying out one of
      (a) superimposing said rotor-position estimation current signal on a component of said target current vector in a first direction based on a γ-axis direction of a rotor, thereby obtaining a target current vector with superimposed wave, and
      (b) superimposing said rotor-position estimation voltage signal on a component of a target voltage vector corresponding to said target current vector in said first direction, thereby obtaining a target voltage vector with superimposed wave;
   (E) supplying electric power to said stator windings through a motor driving device on the basis of one of said target current vector with superimposed wave and said target voltage vector with superimposed wave;
   (F) measuring a current response to one of said rotor-position estimation current signal and said rotor-position estimation voltage signal, from a component of a current vector in a second direction having a fixed relation with said first direction, said current vector representing said currents detected in said detecting step; and
   (G) correcting said γ-axis direction on the basis of said current response.

6. A position-sensorless motor control method according to claim 5, wherein the amplitude of one of said rotor-position estimation current signal and said rotor-position estimation voltage signal increases when the amplitude of said current vector increases.

7. A position-sensorless motor control method comprising the steps of:
   (A) determining a target current vector of stator windings;
   (B) setting one of a rotor-position estimation current signal and a rotor-position estimation voltage signal, with a predetermined period;
   (C) detecting currents flowing through said stator windings;
   (D) carrying out one of
      (a) superimposing said rotor-position estimation current signal on a component of said target current vector in a first direction based on a γ-axis direction of a rotor, thereby obtaining a target current vector with superimposed wave, and
      (b) superimposing said rotor-position estimation voltage signal on a component of a target voltage vector corresponding to said target current vector in said first direction, thereby obtaining a target voltage vector with superimposed wave;
   (E) supplying electric power to said stator windings through a motor driving device on the basis of one of said target current vector with superimposed wave and said target voltage vector with superimposed wave;
   (F) measuring a current response to one of said rotor-position estimation current signal and said rotor-position estimation voltage signal, from a component of a current vector in a second direction having a fixed relation with said first direction through sampling at least three times in each period of one of said rotor-position estimation current signal and said rotor-position estimation voltage signal, said current vector representing said currents detected in said detecting step; and
   (G) correcting said γ-axis direction on the basis of said current response.

8. A position-sensorless motor control method according to claim 7, wherein the sampling of said current response is carried out plural times in each half period of one of said rotor-position estimation current signal and said rotor-position estimation voltage signal.

9. A position-sensorless motor control method according to claim 8, wherein:
   (A) (a) the period of one of said rotor-position estimation current signal and said rotor-position estimation voltage signal is set to be an even multiple of a carrier period of pulse width modulation (PWM), and (b) the waveform thereof is set symmetrically with respect to the middle point between the former half and the latter half of said period;
   (B) target voltages are modulated through said PWM, said target voltages represented by one of a target voltage vector corresponding to said target current vector with superimposed wave and said target voltage vector with superimposed wave, and the modulated target voltages are applied to said stator windings through said motor driving device; and
   (C) said current response is measured on the basis of the symmetric waveform of one of said rotor-position estimation current signal and said rotor-position estimation voltage signal.

10. A position-sensorless motor control method comprising the steps of:
   (A) determining a target current vector of stator windings;
   (B) setting one of a rotor-position estimation current signal and a rotor-position estimation voltage signal, wherein (a) the period thereof is an even multiple of a carrier period of PWM and (b) the waveform thereof is symmetric with respect to the middle point between the former half and the latter half of said period;
   (C) detecting currents flowing through said stator windings;
   (D) carrying out one of
      (a) superimposing said rotor-position estimation current signal on a component of said target current vector in a first direction based on a γ-axis direction of a rotor, thereby obtaining a target current vector with superimposed wave, and
      (b) superimposing said rotor-position estimation voltage signal on a component of a target voltage vector corresponding to said target current vector in said first direction, thereby obtaining a target voltage vector with superimposed wave;

(E) (a) modulating target voltages through said PWM, said target voltages represented by one of a target voltage vector corresponding to said target current vector with superimposed wave and said target voltage vector with superimposed wave, and (b) applying the modulated target voltages to said stator windings through a motor driving device;

(F) measuring a current response to one of said rotor-position estimation current signal and said rotor-position estimation voltage signal, from a component of a current vector in a second direction having a fixed relation with said first direction, on the basis of the symmetric waveform of one of said rotor-position estimation current signal and said rotor-position estimation voltage signal, said current vector representing said currents detected in said detecting step; and (G) correcting said γ-axis direction on the basis of said current response.

11. A position-sensorless motor control method comprising the steps of:

(A) determining a target current vector of stator windings;

(B) setting one of a rotor-position estimation current signal and a rotor-position estimation voltage signal, with a predetermined period;

(C) detecting currents flowing through said stator windings;

(D) carrying out one of
  (a) superimposing said rotor-position estimation current signal on a component of said target current vector in a first direction based on a γ-axis direction of a rotor, thereby obtaining a target current vector with superimposed wave, and
  (b) superimposing said rotor-position estimation voltage signal on a component of a target voltage vector corresponding to said target current vector in said first direction, thereby obtaining a target voltage vector with superimposed wave;

(E) supplying electric power to said stator windings through a motor driving device on the basis of one of said target current vector with superimposed wave and said target voltage vector with superimposed wave;

(F) (a) multiplying a component of a current vector in a second direction orthogonal to said first direction in terms of electric angle by a signal, said current vector representing said currents detected in the detecting step, said signal having (1) a period substantially equal to the period of one of said rotor-position estimation current signal and said rotor-position estimation voltage signal, and (2) a phase substantially shifted by 90° in terms of electric angle from one of said rotor-position estimation current signal and said rotor-position estimation voltage signal, and
  (b) measuring a current response to one of said rotor-position estimation current signal and said rotor-position estimation voltage signal from the result of the multiplication; and (G) correcting said γ-axis direction on the basis of said current response.

12. A position-sensorless motor control method comprising the steps of:

(A) determining a target current vector of stator windings;

(B) setting one of a rotor-position estimation current signal and a rotor-position estimation voltage signal;

(C) detecting currents flowing through said stator windings;

(D) carrying out one of
  (a) superimposing said rotor-position estimation current signal on a component of said target current vector in a first direction based on a γ-axis direction of a rotor, thereby obtaining a target current vector with superimposed wave, and
  (b) superimposing said rotor-position estimation voltage signal on a component of a target voltage vector corresponding to said target current vector in said first direction, thereby obtaining a target voltage vector with superimposed wave;

(E) supplying electric power to said stator windings through a motor driving device on the basis of one of said target current vector with superimposed wave and said target voltage vector with superimposed wave;

(F) measuring a current response to one of said rotor-position estimation current signal and said rotor-position estimation voltage signal, from a component of a current vector in a second direction having a fixed relation with said first direction, said current vector representing said currents detected in said detecting step;

(G) limiting a value of said current response; and (H) correcting said γ-axis direction on the basis of said current response with said value limited in said limiting step.

13. A position-sensorless motor control apparatus comprising:

(A) a motor controlling section for determining a target current vector of stator windings;

(B) a superimposed wave generating section for setting one of a rotor-position estimation current signal and a rotor-position estimation voltage signal, with varying the period thereof;

(C) current detecting devices for detecting currents flowing through said stator windings;

(D) a current controlling section for carrying out one of
  (a) superimposing said rotor-position estimation current signal on a component of said target current vector in a first direction based on a γ-axis direction of a rotor, thereby obtaining a target current vector with superimposed wave, and further calculating a corresponding target voltage vector; and
  (b) a current controlling section for superimposing said rotor-position estimation voltage signal on a component of a target voltage vector corresponding to said target current vector in said first direction, thereby obtaining a target voltage vector with superimposed wave;

(E) a motor driving device for supplying electric power to said stator windings on the basis of one of said target voltage vector corresponding to said target current vector with superimposed wave and said target voltage vector with superimposed wave; and (F) a rotor-position estimating section for
  (a) measuring a current response to one of said rotor-position estimation current signal and said rotor-position estimation voltage signal, from a component of a current vector in a second direction having a fixed relation with said first direction, said current vector representing said currents detected by said current detecting devices, and
  (b) correcting said γ-axis direction on the basis of said current response.

14. A position-sensorless motor control apparatus according to claim 13, wherein said superimposed wave generating section varies at random the period of one of said rotor-position estimation current signal and said rotor-position estimation voltage signal.

15. A position-sensorless motor control apparatus according to claim 13, wherein said superimposed wave generating section has a memory storing a predetermined table, thereby varying the period of one of said rotor-position estimation current signal and said rotor-position estimation voltage signal, on the basis of said table.

16. A position-sensorless motor control apparatus according to claim 13, wherein:
   (A) said current controlling section sets said first direction to be one of said γ-axis direction and a direction substantially shifted by 90° in terms of electric angle from said γ-axis direction; and
   (B) said rotor-position estimating section sets said second direction to be a direction substantially shifted by 90° in terms of electric angle from said first direction, and corrects said γ-axis direction so that said current response in said second direction substantially converges to zero.

17. An electric vehicle comprising a wheel driving motor with a position-sensorless motor control apparatus according to claim 13.

18. A fan comprising a fan driving motor with a position-sensorless motor control apparatus according to claim 13.

19. A refrigerator comprising a compressor with a position-sensorless motor control apparatus according to claim 13.

20. An air conditioner comprising a compressor with a position-sensorless motor control apparatus according to claim 13.

21. A position-sensorless motor control apparatus comprising:
   (A) a motor controlling section for determining a target current vector of stator windings;
   (B) a superimposed wave generating section for setting one of a rotor-position estimation current signal and a rotor-position estimation voltage signal, with varying the amplitude thereof;
   (C) current detecting devices for detecting currents flowing through said stator windings;
   (D) a current controlling section for carrying out one of
      (a) superimposing said rotor-position estimation current signal on a component of said target current vector in a first direction based on a γ-axis direction of a rotor, thereby obtaining a target current vector with superimposed wave, and further calculating a corresponding target voltage vector, and
      (b) superimposing said rotor-position estimation voltage signal on a component of a target voltage vector corresponding to said target current vector in said first direction, thereby obtaining a target voltage vector with superimposed wave;
   (E) a motor driving device for supplying electric power to said stator windings on the basis of one of said target voltage vector corresponding to said target current vector with superimposed wave and said target voltage vector with superimposed wave; and
   (F) a rotor-position estimating section for
      (a) measuring a current response to one of said rotor-position estimation current signal and said rotor-position estimation voltage signal, from a component of a current vector in a second direction having a fixed relation with said first direction, said current vector representing said currents detected by said current detecting devices, and
      (b) correcting said γ-axis direction on the basis of said current response.

22. A position-sensorless motor control apparatus according to claim 21, wherein said superimposed wave generating section increases the amplitude of one of said rotor-position estimation current signal and said rotor-position estimation voltage signal, when the amplitude of said current vector increases.

23. A position-sensorless motor control apparatus comprising:
   (A) a motor controlling section for determining a target current vector of stator windings;
   (B) a superimposed wave generating section for setting one of a rotor-position estimation current signal and a rotor-position estimation voltage signal, with a predetermined period;
   (C) current detecting devices for detecting currents flowing through said stator windings;
   (D) a current controlling section for carrying out one of
      (a) superimposing said rotor-position estimation current signal on a component of said target current vector in a first direction based on a γ-axis direction of a rotor, thereby obtaining a target current vector with superimposed wave, and further calculating a corresponding target voltage vector, and
      (b) superimposing said rotor-position estimation voltage signal on a component of a target voltage vector corresponding to said target current vector in said first direction, thereby obtaining a target voltage vector with superimposed wave;
   (E) a motor driving device for supplying electric power to said stator windings on the basis of one of said target voltage vector corresponding to said target current vector with superimposed wave and said target voltage vector with superimposed wave; and
   (F) a rotor-position estimating section for
      (a) measuring a current response to one of said rotor-position estimation current signal and said rotor-position estimation voltage signal, from a component of a current vector in a second direction having a fixed relation with said first direction through sampling at least three times in each period of one of said rotor-position estimation current signal and said rotor-position estimation voltage signal, said current vector representing said currents detected by said current detecting devices, and
      (b) correcting said γ-axis direction on the basis of said current response.

24. A position-sensorless motor control apparatus according to claim 23, wherein said rotor-position estimating section carries out the sampling of said current response plural times in each half period of one of said rotor-position estimation current signal and said rotor-position estimation voltage signal.

25. A position-sensorless motor control apparatus according to claim 23, wherein:
   (A) said superimposed wave generating section sets (a) the period of one of said rotor-position estimation current signal and said rotor-position estimation voltage signal to be an even multiple of the carrier period of PWM, and (b) the waveform thereof to be symmetric with respect to the middle point between the former half and the latter half of said period;

(B) said motor driving device modulates target voltages through said PWM, said target voltages represented by one of said target voltage vector corresponding to said target current vector with superimposed wave and said target voltage vector with superimposed wave, and applies the modulated target voltages to said stator windings; and (C) said rotor-position estimating section measures said current response on the basis of the symmetric waveform of one of said rotor-position estimation current signal and said rotor-position estimation voltage signal.

26. A position-sensorless motor control apparatus comprising:

(A) a motor controlling section determining a target current vector of stator windings;

(B) a superimposed wave generating section for setting one of a rotor-position estimation current signal and a rotor-position estimation voltage signal, with the period thereof being an even multiple of the carrier period of PWM and the waveform thereof symmetric with respect to the middle point between the former half and the latter half of said period;

(C) current detecting devices for detecting currents flowing through said stator windings;

(D) a current controlling section for carrying out one of
   (a) superimposing said rotor-position estimation current signal on a component of said target current vector in a first direction based on a γ-axis direction of a rotor, thereby obtaining a target current vector with superimposed wave, and further calculating a corresponding target voltage vector, and
   (b) superimposing said rotor-position estimation voltage signal on a component of a target voltage vector corresponding to said target current vector in said first direction, thereby obtaining a target voltage vector with superimposed wave;

(E) a motor driving device for modulating target voltages through said PWM, said target voltages represented by one of said target voltage vector corresponding to said target current vector with superimposed wave and said target voltage vector with superimposed wave, and applying the modulated target voltages to said stator windings; and (F) a rotor-position estimating section for
   (a) measuring a current response to one of said rotor-position estimation current signal and said rotor-position estimation voltage signal, from a component of a current vector in a second direction having a fixed relation with said first direction, on the basis of the symmetric waveform of one of said rotor-position estimation current signal and said rotor-position estimation voltage signal, said current vector representing said currents detected by said current detecting devices, and
   (b) correcting said γ-axis direction on the basis of said current response.

27. A position-sensorless motor control apparatus comprising:

(A) a motor controlling section for determining a target current vector of stator windings;

(B) a superimposed wave generating section for setting one of a rotor-position estimation current signal and a rotor-position estimation voltage signal, with a predetermined period;

(C) current detecting devices for detecting currents flowing through said stator windings;

(D) a current controlling section for carrying out one of
   (a) superimposing said rotor-position estimation current signal on a component of said target current vector in a first direction based on a γ-axis direction of a rotor, thereby obtaining a target current vector with superimposed wave, and calculating a corresponding target voltage vector, and
   (b) superimposing said rotor-position estimation voltage signal on a component of a target voltage vector corresponding to said target current vector in said first direction, thereby obtaining a target voltage vector with superimposed wave;

(E) a motor driving device for supplying electric power to said stator windings on the basis of one of said target voltage vector corresponding to said target current vector with superimposed wave and said target voltage vector with superimposed wave; and (F) a rotor-position estimating section for
   (a) multiplying a component of a current vector in a second direction orthogonal to said first direction in terms of electric angle by a signal, said current vector representing said currents detected by said current detecting devices, said signal having (1) a period substantially equal to the period of one of said rotor-position estimation current signal and said rotor-position estimation voltage signal, and (2) a phase substantially shifted by 90° in terms of electric angle from one of said rotor-position estimation current signal and said rotor-position estimation voltage signal,
   (b) measuring a current response to one of said rotor-position estimation current signal and said rotor-position estimation voltage signal, from the result of the multiplication, and
   (c) correcting said γ-axis direction on the basis of said current response.

28. A position-sensorless motor control apparatus comprising:

(A) a motor controlling section for determining a target current vector of stator windings;

(B) a superimposed wave generating section for setting one of a rotor-position estimation current signal and a rotor-position estimation voltage signal;

(C) current detecting devices for detecting currents flowing through said stator windings;

(D) a current controlling section for carrying out one of
   (a) superimposing said rotor-position estimation current signal on a component of said target current vector in a first direction based on a γ-axis direction of a rotor, thereby obtaining a target current vector with superimposed wave, and further calculating a corresponding target voltage vector, and
   (b) superimposing said rotor-position estimation voltage signal on a component of a target voltage vector corresponding to said target current vector in said first direction, thereby obtaining a target voltage vector with superimposed wave;

(E) a motor driving device for supplying electric power to said stator windings on the basis of one of said target voltage vector corresponding to said target current vector with superimposed wave and said target voltages with superimposed wave; and (F) a rotor-position estimating section having a limiter, said rotor-position estimating section for
   (a) measuring a current response to one of said rotor-position estimation current signal and said rotor-position estimation voltage signal, from a component of a current vector in a second direction having a fixed relation with said first direction, (b) limiting a value of said current response using said limiter, and (c) correcting said γ-axis direction on the basis of said current response with said value limited by said limiter.

* * * * *